US012613615B2

(12) United States Patent
Zhang et al.

(10) Patent No.: US 12,613,615 B2
(45) Date of Patent: Apr. 28, 2026

(54) DISPLAY METHOD AND RELATED APPARATUS FOR LOCKING A WINDOW

(71) Applicant: Huawei Technologies Co., Ltd., Shenzhen (CN)

(72) Inventors: Yanan Zhang, Shenzhen (CN); Bo Wang, Wuhan (CN); Guangjun Chen, Wuhan (CN); Xiuping Jiang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 277 days.

(21) Appl. No.: 18/287,774

(22) PCT Filed: Apr. 6, 2022

(86) PCT No.: PCT/CN2022/085413
§ 371 (c)(1),
(2) Date: Oct. 20, 2023

(87) PCT Pub. No.: WO2022/222752
PCT Pub. Date: Oct. 27, 2022

(65) Prior Publication Data
US 2024/0192835 A1     Jun. 13, 2024

(30) Foreign Application Priority Data
Apr. 22, 2021     (CN) ......................... 202110438655.7

(51) Int. Cl.
*G06F 3/0483*          (2013.01)
*G06F 3/041*          (2006.01)
(Continued)

(52) U.S. Cl.
CPC .......... *G06F 3/0483* (2013.01); *G06F 3/0412* (2013.01); *G06F 3/04817* (2013.01);
(Continued)

(58) Field of Classification Search
CPC .. G06F 3/0483; G06F 3/0412; G06F 3/04817; G06F 3/04845; G06F 3/04883; G06F 2203/04803
(Continued)

(56) References Cited

U.S. PATENT DOCUMENTS 5,734,380 A *   3/1998   Adams .................. G06F 3/0481
                                                    715/802
2005/0278644 A1*  12/2005  Greaves ............. G06Q 30/0641
                                                    715/962
(Continued)

FOREIGN PATENT DOCUMENTS

CN          103841342 A       6/2014
CN          105867937 A   *   8/2016   ............. G06F 9/541
(Continued)

*Primary Examiner* — Daniel Samwel
(74) *Attorney, Agent, or Firm* — Slater Matsil, LLP

(57) ABSTRACT

An electronic device may display an interface of a first application, where the interface of the first application includes a first window and a second window, a first page of the first application is displayed in the first window, and a second page of the first application is displayed in the second window. The second page is a sub page of the first page. After the electronic device can receive a window locking operation of a user, if the electronic device receives an operation performed by the user on a new page open control in the first page, the electronic device may display a third page in the first window in response to the operation. The third page is a sub page of the first page.

20 Claims, 76 Drawing Sheets

(51) Int. Cl.
*G06F 3/04817* (2022.01)
*G06F 3/04845* (2022.01)
*G06F 3/04883* (2022.01)

(52) U.S. Cl.
CPC ...... *G06F 3/04845* (2013.01); *G06F 3/04883* (2013.01); *G06F 2203/04803* (2013.01)

(58) Field of Classification Search
USPC .................................................. 715/700–866
See application file for complete search history.

(56) References Cited

U.S. PATENT DOCUMENTS

| | | | | |
|---|---|---|---|---|
| 2011/0010656 | A1* | 1/2011 | Mokotov | ............ G06F 3/04812 |
| | | | | 715/780 |
| 2020/0326824 | A1 | 10/2020 | Alonso et al. | |
| 2020/0326839 | A1* | 10/2020 | Walkin | ............... G06F 3/04817 |

FOREIGN PATENT DOCUMENTS

| | | | | | |
|---|---|---|---|---|---|
| CN | 107229411 | A | | 10/2017 | |
| CN | 105867937 | B | * | 2/2019 | ........... G06F 3/0486 |
| CN | 110456951 | A | | 11/2019 | |
| CN | 111078091 | A | | 4/2020 | |
| CN | 111949325 | A | | 11/2020 | |
| CN | 111949345 | A | | 11/2020 | |
| CN | 112162812 | A | | 1/2021 | |
| CN | 112162870 | A | | 1/2021 | |
| KR | 20140126542 | A | * | 10/2014 | ........... G06F 3/0481 |
| KR | 102210999 | B1 | * | 2/2021 | ........... G06F 3/0486 |

* cited by examiner 1240 1241 1242 100

DISPLAY METHOD AND RELATED APPARATUS FOR LOCKING A WINDOW

CROSS REFERENCE TO RELATED APPLICATIONS

This application is a national stage of International Application No. PCT/CN2022/085413, filed on Apr. 6, 2022, which claims priority to Chinese Patent Application No. 202110438655.7, filed Apr. 22, 2021. Both of the aforementioned applications are hereby incorporated by reference in their entireties.

TECHNICAL FIELD

This application relates to the field of terminal technologies, and in particular, to a display method and a related apparatus.

BACKGROUND

An application display technology is increasingly and widely used on electronic devices. An electronic device may display a page of an application in a plurality of display methods. When the electronic device displays a page of the application in full screen, the electronic device receives a page switching input of a user for the page, and may display a page to switch to in full screen in response to the input. As a result, the electronic device cannot flexibly configure a user interface. When the user wants to view content of two pages, the user needs to switch between the two pages. This operation is complex.

SUMMARY

This application provides a display method and a related apparatus, so that an electronic device can do appropriate user interface configuration, and concurrently display two pages at a same layer, to improve screen utilization of the electronic device. This helps a user to concurrently process two tasks, to improve processing efficiency.

According to a first aspect, this application provides a display method, including:

displaying an interface of a first application, where the interface of the first application includes a first window and a second window, the first window is displayed in a first display area on a display screen of an electronic device, the second window is displayed in a second display area on the display screen of the electronic device, a first page of the first application is displayed in the first window, a second page of the first application is displayed in the second window, and the second page is a sub page of the first page; receiving a first input for the first page; displaying a third page in the second window in response to the first input, where the third page is a sub page of the first page; receiving a second input for the interface of the first application; displaying a first lock symbol in response to the second input, where the first lock symbol indicates that the first window is locked; receiving a third input for the first page; and displaying a fourth page in the first window in response to the third input.

According to the display method provided in this application, when displaying two or more pages, the electronic device may lock a window in which the page is displayed. The electronic device may display, in the locked window, the page in the window and a page triggered by a control in the page to be displayed. In this way, the electronic device can do appropriate user interface configuration, and concurrently display two pages at a same layer, to improve screen utilization of the electronic device. This helps a user to concurrently view two or more pages.

In a possible implementation, before the receiving a second input for the interface of the first application, a first horizontal bar is displayed in the first window. The second input is an input for the first horizontal bar.

In a possible implementation, before the receiving a second input for the interface of the first application, the method further includes: receiving a fourth input for the first display area; and displaying the first horizontal bar in the first window in response to the fourth input.

In a possible implementation, before the receiving a second input for the interface of the first application, the method further includes: receiving a fifth input for the interface of the first application; and displaying a lock control in response to the fifth input, where the second input is an input for the lock control.

In a possible implementation, the receiving a second input for the interface of the first application specifically includes: the interface of the first application further includes a first division line, the first division line is displayed at a junction between the first window and the second window, and the second input is an input for the first division line.

In a possible implementation, after the displaying a fourth page in the first window, the method further includes: receiving a sixth input for the first lock symbol; and in response to the sixth input, canceling display of the first lock symbol, displaying the first page in the first window, and displaying the third page or the fourth page in the second window.

In a possible implementation, after the displaying a fourth page in the first window, the method further includes: receiving a seventh input for the first division line; and in response to the seventh input, canceling display of the first lock symbol, displaying the first page in the first window, and displaying the third page or the fourth page in the second window.

In a possible implementation, after the displaying a fourth page in the first window, the method further includes: receiving an eighth input; in response to the eighth input, displaying a desktop and displaying a first control on the desktop; receiving a ninth input for the first control; and displaying a first floating window and/or a second floating window on the desktop in response to the ninth input, where a fifth page is displayed in the first floating window, a sixth page is displayed in the second floating window, content of the fifth page is the same as content of the fourth page, and content of the sixth page is the same as content of the third page.

In a possible implementation, after the displaying a fourth page in the first window, the method further includes: receiving an eighth input; and in response to the eighth input, displaying a desktop and displaying a second control and a first floating window on the desktop, where a fifth page is displayed in the first floating window, content of the fifth page is the same as content of the fourth page, the second control is configured to trigger to display a second floating window, a sixth page is displayed in the second floating window, and content of the sixth page is the same as content of the third page; or in response to the eighth input, displaying a desktop and displaying a third control and a second floating window on the desktop, where the third control is configured to trigger to display a first floating window.

In a possible implementation, after the displaying a fourth page in the first window, the method further includes: receiving an eighth input; and in response to the eighth input, displaying a desktop and displaying a first floating window and a second floating window on the desktop, where a fifth page is displayed in the first floating window, content of the fifth page is the same as content of the fourth page, a sixth page is displayed in the second floating window, and content of the sixth page is the same as content of the third page.

In a possible implementation, after the displaying a fourth page in the first window, the method further includes: receiving a first dragging input for the second window; and in response to the first dragging input, displaying a desktop in the second display area, displaying the first window in the first display area, and displaying a third floating window on the display screen of the electronic device in a floating manner; or in response to the first dragging input, displaying the fourth page in full screen, and displaying a third floating window on the fourth page in a floating manner, where a seventh page is displayed in the third floating window, and content of the seventh page is the same as content of the third page.

In a possible implementation, the method further includes: displaying a third interface; displaying a fourth floating window on the third interface in a floating manner, where a twelfth page is displayed in the fourth floating window; receiving a fourteenth input for the twelfth page, and in response to the fourteenth input, creating a fifth floating window, and displaying a thirteenth page in the fifth floating window; and after detecting a fifteenth input for locking the fourth floating window, receiving a sixteenth input for the twelfth page, and displaying a fourteenth page in the fourth floating window in response to the sixteenth input. In some application scenarios, after the fourth floating window is locked, and a seventeenth input for opening a sixth floating window is received, the sixth floating window is displayed at a lower layer than the fourth floating window in response to the seventeenth input. In this way, the locked floating window can be always displayed at an uppermost layer of the display screen of the electronic device, and is not minimized.

In a possible implementation, the method further includes: displaying a fourth interface, where a first card is displayed on the fourth interface, the first card includes first function information, and the first function information is used to trigger to display a first specified page; and after detecting an eighteenth input for locking the first card, receiving a nineteenth input for the first function information, and displaying the first specified page in an area of the first card in response to the nineteenth input. In this way, a page to jump to may be displayed in the locked card.

According to a second aspect, this application provides a display method, including: displaying an interface of a first application, where the interface of the first application includes a first page and a second page, the first page is displayed in a first display area on an electronic device, the second page is displayed in a second display area on the electronic device, and the second page is a sub page of the first page; receiving a ninth input for the second page; in response to the ninth input, displaying the second page in the first display area, and displaying an eighth page in the second display area, where the eighth page is a sub page of the second page; after detecting a tenth input for locking the eighth page, receiving an eleventh input for opening a new page of the eighth page; and displaying a ninth page in the first display area in response to the eleventh input. In this way, the electronic device can display a newly opened page when displaying the locked page.

In a possible implementation, the electronic device displays a third interface; displays a seventh floating window on the third interface in a floating manner, where a fifteenth page is displayed in the seventh floating window; receives a twentieth input for the fifteenth page, and displays a sixteenth page in the seventh floating window in response to the twentieth input; and after detecting a twenty-first input for locking the sixteenth page, receives a twenty-second input for the sixteenth page, and in response to the twenty-second input, creates an eighth floating window, and displays a seventeenth page in the eighth floating window.

In a possible implementation, the method further includes: displaying a fourth interface, where a first card is displayed on the fourth interface, the first card includes first function information, and the first function information may be used to trigger to display a first specified page; after detecting a twenty-third input for locking the first function information, receiving a twenty-fourth input for the first function information, and displaying a third lock symbol in response to the twenty-fourth input, where the third lock symbol indicates that the first function information is locked; and when detecting a twenty-fifth input for opening the first specified page, displaying a second card, and displaying the first specified page on a sixth card; displaying the first specified page in full screen, and displaying the first card on the first specified page, where the first card displays the first function information; or displaying a pop-up window near the first card, and displaying the first specified page in the pop-up window.

According to a third aspect, this application provides a display method, including: displaying a second interface, where the second interface includes a first interface element, and the first interface element is used to trigger to display a third interface; receiving a twelfth input for locking the first interface element; displaying a second lock symbol in response to the twelfth input, where the second lock symbol indicates that the first interface element is locked; receiving a thirteenth input for the second interface; and in response to the thirteenth input, displaying a fourth interface, and displaying the first interface element on the fourth interface; or in response to the thirteenth input, displaying a tenth page in a third display area on a display screen of an electronic device, and displaying an eleventh page in a fourth display area on the display screen of the electronic device, where the eleventh page includes the first interface element. In this way, the electronic device may jump to, at any time, a page that is triggered by the locked interface element to be displayed, to reduce an operation step of page switching.

According to a fourth aspect, this application provides an electronic device, including one or more processors, a display screen, and one or more memories, where the display screen, the one or more memories, and the one or more processors are coupled, the one or more memories are configured to store computer program code, the computer program code includes computer instructions, and when the one or more processors execute the computer instructions, the electronic device is enabled to perform the display method in any one of the possible implementations of the first aspect.

According to a fifth aspect, this application provides an electronic device, including one or more processors, a display screen, and one or more memories, where the display screen, the one or more memories, and the one or more processors are coupled, the one or more memories are configured to store computer program code, the computer program code includes computer instructions, and when the one or more processors execute the computer instructions, the electronic device is enabled to perform the following operations: displaying an interface of a first application, where the interface of the first application includes a first page and a second page, the first page is displayed in a first display area on the electronic device, the second page is displayed in a second display area on the electronic device, and the second page is a sub page of the first page; receiving a ninth input for the second page; in response to the ninth input, displaying the second page in the first display area, and displaying an eighth page in the second display area, where the eighth page is a sub page of the second page; after detecting a tenth input for locking the eighth page, receiving an eleventh input for opening a new page of the eighth page; and displaying a ninth page in the first display area in response to the eleventh input.

According to a sixth aspect, this application provides an electronic device, including one or more processors, a display screen, and one or more memories, where the display screen, the one or more memories, and the one or more processors are coupled, the one or more memories are configured to store computer program code, the computer program code includes computer instructions, and when the one or more processors execute the computer instructions, the electronic device is enabled to perform the following operations: displaying a second interface, where the second interface includes a first interface element, and the first interface element is used to trigger to display a third interface; receiving a twelfth input for locking the first interface element; displaying a second lock symbol in response to the twelfth input, where the second lock symbol indicates that the first interface element is locked; receiving a thirteenth input for the second interface; and in response to the thirteenth input, displaying a fourth interface, and displaying the first interface element on the fourth interface; or in response to the thirteenth input, displaying a tenth page in a third display area on the display screen of the electronic device, and displaying an eleventh page in a fourth display area on the display screen of the electronic device, where the eleventh page includes the first interface element.

According to a seventh aspect, an embodiment of this application provides a computer storage medium, including computer instructions. When the computer instructions are run on an electronic device, a communication apparatus is enabled to perform the display method according to any one of the possible implementations of the first aspect.

According to an eighth aspect, an embodiment of this application provides a computer storage medium, including computer instructions. When the computer instructions are run on an electronic device, a communication apparatus is enabled to perform the display method according to any one of the possible implementations of the second aspect.

According to a ninth aspect, an embodiment of this application provides a computer storage medium, including computer instructions. When the computer instructions are run on an electronic device, a communication apparatus is enabled to perform the display method according to any one of the possible implementations of the third aspect.

DETAILED DESCRIPTION OF ILLUSTRATIVE EMBODIMENTS

The technical solutions according to embodiments of this application are clearly and completely described in the following with reference to the accompanying drawings. In descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

In some application scenarios, after receiving an operation performed by a user to open a specified application (for example, a notepad application, a communication application, or a shopping application), an electronic device may concurrently display two or more pages of the application on a display screen in response to the operation.

In some other application scenarios, after receiving an operation performed by a user to open a specified application (for example, a notepad application, a communication application, or a shopping application), an electronic device independently displays a specified page of the specified application on a display screen in response to the operation. In some embodiments, in response to an operation performed by the user to open a new page for the specified page, the electronic device may concurrently display two or more pages of the specified application on the display screen of the electronic device by using a screen splitting function. For example, the electronic device may concurrently display two pages of the application via App Multiplier. The electronic device may display the specified page (for example, a home page of the application) of the application on a left half area of the display screen, and display a sub page of the specified page on a right half area of the display screen. For details about App Multiplier, refer to content of the website (https://consumer.huawei.com/en/support/content/zh-cn00770975/).

Figure 1A:
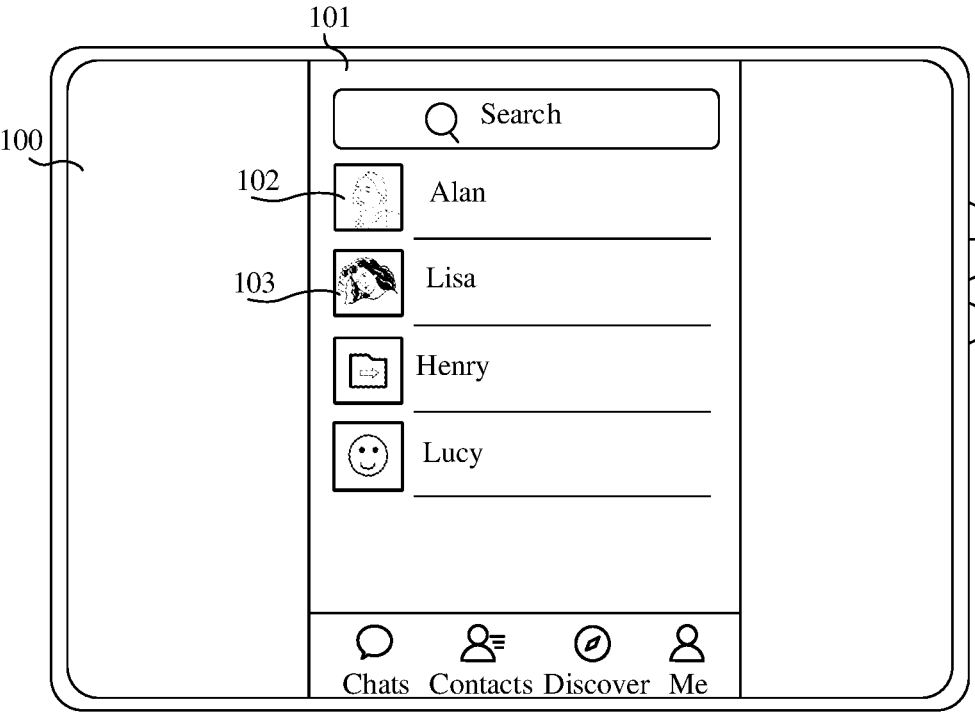
FIG. 1A to FIG. 1C are schematic diagrams of a group of interfaces according to embodiments of this application.

For example, as shown in FIG. 1A, the electronic device displays a communication application interface 100. The communication application interface 100 may include a contact page 101. The contact page 101 may be a home page of a communication application. A contact display area may be displayed on the contact page 101. A plurality of contact icons (for example, a contact icon 102 and a contact icon 103) may be displayed in the contact display area, and the contact icon may be used to trigger to display an instant messaging page corresponding to the contact icon. Optionally, the contact page may further include an icon like a search bar.

Figure 1B:
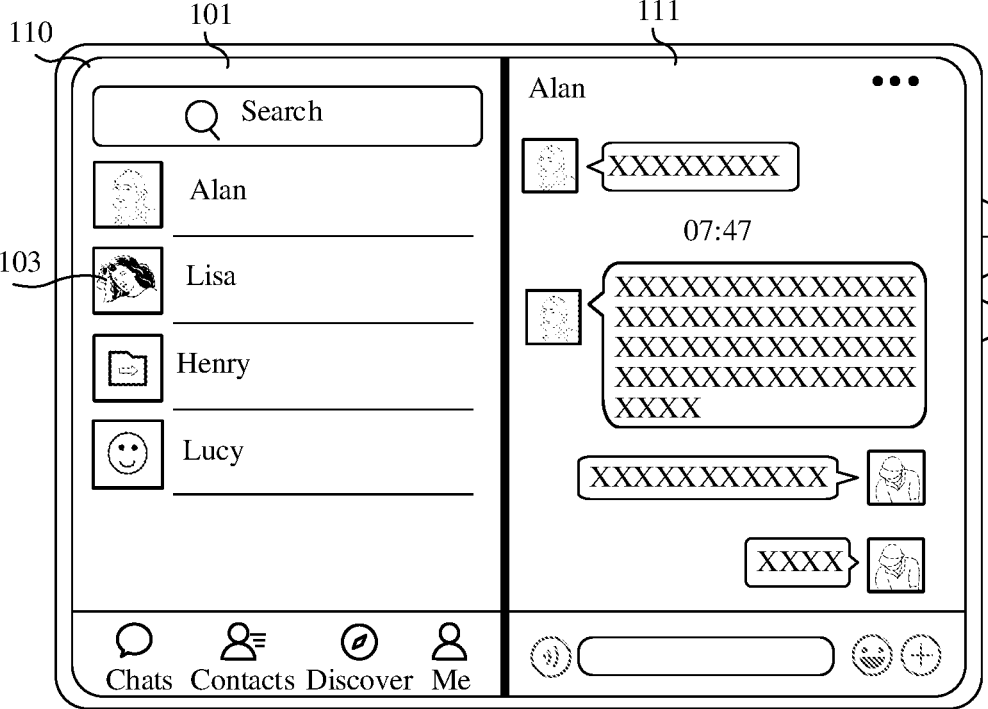

In response to an operation (for example, tap) performed by the user on the contact icon 102, the electronic device may display a communication application interface 110 shown in FIG. 1B. The communication application interface 110 may include a contact page 101 and an instant messaging page 111. The instant messaging page 111 is a sub page of the contact page 101. The instant messaging page 111 may include a dialog box, an enter box, and the like. The instant messaging page 111 may be used to chat with a contact "Alan". Optionally, the instant messaging page 111 may further include an emoticon control, a voice control, more controls, and the like.

The electronic device may receive an operation (for example, tap) performed by the user on a contact icon 103 of the communication application interface 110. In response to the operation, the electronic device 100 may display a communication application interface 120 shown in FIG. 1C.

Figure 1C:
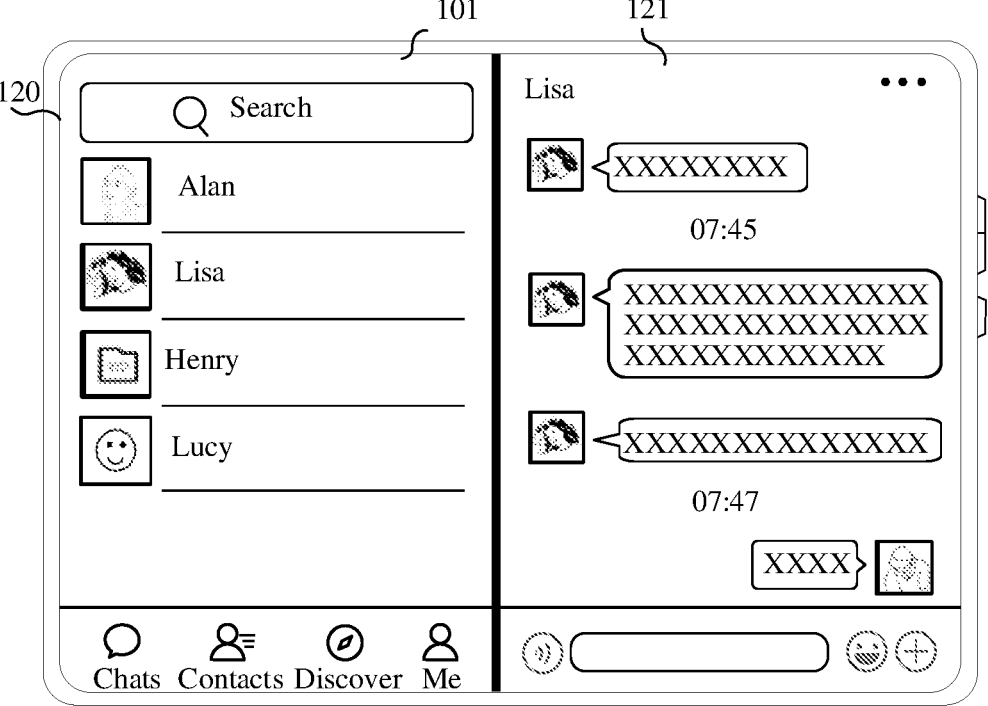

As shown in FIG. 1C, the communication application interface 120 may include a contact page 101 and an instant messaging page 121. The instant messaging page 121 is a sub page of the contact page 101. The instant messaging page 121 may include a dialog box, an enter box, and the like. The instant messaging page 121 may be used to chat with a contact "Lisa". Optionally, the instant messaging page 121 may further include an emoticon control, a voice control, more controls, and the like.

In this way, the electronic device may display a page on one side of the display screen, and display a sub page of the page on the other side of the display screen. Because the electronic device cannot concurrently display two or more pages at a same layer, screen utilization is not high. A page itself is a page that is at a same layer as the page. For example, the contact page 101 and the contact page 101 are pages at a same layer. Sub pages of a same page are also pages at a same layer. For example, the instant messaging page 111 and the instant messaging page 121 are two pages at a same layer, and both the instant messaging page 111 and the instant messaging page 121 are sub pages of the contact page 101. The electronic device may be the electronic device 100.

Embodiments of this application provide a display method. An electronic device may display an interface of a first application, where the interface of the first application includes a first window and a second window, a first page of the first application is displayed in the first window, and a second page of the first application is displayed in the second window. The second page is a sub page of the first page. After the electronic device receives a window locking operation of a user, if the electronic device receives an operation performed by the user on a new page open control in the first page, the electronic device may display a third page in the first window in response to the operation. The third page is a sub page of the first page. The first window may be explained as a display area on a display screen of the electronic device, and the electronic device may display a specified page, for example, the first page, in the display area. Similarly, the second window may also be explained as a display area on the display screen of the electronic device. In this way, the electronic device can do appropriate user interface configuration, and concurrently display two pages at a same layer, to improve screen utilization of the electronic device. This helps the user to concurrently process two tasks, to improve processing efficiency.

The following describes an electronic device 100 provided in embodiments of this application.

The electronic device 100 may be a tablet computer, a mobile phone, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, and/or a smart city device. A specific type of the electronic device 100 is not specifically limited in embodiments of this application.

Figure 2A:
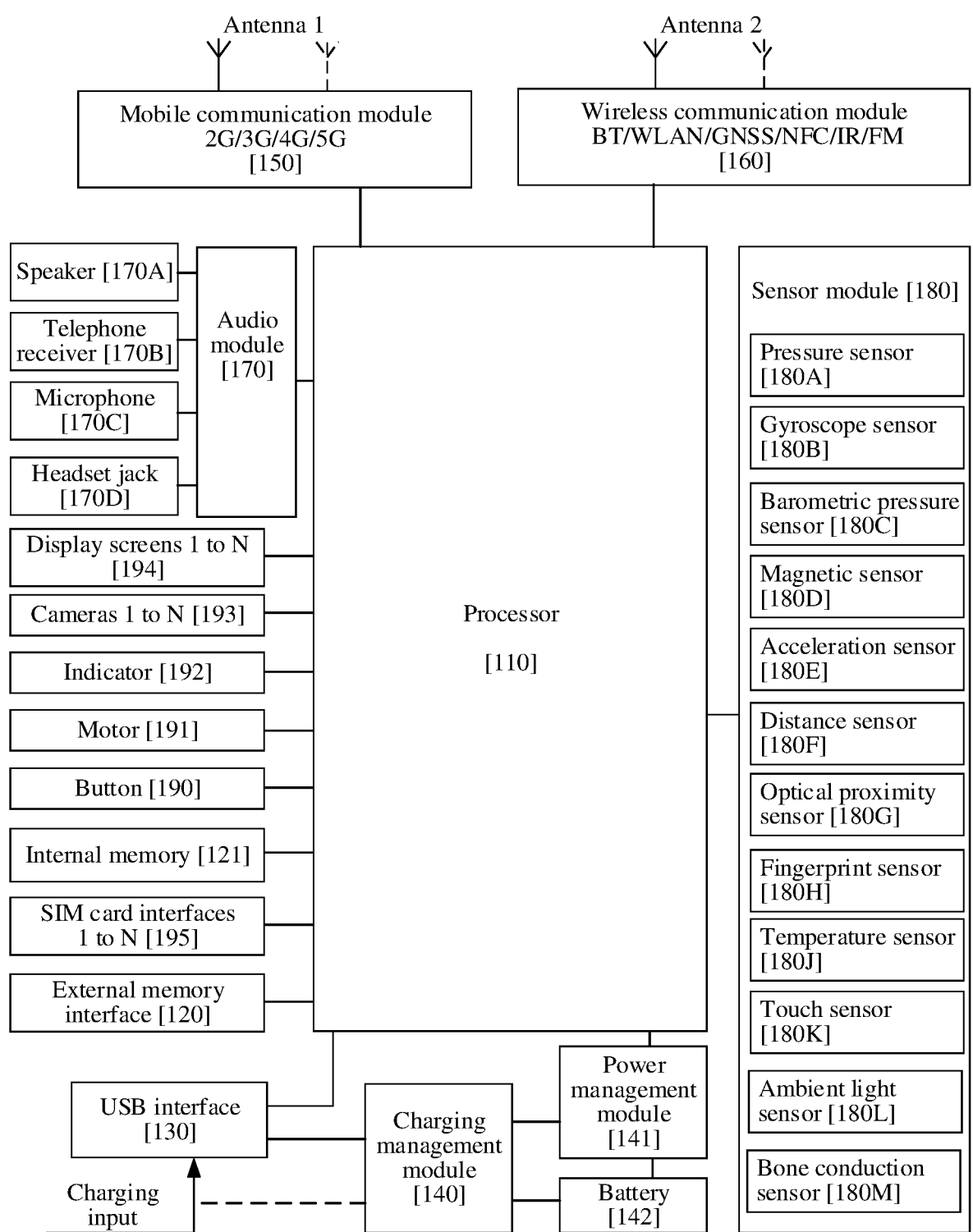
FIG. 2A is a schematic diagram of a structure of an electronic device according to an embodiment of this application.

FIG. 2A is a schematic diagram of a structure of the electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a telephone receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) interface, and/or the like.

It may be understood that an interface connection relationship between the modules shown in this embodiment of the present invention is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of the wired charger through the USB interface 130. In some embodiments of wireless charging, the charging management module 140 may receive a wireless charging input by using a wireless charging coil of the electronic device 100. The charging management module 140 may further supply power to the electronic device 100 by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the electronic device 100 and that includes 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the telephone receiver 170B, or the like), or displays an image or a video by the display 194. In some embodiments, the modem processor may be an independent component. In some other embodiments, the modem processor may be independent of the processor 110, and is disposed in a same component as the mobile communication module 150 or another functional module.

The wireless communication module 160 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave through the antenna 2, performs frequency modulation and filtering on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLO-NASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format like RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, moving picture experts group (moving picture experts group, MPEG)1, MPEG2, MPEG3, and MPEG4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external non-volatile memory, to extend a storage capability of the electronic device 100. The external non-volatile memory communicates with the processor 110 through the external memory interface 120, to implement a data storage function. For example, files such as music and videos are stored in the external non-volatile memory.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a non-volatile memory, for example, at least one magnetic disk storage device, a flash memory, or a universal flash storage (universal flash storage, UFS).

The electronic device 100 may implement an audio function, for example, music playing and recording, through the audio module 170, the speaker 170A, the telephone receiver 170B, the microphone 170C, the headset jack 170D, the application processor, and the like.

The audio module 170 is configured to convert digital audio information into an analog audio signal for output, and is also configured to convert an analog audio input into a digital audio signal.

The speaker 170A, also referred to as a "loudspeaker", is configured to convert an audio electrical signal into a sound signal.

The telephone receiver 170B, also referred to as an "earpiece", is configured to convert an audio electrical signal into a sound signal.

The microphone 170C, also referred to as a "mike" or a "mic", is configured to convert a sound signal into an electrical signal.

When the pressure sensor 180A is configured to sense a pressure signal, the pressure signal may be converted into an electrical signal. In some embodiments, the pressure sensor 180A may be disposed on the display 194. The gyroscope sensor 180B may be configured to determine a moving posture of the electronic device 100. The barometric pressure sensor 180C is configured to measure barometric pressure. The magnetic sensor 180D includes a Hall effect sensor, and may detect opening and closing of the flip leather case by using the magnetic sensor 180D. The acceleration sensor 180E may detect accelerations in various directions (usually on three axes) of the electronic device 100. The distance sensor 180F is configured to measure a distance. The optical proximity sensor 180G may also be used in a smart cover mode or a pocket mode to automatically perform screen unlocking or locking. The ambient light sensor 180L is configured to sense ambient light brightness. The fingerprint sensor 180H is configured to collect a fingerprint. The temperature sensor 180J is configured to detect a temperature. The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 at a location different from that of the display 194. The bone conduction sensor 180M may obtain a vibration signal. The button 190 includes a power button, a volume button, and the like. The motor 191 may generate a vibration prompt. The indicator 192 may be an indicator light, and may be configured to indicate a charging status and a power change, or may be configured to indicate a message, a missed call, a notification, and the like. The SIM card interface 195 is configured to connect to a SIM card.

The following describes a diagram of a software structure of an electronic device 100 according to an embodiment of this application.

A software system of the electronic device 100 may use a layered architecture, an event-driven architecture, a micro-kernel architecture, a micro service architecture, or a cloud architecture. In this embodiment of the present invention, an Android system of a layered architecture is used as an example to describe the software structure of the electronic device 100.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

Figure 2B:
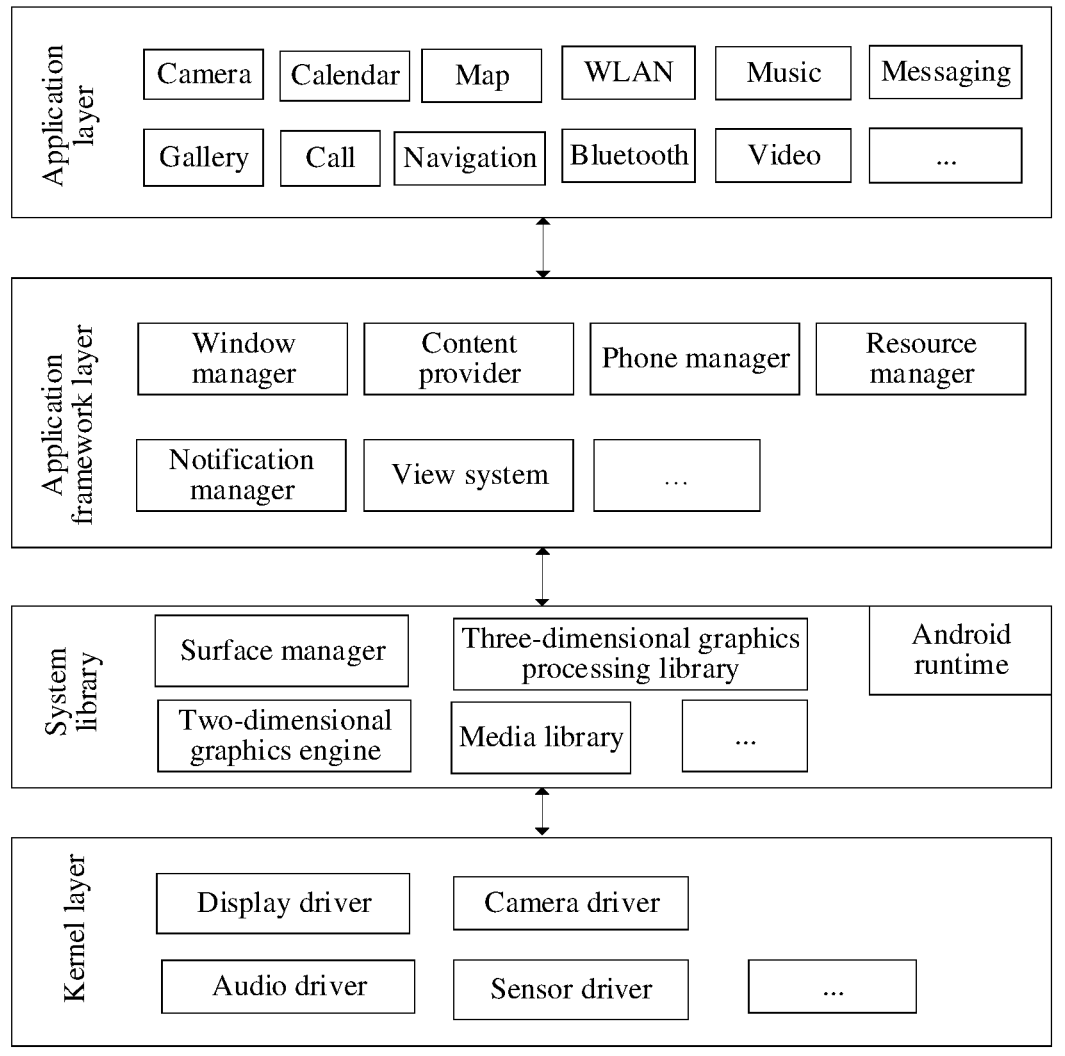
FIG. 2B is a diagram of a software structure of an electronic device according to an embodiment of this application.

As shown in FIG. 2B, the application packages may include applications such as Camera, Gallery, Calendar, Call, Map, Navigation, WLAN, Bluetooth, Music, Video, and Messaging.

The application framework layer provides an application programming interface (application programming interface, API) and a programming framework for an application at the application layer. The application framework layer includes some predefined functions.

As shown in FIG. 2B, the application framework layer may include a window manager, a content provider, a view system, a phone manager, a resource manager, a notification manager, and the like.

The window manager is configured to manage a window program. The window manager may obtain a size of the display screen, determine whether there is a status bar, perform screen locking, take a screenshot, and the like.

The content provider is configured to: store and obtain data, and enable the data to be accessed by the application. The data may include a video, an image, an audio, calls that are made and answered, a browsing history and bookmarks, an address book, and the like.

The view system includes visual controls such as a control for displaying a text and a control for displaying an image. The view system may be configured to construct applications. A display interface may include one or more views. For example, a display interface including an SMS message notification icon may include a text display view and an image display view.

The phone manager is configured to provide a communication function for the electronic device 100, for example, management of a call status (including answering, declining, or the like).

The resource manager provides various resources such as a localized character string, an icon, an image, a layout file, and a video file for the application.

The notification manager enables an application to display notification information in the status bar, and may be configured to convey a notification message. The displayed information may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an alert sound is played, the electronic device 100 vibrates, or the indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer are run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording in a plurality of commonly used audio and video formats, and static image files. The media library may support a plurality of audio and video encoding formats, such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following specifically describes, with reference to application scenarios, a display method provided in embodiments of this application.

In some application scenarios, an electronic device 100 may display an interface of a first application, where the interface of the first application includes at least two windows. The window is a display area on a display screen of the electronic device 100. Specified content may be displayed in the display area. For example, a page of the first application may be displayed in the window. The at least two windows may include a first window and a second window. A first page of the first application is displayed in the first window, and a second page of the first application is displayed in the second window. The second page is a sub page of the first page. When the first window and the second window are not locked, the electronic device 100 may receive an operation performed by a user on a new page open control in the first window, and display a third page in the second window in response to the operation, where the third page is a sub page of the first page. When the first window and the second window are locked, the electronic device 100 may receive an operation performed by a user on a new page open control in the first window, and display a third page in the first window in response to the operation, where the third page is a sub page of the first page.

It should be noted that, when the electronic device 100 displays a specified page in the first window, any page in the application may be displayed in the second window (where the any page may be the specified page, a page at a same layer as the specified page, a page at a different layer from the specified page, or the like). Similarly, when the electronic device 100 displays a specified page in the second window, any page in the application may be displayed in the first window. In this way, the electronic device 100 can configure an interface layout more flexibly, to improve screen utilization. Further, it is convenient for the user to concurrently process transactions on two pages at a same layer.

The electronic device 100 may divide the display screen into two or more display areas. Two display areas: a display area 1 and a display area 2 are used as an example. For example, the display area 1 may be a left half area of the display screen of the electronic device 100, and the display area 2 may be a right half area of the display screen of the electronic device 100. The electronic device 100 may display the first window in the display area 1, and display the second window in the display area 2. In some embodiments, the display areas 1 and 2 may alternatively be upper and lower areas of the display screen.

Figure 3A:
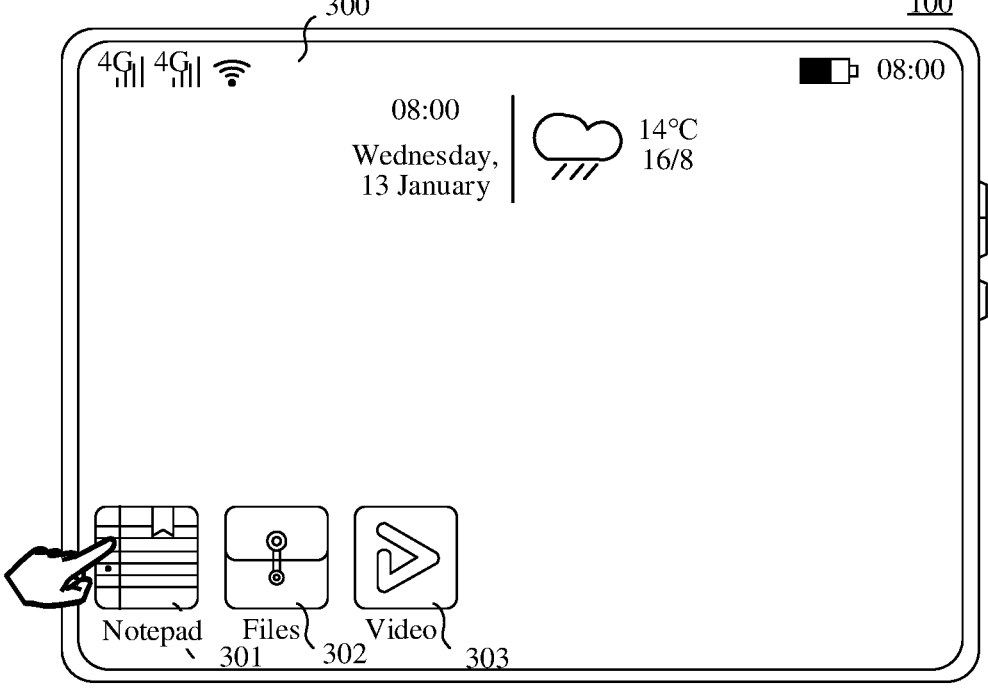
FIG. 3A to FIG. 3F are schematic diagrams of a group of interfaces according to embodiments of this application.

For example, as shown in FIG. 3A, the electronic device 100 may display a desktop 300. The desktop 300 may include a plurality of application icons (for example, a notepad application icon 301, a files application icon 302, and a video application icon 303). A page may further include a card (for example, a weather application card or a date application card). The card may display some function information of a specified application, and the some function information may be used to trigger the electronic device 100 to display a specified page of the specified application. The card may be displayed on the desktop or another specified shortcut interface (for example, HiBoard or a service center), and the card may be added or deleted by the user. Some cards may be referred to as window widgets (widgets). Optionally, a status bar including an icon like a power identifying icon may be further displayed at the top of the desktop 300. The notepad application icon 301 may be used to trigger to display an interface of a notepad application.

The electronic device 100 may receive an operation (for example, tap) performed by the user on the notepad application icon 301. In response to the operation, the electronic device 100 may display a notepad application interface 310 shown in FIG. 3B.

Figure 3B:
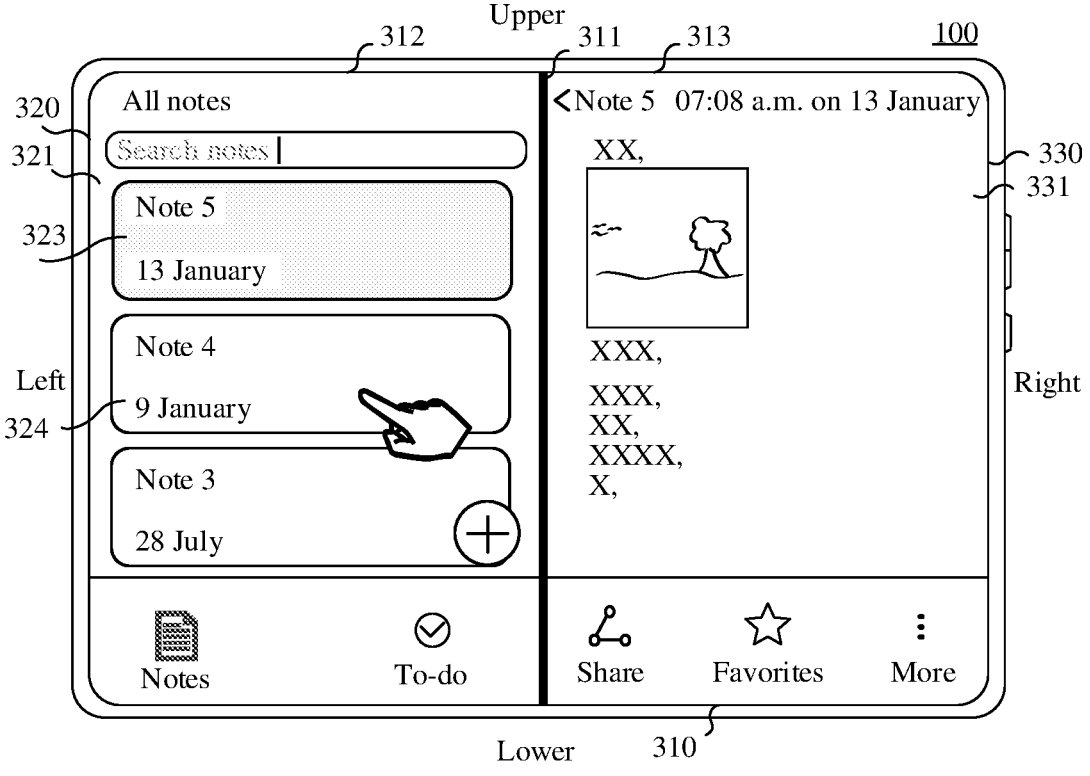

As shown in FIG. 3B, the notepad application interface 310 may include a window 320 and a window 330. The window 320 may be displayed in a display area 312 on the display screen of the electronic device 100, and the window 330 may be displayed in a display area 313 on the display screen of the electronic device 100. For example, the display area 312 may be a left half area of the display screen, and the display area 313 may be a right half area of the display screen. In some other embodiments, the notepad application interface 310 may further include a division line 311. The division line 311 may be displayed at a junction of the window 320 and the window 330. The division line 311 may be used to trigger the electronic device 100 to receive and respond to a user input (for example, dragging to the left) for changing horizontal lengths of the window 320 and the window 330. Optionally, the division line 311 may be further used to trigger the electronic device 100 to receive and respond to a user input for locking the window 320 and the window 330.

A note event page 321 may be displayed in the window 320, and the note event page 321 may include a note control, a to-do control, and a note display area. The note control may be configured to trigger the electronic device 100 to display the note display area. The note display area may include note events (for example, a "note 5" event 323, a "note 4" event 324, and a "note 3" event) that have been added by the user, a note adding control, and a note search bar. The note adding control may be configured to trigger the electronic device 100 to receive and respond to a user input for adding a note event. The to-do control is configured to trigger the electronic device 100 to display a to-do event display area. The note search bar may be used to trigger the electronic device 100 to receive and respond to a user input for displaying some note events. The note event may be used to trigger the electronic device 100 to display a note editing page corresponding to the note event. The electronic device 100 may display, in the window 330 by default, a note editing page corresponding to a note event whose editing time is closest to current time. For example, if the note event whose editing time is closest to the current time is the "note 5" event 323, the electronic device 100 may display a note editing page 331 corresponding to the "note 5" event 323. The note editing page 331 is a sub page of the note event page 321. Optionally, the note editing page 331 may further include a share control, a favorites control, a title enter area, a note enter area, and the like. The share control may be configured to trigger the electronic device 100 to display a page for sharing the "note 5" event. The favorites control may be configured to trigger the electronic device 100 to add the "note 5" event to favorites. The title enter area may be used to receive a note title entered by the user. The note enter area may be used to receive note content entered by the user.

The electronic device 100 may receive an operation (for example, tap) performed by the user on the "note 4" event 324. In response to the operation, the electronic device 100 may display a notepad application interface 340 shown in FIG. 3C.

Figure 3C:
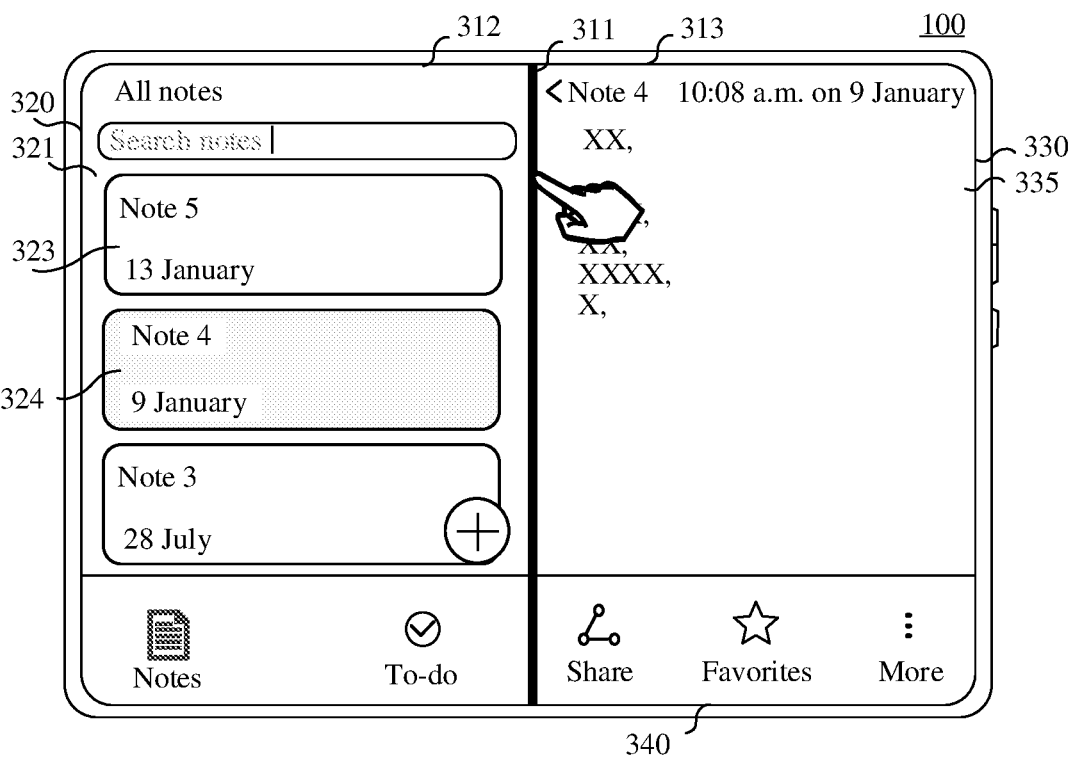

As shown in FIG. 3C, the electronic device 100 may display the notepad application interface 340. The notepad application interface 340 may include a division line 311, a window 320, and a window 330. A note editing page 335 may be displayed in the window 330, and the note editing page 335 is a sub page of a note event page 321. The note editing page 335 may include a share control, a favorites control, a title enter area, a note enter area, and the like. The share control may be configured to trigger the electronic device 100 to display a page for sharing a "note 4" event. The favorites control may be configured to trigger the electronic device 100 to add the "note 4" event to favorites. For a part that is of the notepad application interface 340 and that is not described in detail, refer to the embodiment shown in FIG. 3B. Details are not described herein again.

It can be learned from the foregoing that, when the window 320 and the window 330 are not locked, the electronic device 100 can only independently display the note editing page 331 shown in FIG. 3B or the note editing page 335 shown in FIG. 3C. After both the window 320 and the window 330 are locked, the note editing page 331 and the note editing page 335 may be concurrently displayed in the window 320 and the window 330 of the electronic device 100. In this way, the electronic device 100 can configure an interface layout more flexibly, and display two pages at a same layer in two displayed windows, so that the user can concurrently process transactions on the two pages, to improve efficiency.

In some embodiments, the electronic device 100 may receive an operation (for example, tap) performed by the user on the division line 311. In response to the operation, the electronic device 100 may display a notepad application interface 350 shown in FIG. 3D.

Figure 3D:
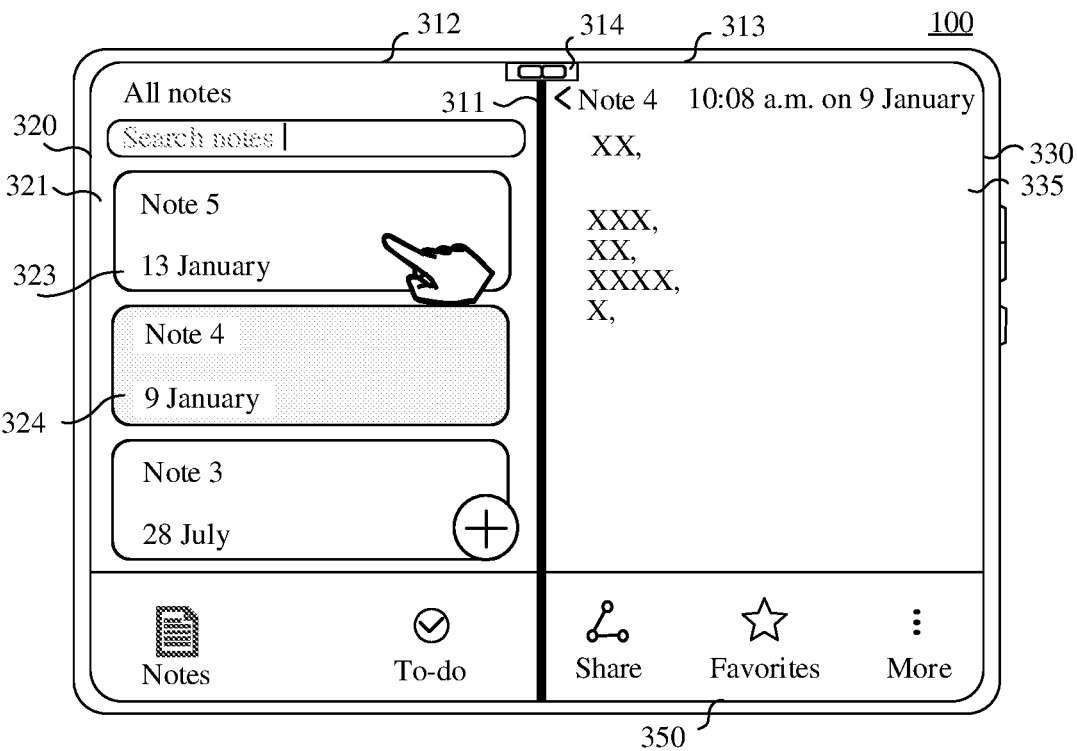

As shown in FIG. 3D, the electronic device 100 may display the notepad application interface 350. In some embodiments, the notepad application interface 350 may include a lock icon 314 and the like. The lock icon 314 may be used to prompt the user that a window 320 and a window 330 are locked. The electronic device 100 may display, in the window 320 in response to a page switching operation performed by the user on the window 320, a page obtained after switching of a note event page 321. The electronic device 100 may display, in the window 330 in response to a page switching operation performed by the user on the window 330, a page obtained after switching of a note editing page 335. For a part that is of the notepad application interface 350 and that is not described in detail, refer to the embodiment shown in FIG. 3C. Details are not described herein again.

The electronic device 100 may receive an operation (for example, tap) performed by the user on a "note 5" event 323 on the notepad application interface 350 shown in FIG. 3D. In response to the operation, the electronic device 100 may display a notepad application interface 360 shown in FIG. 3E.

Figure 3E:
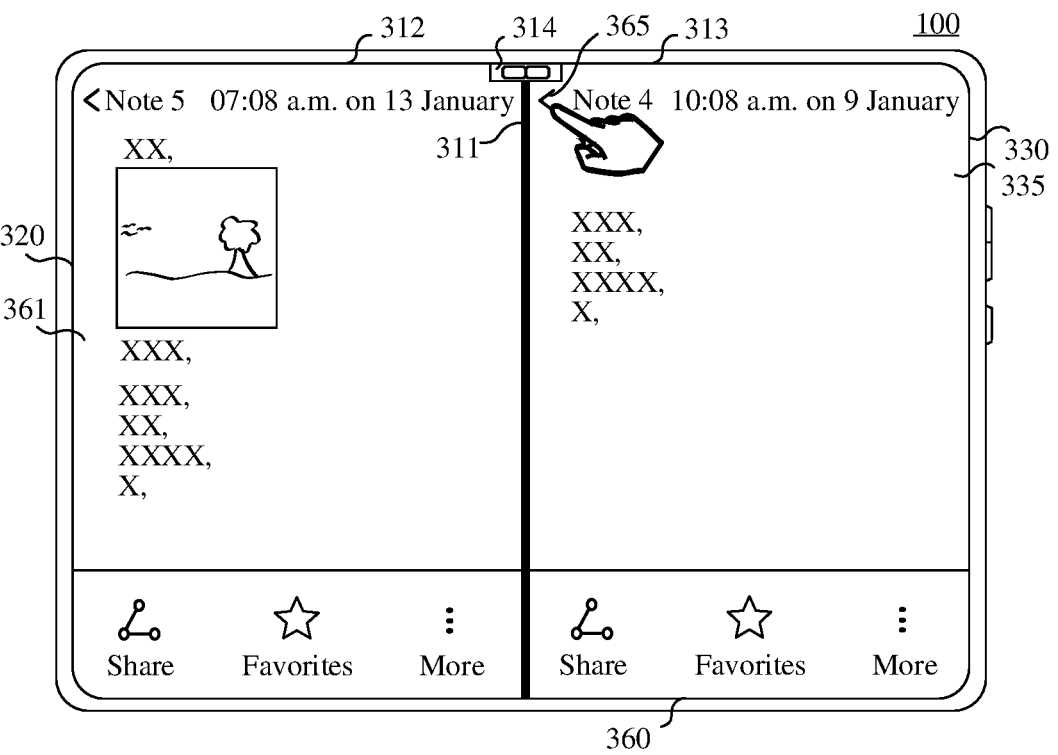

As shown in FIG. 3E, the electronic device 100 may display the notepad application interface 360. The notepad application interface 360 may include a window 320 and a window 330. A note editing page 361 is displayed in the window 320, and a note editing page 335 is displayed in the window 330. In some embodiments, the notepad application interface 360 may further include a division line 311, a lock icon 314, and the like. The electronic device 100 may display, in the window 320 in response to a page switching operation performed by the user on the window 320, a page obtained after switching of the note editing page 361. For a part that is of the notepad application interface 360 and that is not described in detail, refer to embodiments shown in FIG. 3C and FIG. 3B. Details are not described herein again.

The electronic device 100 may receive an operation (for example, tap) performed by the user on a return icon 365. In response to the operation, the electronic device 100 may display a notepad application interface 370 shown in FIG. 3F.

Figure 3F:
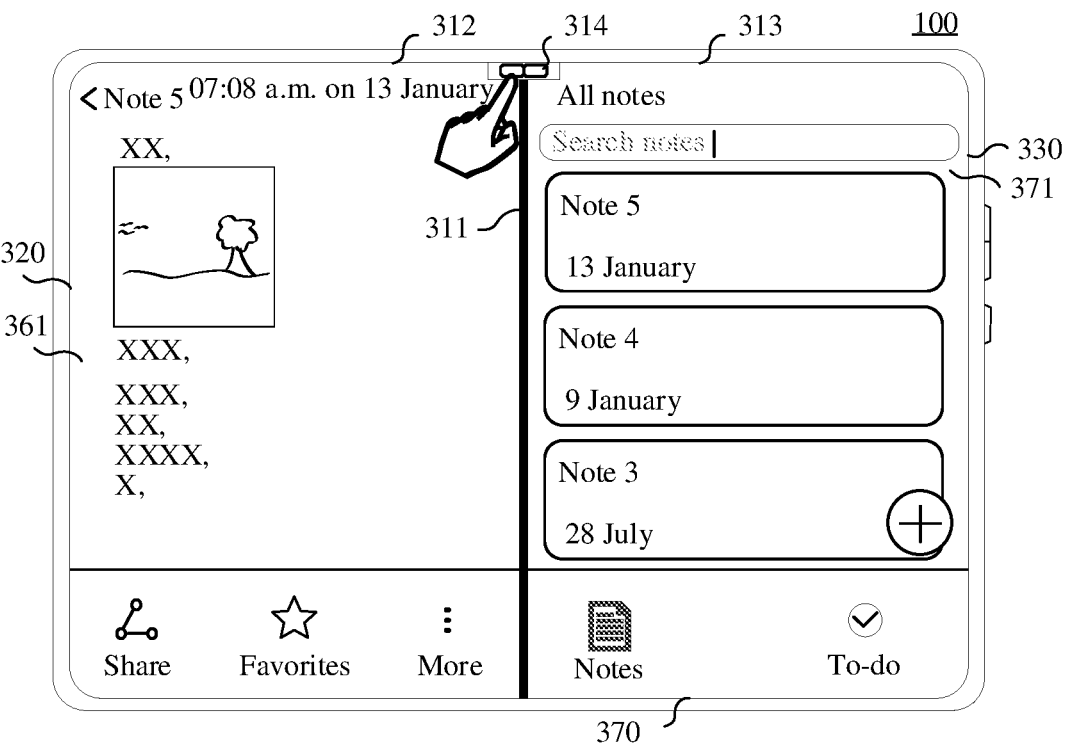

As shown in FIG. 3F, the electronic device 100 may display the notepad application interface 370. The notepad application interface 370 may include a window 320 and a window 330. A note editing page 361 is displayed in the window 320, and a note event page 371 is displayed in the window 330. Content of the note event page 371 is the same as content of the note event page 321 shown in FIG. 3B. Optionally, the notepad application interface 370 may further include a division line 311 and a lock icon 314. The lock icon 314 may be used to prompt the user that the window 320 and the window 330 of the electronic device 100 are in a locked state. For a part that is of the notepad application interface 370 and that is not described in detail, refer to the embodiment shown in FIG. 3B. Details are not described herein again.

In a possible implementation, after locking the first window and the second window, the electronic device 100 may display the third page of the first application in the first window, and display the second page of the first application in the second window, where both the second page and the third page are sub pages of the first page. The electronic device 100 may unlock the first window and the second window in response to a window unlocking operation of the user. The electronic device 100 displays the third page in the first window, and displays the second page in the second window.

After the electronic device 100 unlocks the first window and the second window, if the electronic device 100 receives an operation of opening a sub page of the third page in the first window, the electronic device 100 may display the sub page of the third page in the second window in response to the operation of opening the sub page.

After the electronic device 100 unlocks the first window and the second window, if the electronic device 100 receives an operation of opening a sub page of the second page in the second window, in response to the operation of opening the sub page, the electronic device 100 may display the sub page of the second page in the second window, and the electronic device 100 may display the second page in the first window.

After the electronic device 100 unlocks the first window and the second window, if the electronic device 100 receives an operation of opening a home page of the third page in the first window, in response to the operation of opening the home page, the electronic device 100 may display the first page in the first window, and display the third page in the second window.

After the electronic device 100 unlocks the first window and the second window, if the electronic device 100 receives an operation of opening a home page of the second page in the second window, in response to the operation of opening the home page, the electronic device 100 may display the first page in the first window, and display the second page in the second window.

Optionally, after the electronic device 100 unlocks the first window and the second window, the electronic device 100 may display the first page in the first window, and display the third page in the second window. The third page may be a recently opened page.

In a possible implementation, after locking the first window and the second window, the electronic device 100 may display the first page of the first application in both the first window and the second window. The first page does not have a home page. The electronic device 100 may respond to a window unlocking operation of the user. In response to the window unlocking operation, the electronic device 100 may display the first page in the first window, and display the second page in the second window, where the second page is a sub page of the first page. For example, the second page may be a recently opened sub page in a plurality of sub pages of the first page.

In a possible implementation, after locking the first window and the second window, the electronic device 100 may display the second page of the first application in both the first window and the second window. The second page is a sub page of the first page. The electronic device 100 may respond to a window unlocking operation of the user. In response to the window unlocking operation, the electronic device 100 may display the first page in the first window, and display the second page in the second window.

In a possible implementation, after locking the first window and the second window, the electronic device 100 may display the second page of the first application in the first window, and display the first page of the first application in the second window. The second page is a sub page of the first page. The electronic device 100 may respond to a window unlocking operation of the user. In response to the window unlocking operation, the electronic device 100 may display the first page in the first window, and display the second page in the second window.

When the electronic device 100 receives an operation of opening a sub page of the first page, the electronic device 100 may display the third page in the second window in response to the operation. The third page is a sub page of the first page.

In a possible implementation, after locking the first window and the second window, the electronic device 100 may display the first page of the first application in the first window, and display the second page of the first application in the second window. The second page is a sub page of the first page. The electronic device 100 may respond to a window unlocking operation of the user. The electronic device 100 may unlock the first window and the second window in response to the window unlocking operation of the user. After the electronic device 100 unlocks the first window and the second window, if the electronic device 100 receives an operation of opening a sub page of the first page in the first window, the electronic device 100 may display the third page in the second window in response to the operation of opening the sub page. The third page is a sub page of the first page.

In a possible implementation, the electronic device 100 may display the first window and the second window of the first application. The first window may be displayed in a first display area on the display screen of the electronic device 100, and the first display area may be a left half area of the display screen. The second window may be displayed in a second display area on the display screen of the electronic device 100, and the second display area may be a right half area of the display screen. After the electronic device 100 locks the first window and the second window, when detecting that the display screen is rotated by a preset angle, the electronic device 100 may divide the display screen into a third display area and a fourth display area, display the first window in the third display area, and display the second window in the fourth display area. In this way, it can be ensured that the locked windows are still displayed, based on relative positions of the windows that exist before rotation, on the screen obtained after rotation.

For example, if the electronic device 100 receives an operation performed by the user to turn the display screen left by a preset angle (for example, 45 degrees to 135 degrees), the third display area may be an upper half area of the display screen, and the fourth display area may be a lower half area of the display screen. If the electronic device 100 receives an operation performed by the user to turn the display screen right by a preset angle (for example, 45 degrees to 135 degrees), the third display area may be a lower half area of the display screen, and the fourth display area may be an upper half area of the display screen. If the electronic device 100 receives an operation performed by the user to turn the display screen left/right by a preset angle (for example, 135 degrees to 225 degrees), the third display area may be a right half area of the display screen, and the fourth display area may be a left half area of the display screen.

In a possible implementation, after the electronic device 100 locks the first window and the second window of the first application, if the electronic device 100 receives an operation performed by the user to close the first application, in response to the operation, the electronic device 100 may unlock the first window and the second window, and close the application at the same time. After the electronic device 100 closes the first application, the electronic device 100 receives an operation performed by the user to open the first application. The electronic device 100 may display a third window and a fourth window of the first application in response to the operation. The third window and the fourth window are not locked. In this way, the electronic device 100 unlocks the locked window when closing the application, and when the user enters the application again, the user does not need to perform a window unlocking operation.

In a possible implementation, after the electronic device 100 locks the first window and the second window of the first application, if the electronic device 100 receives an operation performed by the user to close the first application, the electronic device 100 may close the first application in response to the operation of closing the application. After the electronic device 100 closes the first application, the electronic device 100 receives an operation performed by the user to open the first application. The electronic device 100 may display the locked first window and the locked second window in response to the operation. In this way, the locked state of the window can be maintained, and the user can directly use the locked window.

In embodiments of this application, the window locking operation and the window unlocking operation each are not limited to a double-tap operation, and may be a swiping operation on a division line between windows, or an operation of another type. This is not limited herein. In this way, a scenario in which the electronic device 100 switches, due to an accidental touch of the display screen in the window locking operation and the window unlocking operation, a page that is being displayed can be avoided, thereby facilitating a user operation.

Figure 4A:
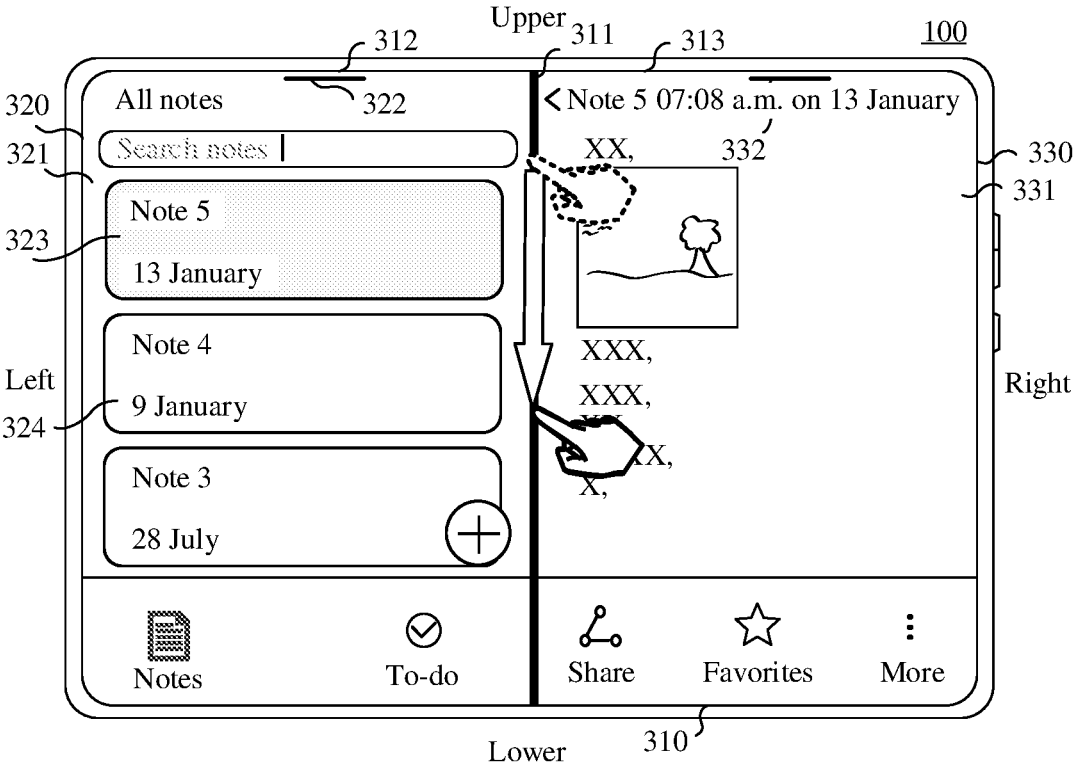
FIG. 4A to FIG. 4J are schematic diagrams of another group of interfaces according to embodiments of this application.

For example, as shown in FIG. 4A, the electronic device 100 may display a notepad application interface 310. For a text description of the notepad application interface 310, refer to the embodiment shown in FIG. 3B. Details are not described herein again.

Figure 4B:
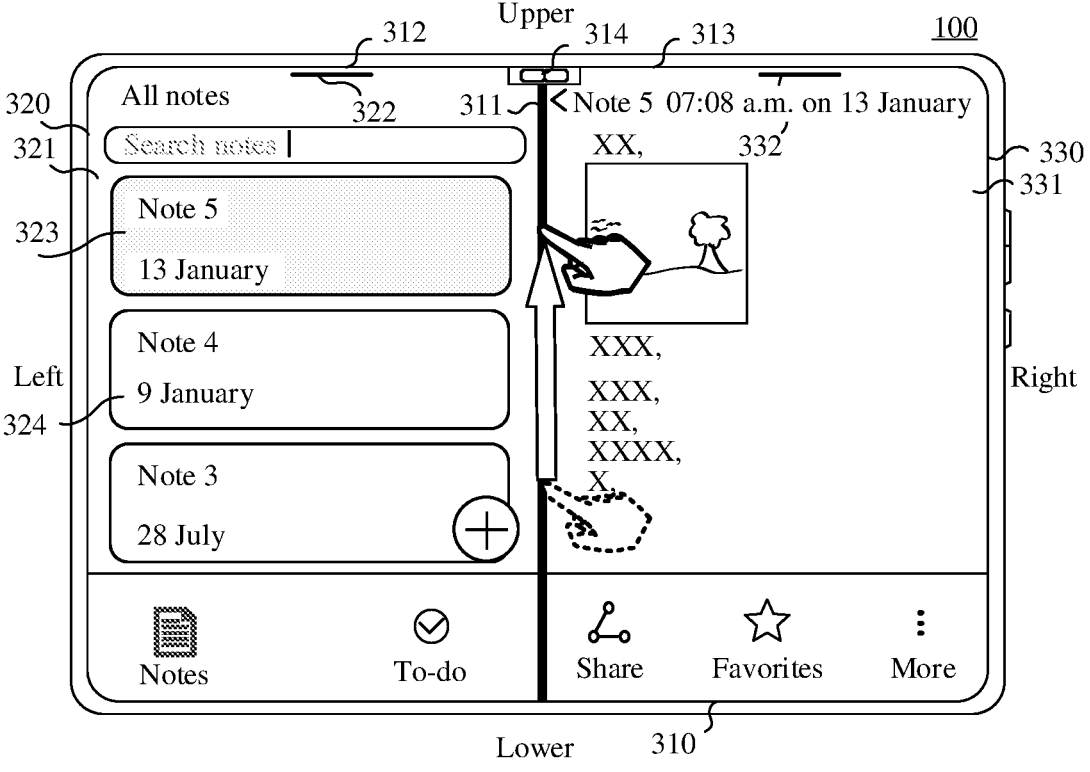

As shown in FIG. 4B, the electronic device 100 may receive a swiping-down input performed by the user on a division line 311 in FIG. 4A. In response to the swiping-down input, the electronic device 100 may lock a window 320 and a window 330, and display a lock icon 314.

Figure 4C:
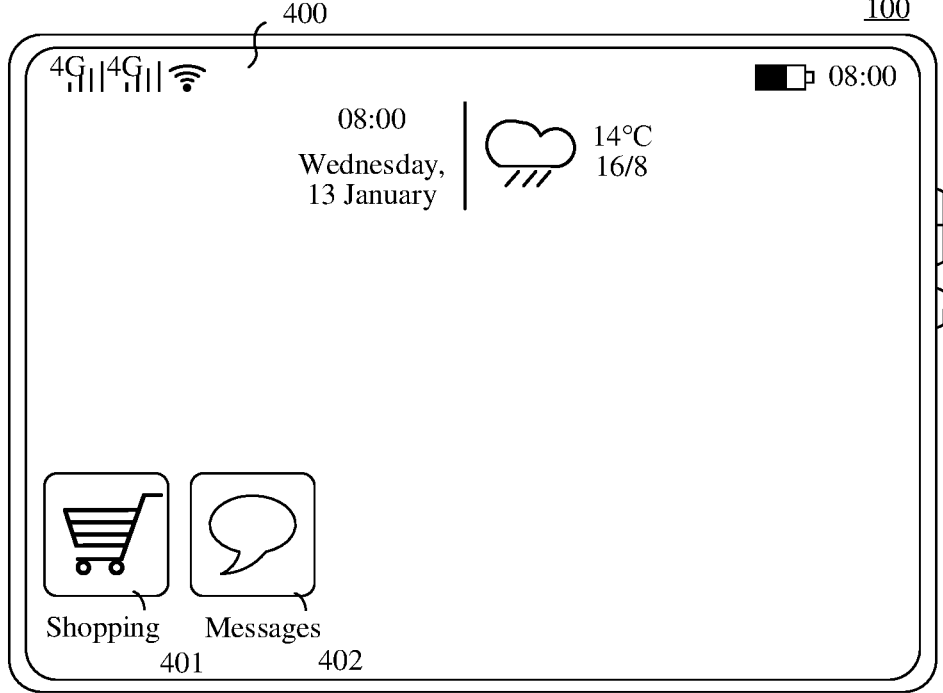

As shown in FIG. 4C, after the electronic device 100 locks a window 320 and a window 330, the electronic device 100 may receive a swiping-up input performed by the user on a division line 311. In response to the swiping-up input, the electronic device 100 may unlock the window 320 and the window 330, and remove a lock icon 314.

Optionally, the electronic device 100 may receive the swiping-up input performed by the user on the division line 311 in FIG. 4A. The electronic device 100 may lock the window 320 and the window 330 in response to the swiping-up input. The electronic device 100 may receive the swiping-up input performed by the user on the division line 311 in FIG. 4A. The electronic device 100 may lock the window 320 and the window 330 in response to the swiping-up input.

In some embodiments, the first application may be a shopping application. The electronic device 100 may display an interface of the shopping application. Two windows are displayed on the interface of the shopping application. The electronic device 100 may lock the two windows in response to a window locking operation (for example, swiping up on a division line area) of the user. The electronic device 100 may concurrently display different pages (for example, commodity details pages) at a same layer in the two windows. In this way, the user can concurrently view detailed information of two commodities on the interface, and intuitively compare prices, parameters, and the like of the two commodities, to facilitate commodity purchasing of the user.

Figure 4D:
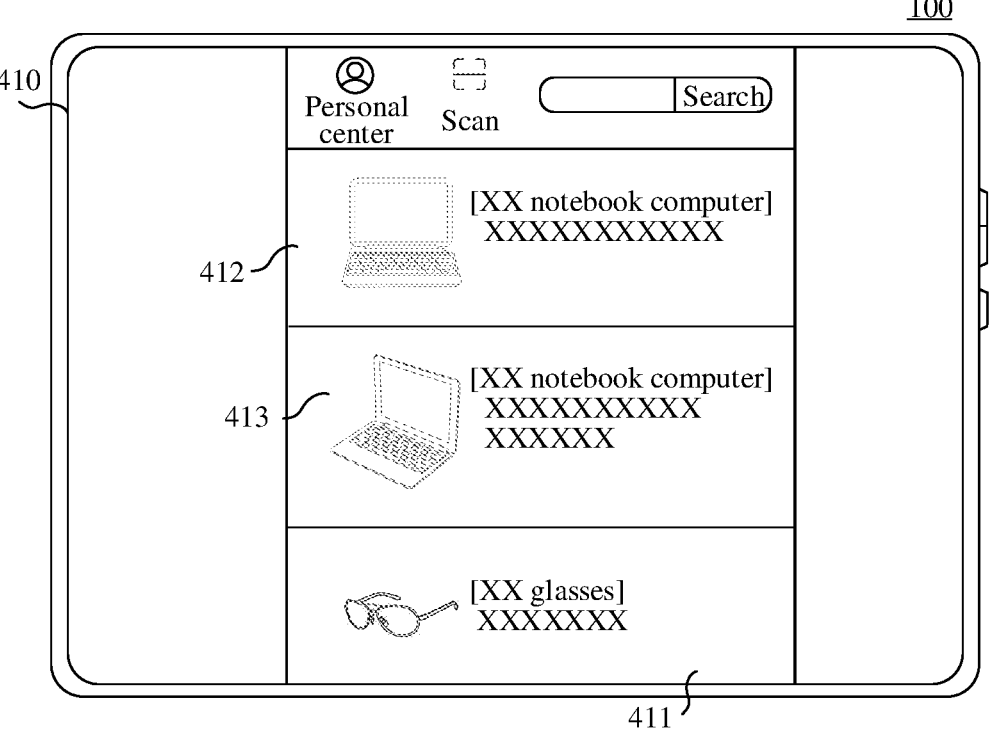

For example, as shown in FIG. 4C, the electronic device 100 displays a desktop 400. The desktop 400 includes a plurality of application icons (for example, a shopping application icon 401 and a messages application icon 402). The electronic device 100 may receive an input (for example, tap) performed by the user on the shopping application icon 401, and display, in response to the input, a shopping application interface 410 shown in FIG. 4D. The shopping application interface 410 includes a commodity recommendation page 411. The commodity recommendation page 411 may include a commodity display area. A plurality of recommended commodity icons (for example, a recommended commodity icon 412 and a recommended commodity icon 413) may be displayed in the commodity display area, and the recommended commodity icon may be used to trigger to display a commodity details page corresponding to the recommended commodity icon. Optionally, the commodity recommendation page 411 may further include a personal center control, a scan control, a commodity search bar, and the like.

Figure 4E:
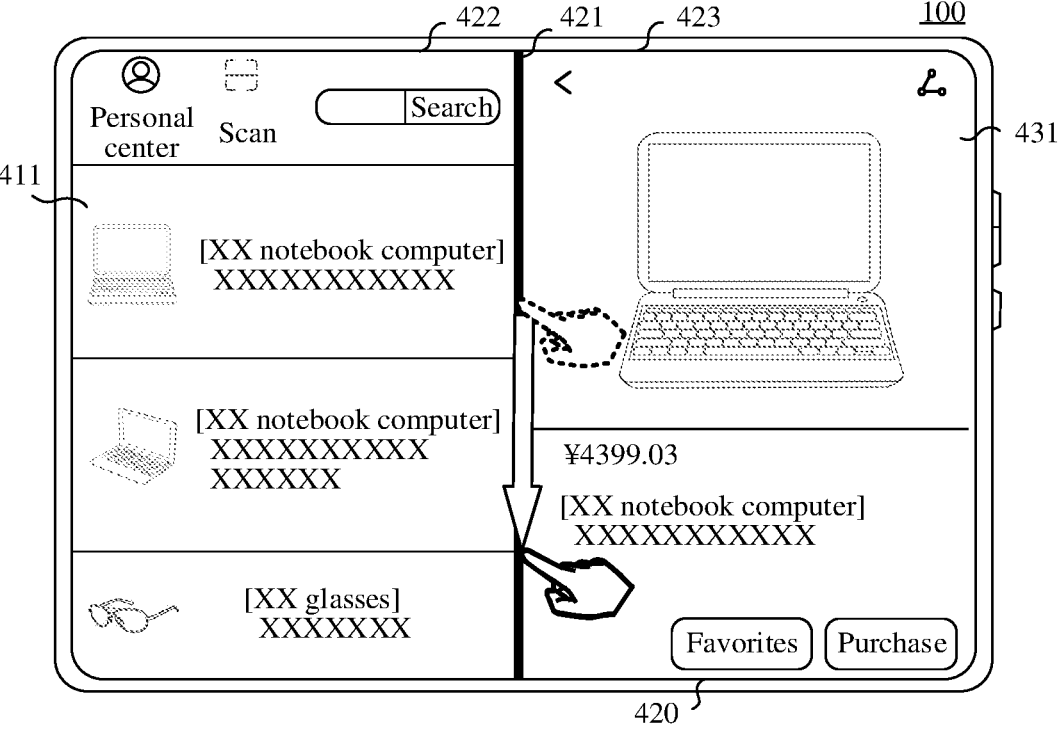

As shown in FIG. 4E, the electronic device 100 may display a shopping application interface 420 in response to an input (for example, tap) performed by the user on a recommended commodity icon 412. The shopping application interface 420 may include a window 422 and a window 423. A commodity recommendation page 411 is displayed in the window 422, and a commodity details page 431 is displayed in the window 420. The commodity details page 431 is a sub page of the commodity recommendation page 411. The commodity details page 431 may include a commodity image, a commodity price, and a commodity detailed description. Optionally, the commodity details page 421 may further include a favorites control, a purchase control, and the like. The commodity details page 431 may be used to display a detailed description of a commodity "XX notebook computer". In some other embodiments, the shopping application interface 420 may further include a division line 421, and the division line 421 may be used to trigger the electronic device 100 to receive and respond to a user input (for example, dragging to the left) for changing horizontal lengths of the window 422 and the window 423. Optionally, the division line 421 may be further used to trigger the electronic device 100 to receive and respond to a user input for locking the window 422 and the window 423.

Figure 4F:
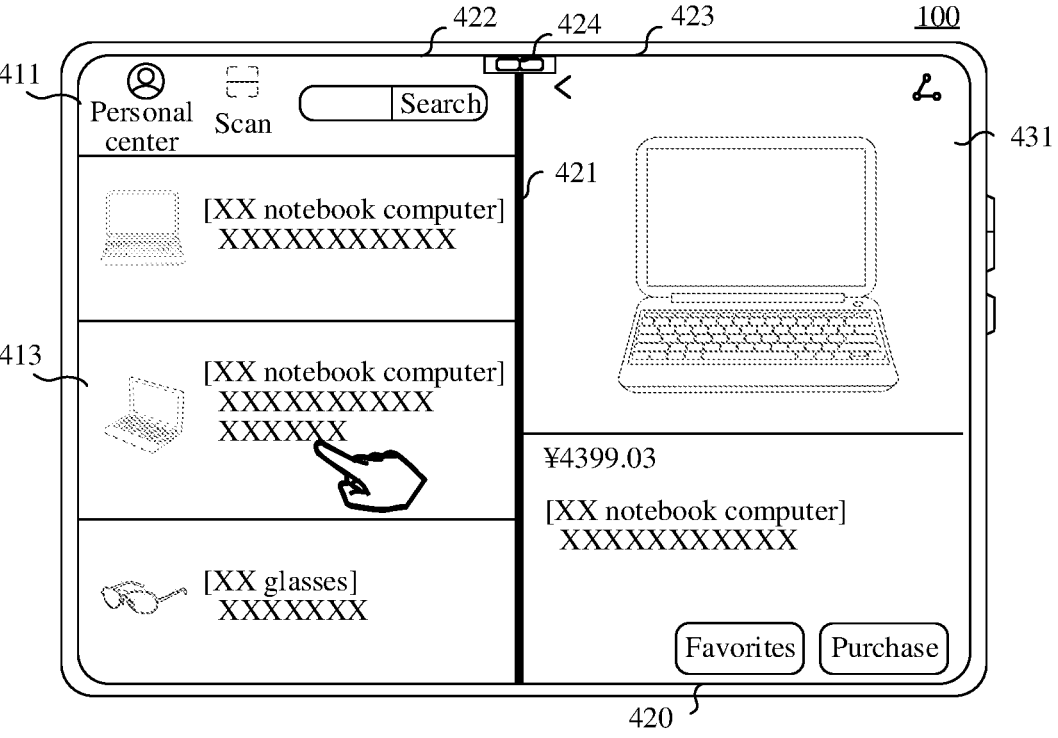

The electronic device 100 may receive a window locking operation (for example, swiping down) of the user. The electronic device 100 may display a lock icon 424 on the shopping application interface 420 in response to the operation, as shown in FIG. 4F. The lock icon 424 may indicate that both a window 410 and a window 420 are locked. The electronic device 100 may display a page to switch to in a specified window in response to a page switching operation performed by the user on a specified page of the specified window.

The electronic device 100 may receive an operation (for example, tap) performed by the user on a recommended commodity icon 413. In response to the operation, the electronic device 100 may display a shopping application interface 430 shown in FIG. 4G.

Figure 4G:
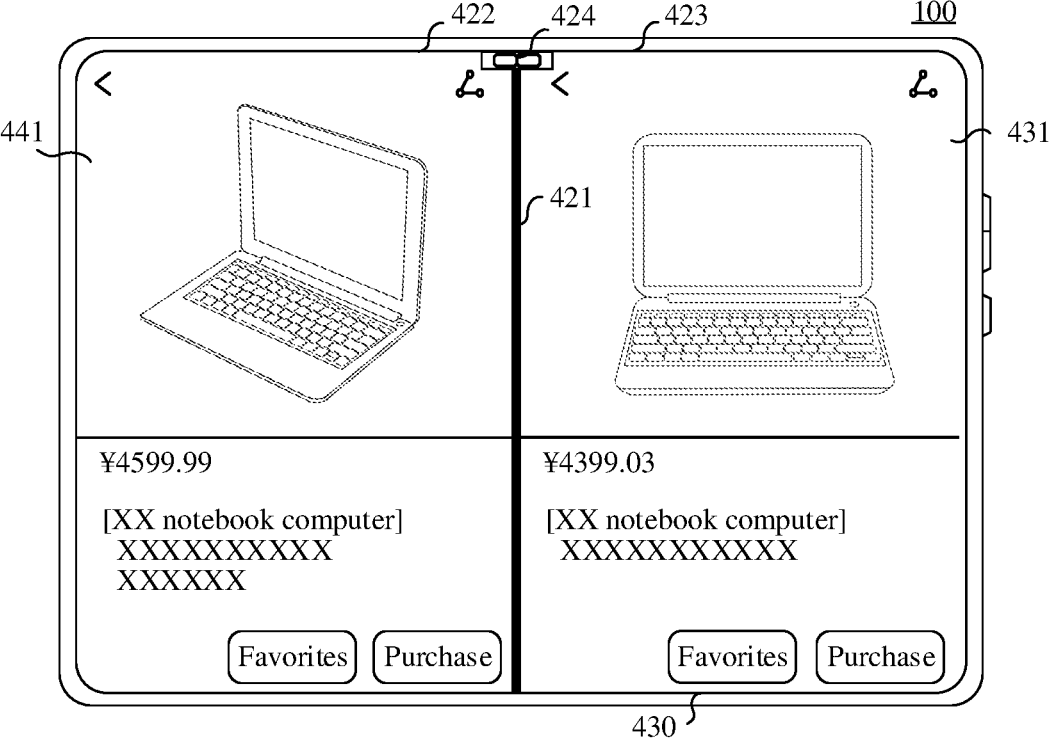

As shown in FIG. 4G, the shopping application interface 430 may include a window 422 and a window 423. A commodity details page 441 is displayed in the window 422, and a commodity details page 431 is displayed in the window 423. The commodity details page 441 may be used to display a detailed description of a commodity "NN notebook computer". The commodity details page 441 is a sub page of a commodity recommendation page 411. For a part that is of the shopping application interface 430 and that is not described in detail, refer to the embodiment shown in FIG. 4C. Details are not described herein again. In this way, the user can compare information such as prices and quality of two commodities based on a commodity details page of the two commodities (for example, the "XX" notebook computer and the "NN notebook computer") displayed by the electronic device 100.

In a possible embodiment, the electronic device 100 may receive an input (for example, tap) performed by the user on the shopping application icon 401 in FIG. 4C, and display, in response to the input, the shopping application interface 410 shown in FIG. 4E.

In a possible application scenario, the first application may be a communication application. The electronic device 100 may display an interface of the communication application. Two windows are displayed on the interface of the communication application. The electronic device 100 may lock the two windows in response to a window locking operation (for example, swiping up on a division line area) of the user. The electronic device 100 may concurrently display different pages (for example, instant messaging pages) at a same layer in the two windows. In this way, the user can concurrently view instant messaging pages of two contacts on the interface, and chat with the two contacts, to improve communication efficiency.

Figure 4H:
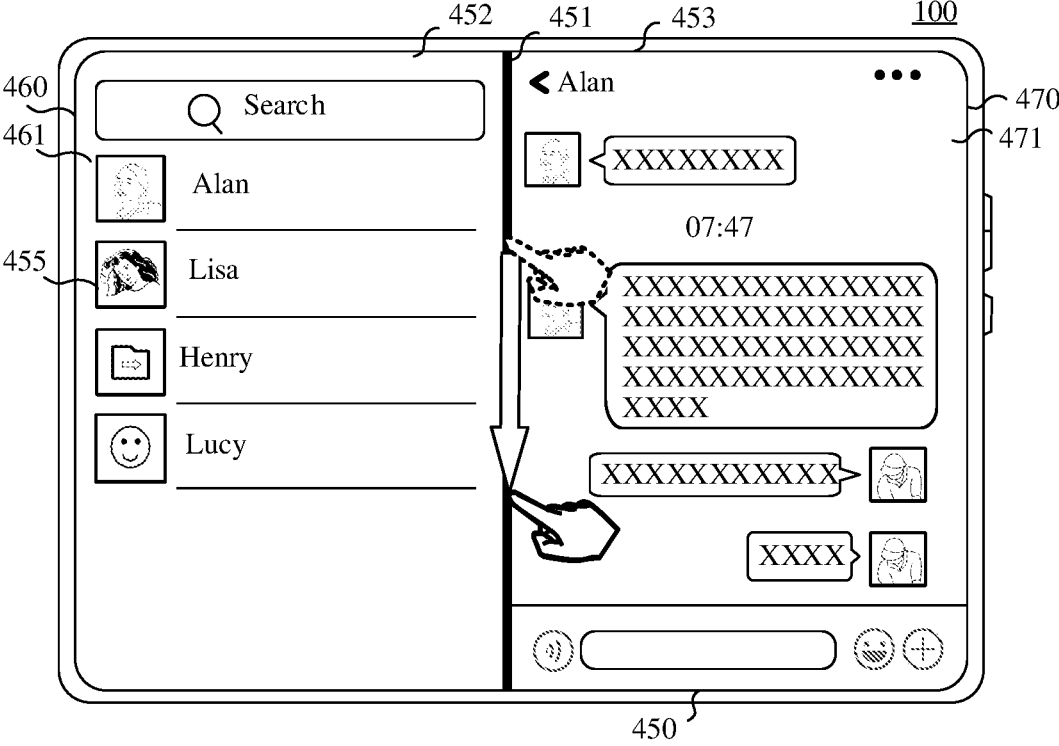

For example, as shown in FIG. 4H, the electronic device 100 may respond to an input (for example, tap) performed by the user on the communication application icon 402 in FIG. 4C, and display, in response to the input, a communication application interface 450 shown in FIG. 4H. The communication application interface 450 may include a window 460 and a window 470. A contact page 461 is displayed in the window 460, and an instant messaging page 471 is displayed in the window 470. The instant messaging page 471 is a sub page of the contact page 461. In some other embodiments, the communication application interface 450 may further include a division line 451, and the division line 451 may be used to trigger the electronic device 100 to receive and respond to a user input (for example, dragging to the left) for changing horizontal lengths of a window 452 and a window 453. Optionally, the division line 451 may be further used to trigger the electronic device 100 to receive and respond to a user input for locking the window 452 and the window 453.

The contact page 461 may include a contact search bar, a contact display area, and the like. A plurality of contact icons (for example, a contact icon 415) may be displayed in the contact display area, and the contact icon may be used to trigger to display an instant messaging page corresponding to the contact icon. The instant messaging page 471 may include a dialog box, an enter box, and the like. The instant messaging page 471 may be used to chat with a contact "Alan". Optionally, the instant messaging page 471 may further include an emoticon control, a voice control, more controls, and the like.

Figure 4I:
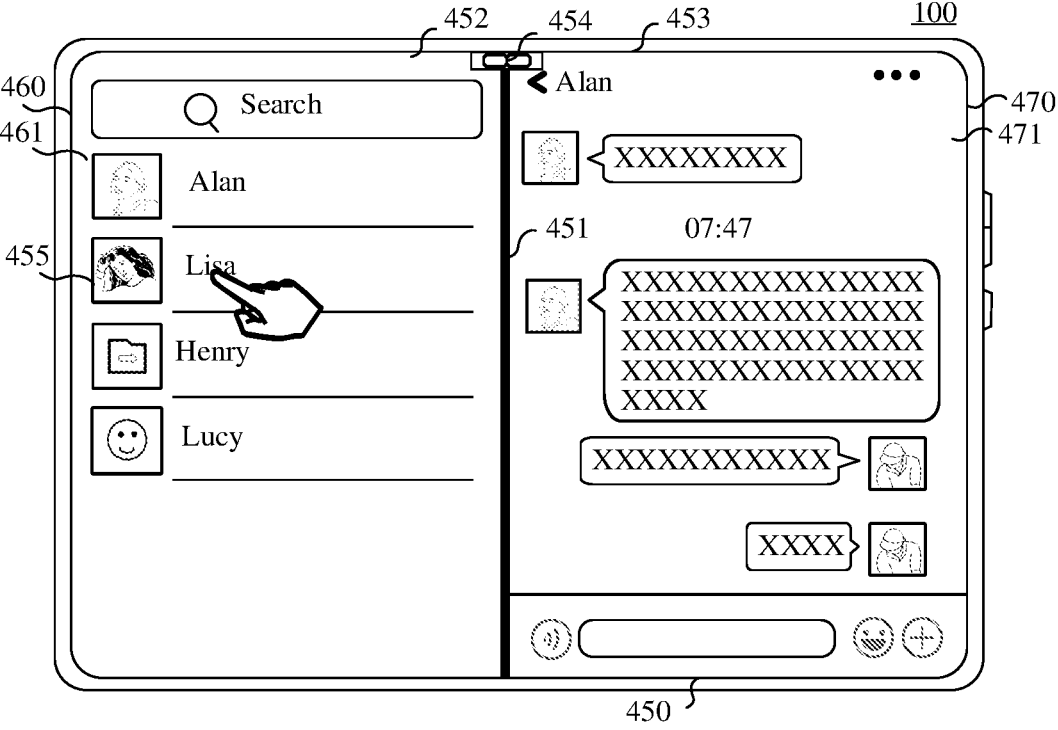

The electronic device 100 may receive a window locking operation (for example, swiping down) of the user. The electronic device 100 may display a lock icon 454 on the communication application interface 450 in response to the operation, as shown in FIG. 4I. The lock icon 454 may indicate that both a window 460 and a window 470 are locked. The electronic device 100 may display a page to switch to in a specified window in response to a page switching operation performed by the user on a specified page of the specified window.

Figure 4J:
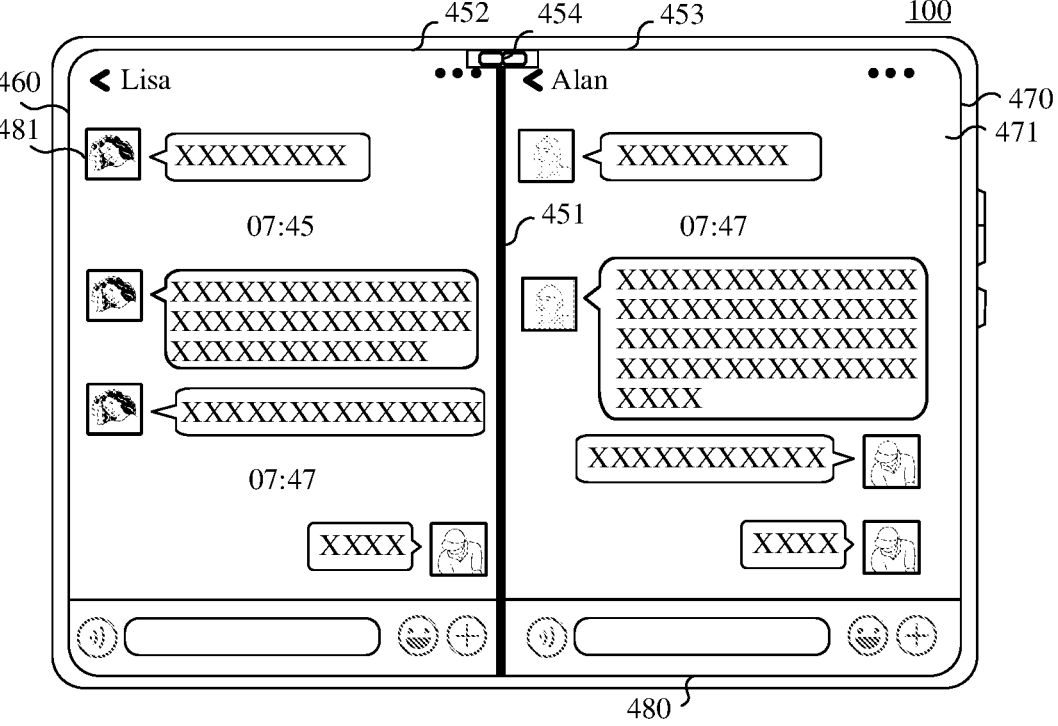

The electronic device 100 may receive an operation (for example, tap) performed by the user on a contact icon 415. In response to the operation, the electronic device 100 may display a communication application interface 480 shown in FIG. 4J.

As shown in FIG. 4E, the communication application interface 480 may include a window 460 and a window 470. An instant messaging page 481 is displayed in the window 460, and an instant messaging page 471 is displayed in the window 470. The instant messaging page 481 may be used to chat with a contact "Lisa". The instant messaging page 481 is a sub page of a contact page 461. For a part that is of the communication application interface 480 and that is not described in detail, refer to the embodiment shown in FIG. 4F. Details are not described herein again. In this way, the user can concurrently chat with the contact "Alan" and the contact "Lisa" by using the two instant messaging pages displayed by the electronic device 100.

In a possible embodiment, the electronic device 100 may receive an input (for example, tap) performed by the user on the communication application icon 402 in FIG. 4C, and display, in response to the input, the communication application interface 100 shown in FIG. 1A. For a part that is of the communication application interface 100 and that is not described in detail, refer to the embodiment shown in FIG. 1A. Details are not described herein again. In response to an input (for example, tap) performed by the user on the contact icon 102 of the communication application interface 100, the electronic device 100 may further display the communication application interface 450 shown in FIG. 4H.

In some embodiments, after the electronic device 100 locks the first window of the first application and the second window of the first application, in response to a desktop return operation of the user, the electronic device 100 may return to display a desktop. If the electronic device 100 receives an application open operation for the first application, the electronic device 100 may display the locked first window and the locked second window in response to the application open operation. In this way, the electronic device 100 does not end a process of the locked window after returning to display the desktop. When the user enters the first application again, the electronic device 100 may display the locked first window of the first application and the locked second window of the first application, to facilitate a next operation of the user.

Figure 5A:
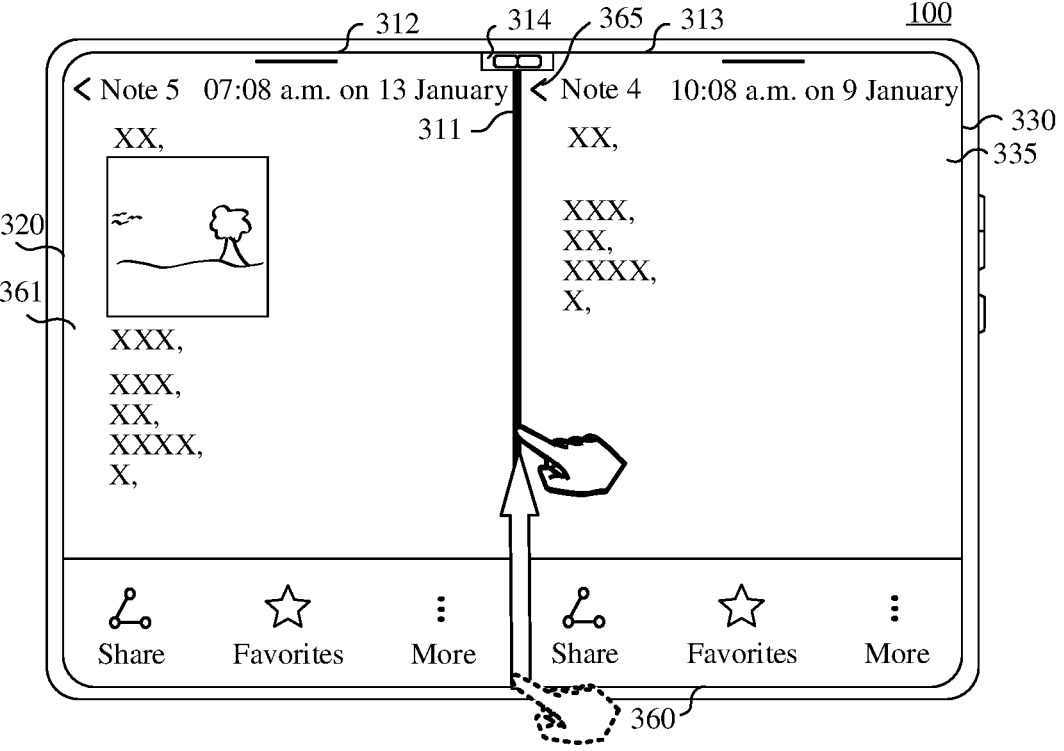
FIG. 5A to FIG. 5G are schematic diagrams of another group of interfaces according to embodiments of this application.

For example, as shown in FIG. 5A, the electronic device 100 may display a notepad application interface 360. The notepad application interface 360 includes a window 320 and a window 330. A note editing page 361 is displayed in the window 320, and a note editing page 335 is displayed in the window 330. For a text description of the notepad application interface 360, refer to the embodiment shown in FIG. 3E. Details are not described herein again.

The electronic device 100 may receive an operation (for example, swiping up) performed by the user on the notepad application interface 500. In response to the operation, the electronic device 100 may display a desktop 530 shown in FIG. 5B.

Figure 5B:
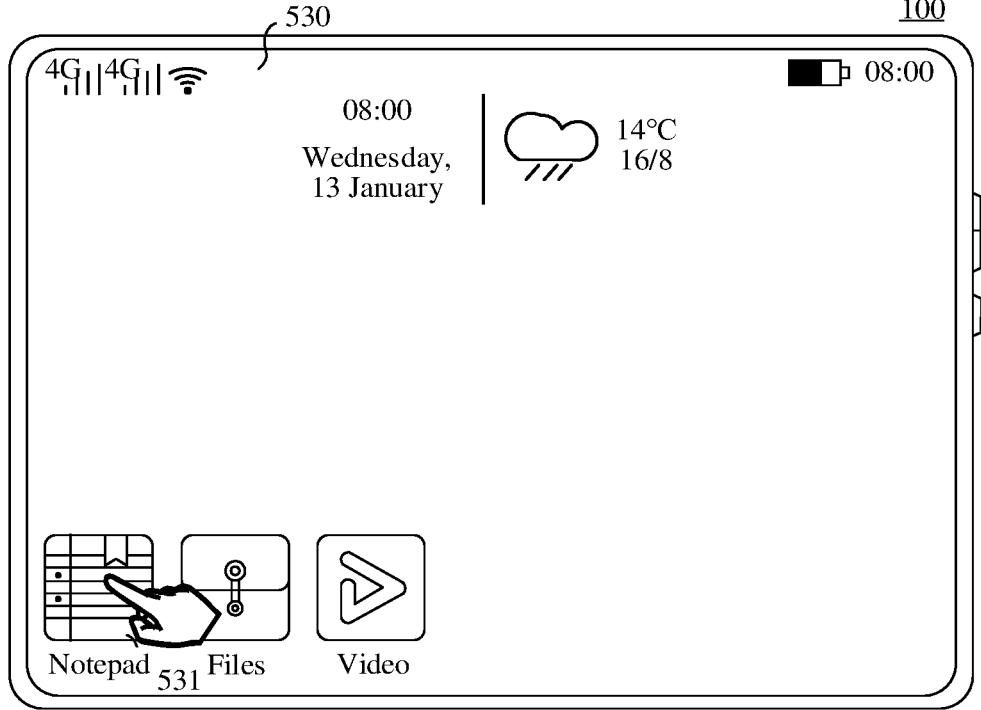

As shown in FIG. 5B, the desktop 530 may include a plurality of application icons and cards, for example, a weather application card, a date application card, a notepad application icon 531, a files application icon, and a video application icon. For a part that is of the desktop 530 and that is not described in detail, refer to the embodiment shown in FIG. 3A. Details are not described herein again.

The electronic device 100 may receive an operation (for example, tap) performed by the user on the notepad application icon 531. In response to the operation, the electronic device 100 may display the notepad application interface 360 including a lock icon 314 shown in FIG. 5A.

In a possible implementation, after the electronic device 100 locks the first window and the second window, in response to a desktop return operation of the user, the electronic device 100 may return to display a desktop, and display a floating control on the desktop. The floating control may be configured to trigger the electronic device 100 to display a first floating window and/or a second floating window on the desktop. A page displayed in the first floating window is the same as a page displayed in the first window, and a page displayed in the second floating window is the same as a page displayed in the second window. In this way, the electronic device 100 can display the locked window when returning to display the desktop.

For example, the electronic device 100 may receive an operation (for example, swiping up) performed by the user on the notepad application interface 360 shown in FIG. 5A. In response to the operation, the electronic device 100 may display an interface 540 shown in FIG. 5C. The interface 540 includes a page on which an application icon is placed. A floating control 545 is displayed on the interface 540. The floating control 545 may be configured to trigger to display a floating window. Optionally, because a page displayed in a minimized floating window belongs to a notepad application, the floating control 545 may display a notepad application icon. For a part that is of the interface 540 and that is not described in detail, refer to the embodiment shown in FIG. 3A. Details are not described herein again.

In some embodiments, the electronic device 100 may further receive an operation (for example, tap) performed by the user on the floating control 545. In response to the operation, the electronic device 100 may display an interface 540 shown in FIG. 5D.

Figure 5C:
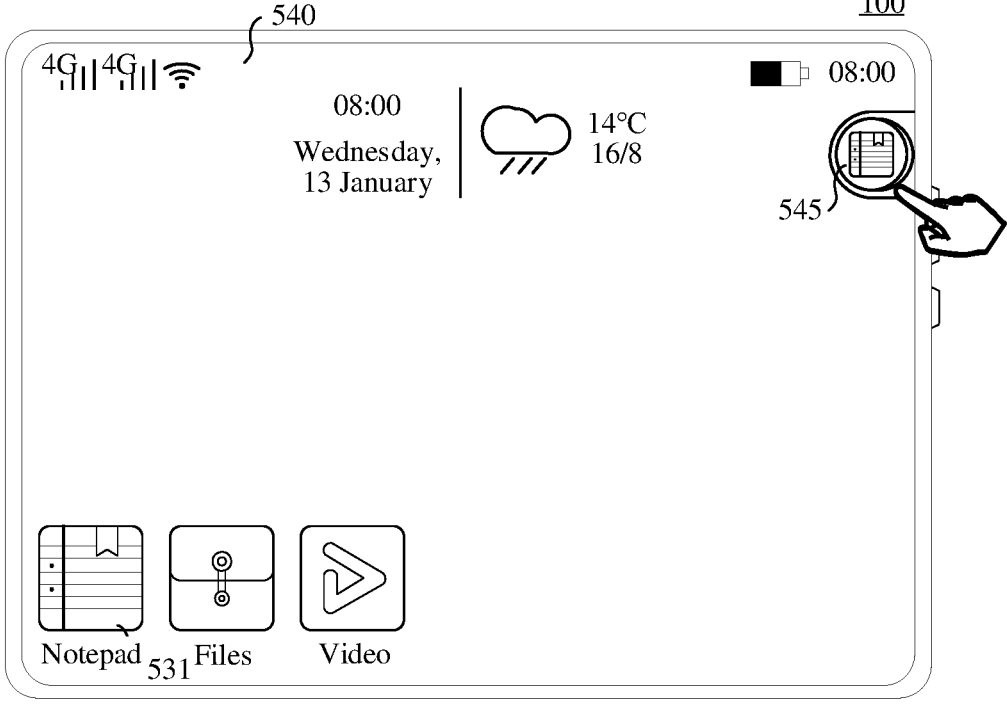
Figure 5D:
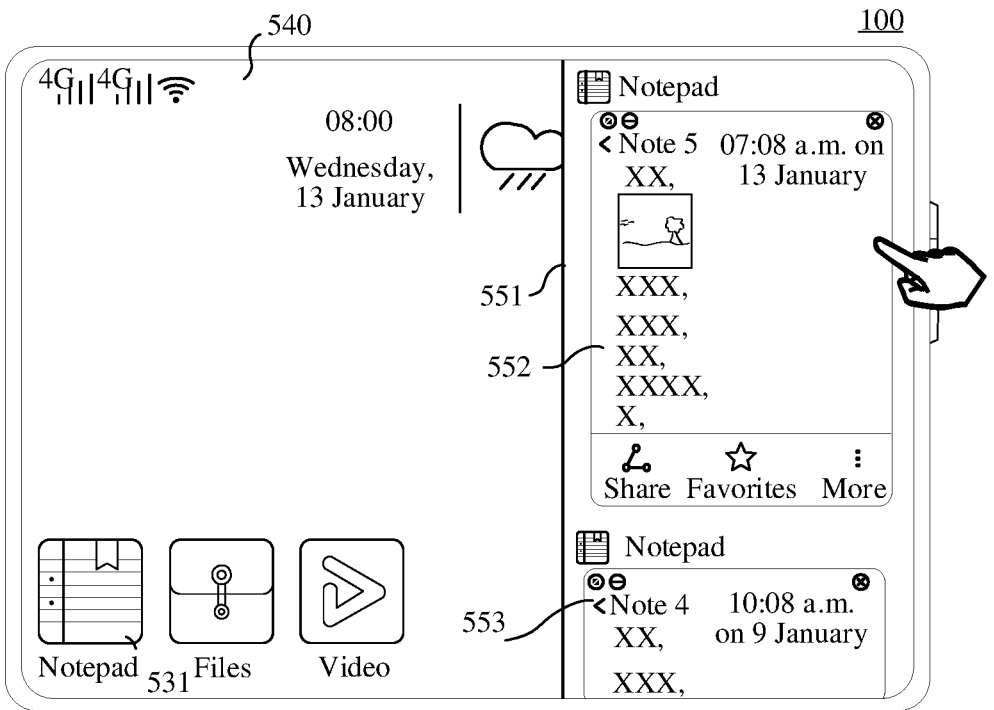

As shown in FIG. 5D, a floating area 551 is displayed on the interface 540. The floating area 551 may include a notepad floating control 552 and a notepad floating control 553. The notepad floating control may be configured to trigger the electronic device 100 to display a floating window corresponding to the notepad floating control. Content displayed by the floating control 552 is the same as content of the note editing page 361 shown in FIG. 5A. Content displayed by the floating control 553 is the same as content of the note editing page 335 shown in FIG. 5A. For a part that is of the interface 540 and that is not described in detail, refer to the embodiment shown in FIG. 5C. Details are not described herein again.

In some other embodiments, the electronic device 100 may receive an operation (for example, tap) performed by the user on the notepad floating control 552. In response to the operation, the electronic device 100 may display an interface 540 shown in FIG. 5E.

Figure 5E:
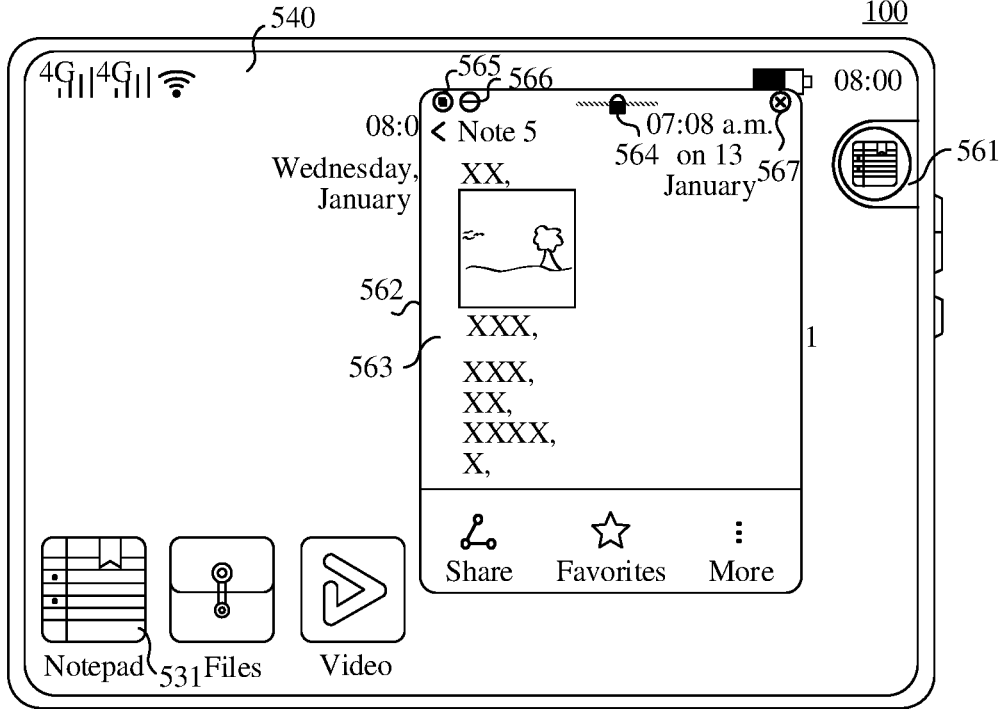

As shown in FIG. 5E, for a part that is of the interface 540 and that is not described in detail, refer to the embodiment shown in FIG. 5C. Details are not described herein again. A floating control 561 and a floating window 562 are displayed on the interface 540. The floating control 562 may be configured to trigger the electronic device 100 to display the floating window 571. The floating window 562 may include a maximize control 565, a minimize control 566, a close control 567, and a note editing page 563. The maximize control 565 may be configured to trigger the electronic device 100 to maximize the floating window 562. The minimize control 566 may be configured to trigger the electronic device 100 to minimize the floating window 562. The close control 567 may be configured to trigger the electronic device 100 to close the floating window 562. For a text description of the note editing page 563, refer to the embodiment shown in FIG. 3A. Details are not described herein again. Optionally, the floating window 562 may further include a lock icon 564, and the lock icon 564 may indicate that the floating window 562 is in a locked state. The electronic device 100 may display, in the floating window 562 in response to a page switching operation of the user, a page obtained after switching of the note editing page 563. The lock icon 564 may be further used to trigger the electronic device 100 to unlock the floating window 562. Further, optionally, the floating window 562 may include a horizontal bar, and the horizontal bar may be used to trigger the electronic device 100 to move the floating window 562.

Optionally, after the electronic device 100 locks the first window and the second window, in response to a desktop return operation of the user, the electronic device 100 may return to display a desktop, and display a first floating window and a first floating control on the desktop. A page displayed in the first window is displayed in the first floating window, and the first floating control may be configured to trigger the electronic device 100 to display a second floating window on the desktop, where a page displayed in the second window is displayed in the second floating window. Optionally, the first window is a window last edited by the user.

For example, as shown in FIG. 5E, the electronic device 100 may receive a desktop return operation performed by the user on the notepad application interface 360 shown in FIG. 5A. In response to the desktop return operation, the electronic device 100 may display the floating window 562 and the floating control 561 on the desktop.

Optionally, in response to the desktop return operation of the user, the electronic device 100 may return to display the desktop, and display the second floating window and a second floating control on the desktop. The page displayed in the second window is displayed in the second floating window, and the second floating control may be configured to trigger the electronic device 100 to display the first floating window on the desktop, where the page displayed in the first window is displayed in the first floating window. Optionally, the second window is a window last edited by the user.

Optionally, in response to an operation performed by the user on the first floating control, the electronic device 100 may close the first floating window, and display the second floating window and the second floating control on the desktop. The page displayed in the second window is displayed in the second floating window, and the second floating control may be configured to trigger the electronic device 100 to display the first floating window on the desktop.

Optionally, in response to an operation performed by the user on the second floating control, the electronic device 100 may close the second floating window, and display the first floating window and the first floating control on the desktop. The page displayed in the first window is displayed in the first floating window, and the first floating control may be configured to trigger the electronic device 100 to display the second floating window on the desktop.

Optionally, the floating window may alternatively be locked. When the floating window is locked, the electronic device 100 may display a page to switch to in the floating window in response to a page switching operation performed by the user on the floating window.

In a possible implementation, after the electronic device 100 locks the first window and the second window, in response to a desktop return operation of the user, the electronic device 100 may return to display a desktop, and display a first floating window and a second floating window on the desktop. A page displayed in the first window is displayed in the first floating window, and a page displayed in the second window is displayed in the second floating window. In this way, the electronic device 100 can display the locked window when returning to display the desktop.

Figure 5F:
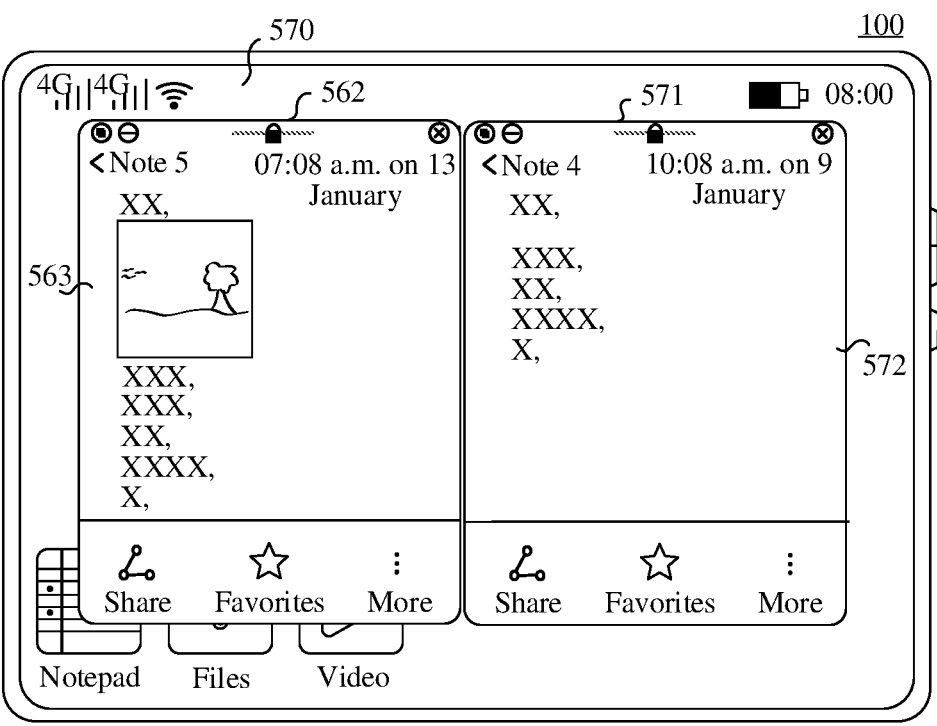

For example, as shown in FIG. 5F, the electronic device 100 may display a floating window 562 and a floating window 571 on an interface 570 in response to a desktop return operation performed by the user on the notepad application interface 360 shown in FIG. 5A. A note editing page 563 is displayed in the floating window 562, and a note editing page 572 is displayed in the floating window 571. For descriptions of the floating window 571 and the floating window 576, refer to the foregoing floating window 562. Details are not described herein again. For text descriptions of the interface 570, the floating window 562, and the floating window 571, refer to embodiments shown in FIG. 3C and FIG. 5E. Details are not described herein again.

Optionally, the floating window may alternatively be locked. When the floating window is locked, the electronic device 100 may display a page to switch to in the floating window in response to a page switching operation performed by the user on the floating window.

In a possible implementation, after the electronic device 100 locks the first window and the second window, in response to a desktop return operation of the user, the electronic device 100 may return to display a desktop, add a card A and a card B to a blank area on the desktop, display, on the card A, page content displayed in the first window, and display, on the card B, page content displayed in the second window. Before the card A and the card B are displayed in the blank area on the desktop, no other interface element is displayed. The interface element includes an application icon, a tool component, and the like. In this way, the electronic device 100 can display the locked window without covering desktop content.

Optionally, the card A and the card B are locked by the electronic device 100, and the electronic device 100 may display a page to switch to in the card in response to a page switching operation performed by the user on the card.

For example, the electronic device 100 may receive an operation (for example, swiping up) performed by the user on the notepad application interface 360. In response to the operation, the electronic device 100 may display an interface 580 shown in FIG. 5G.

Figure 5G:
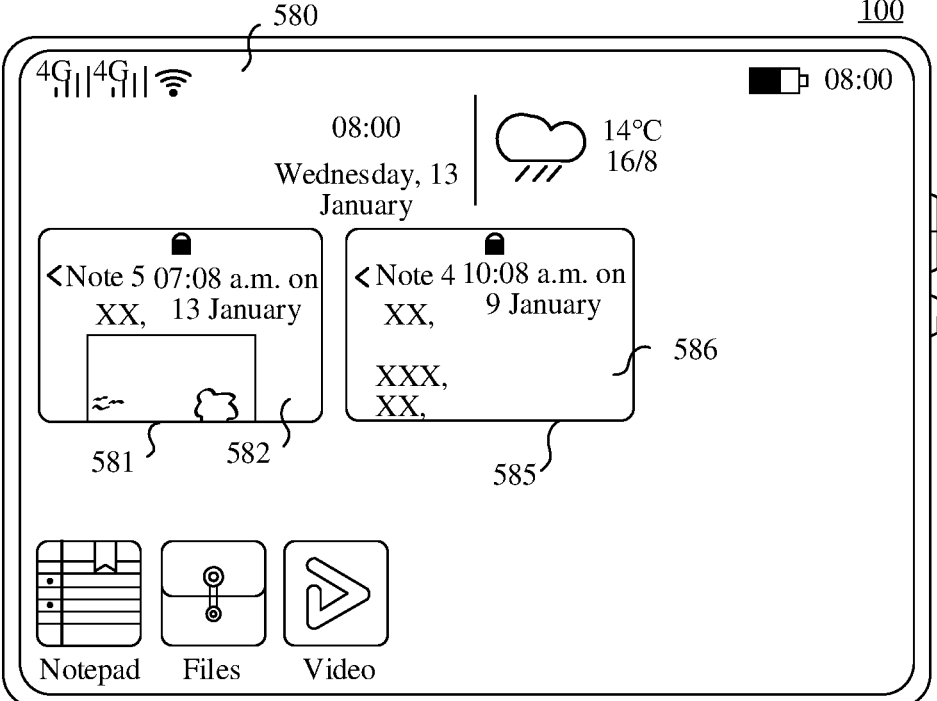

As shown in FIG. 5G, the interface 580 may include a note editing card 581 and a note editing card 585. The note editing card 581 may display a page 582, where content of the may display a page 586, where content of the page 586 is the same as that of the foregoing note editing page 335. For a part that is of the interface 580 and that is not described in detail, refer to embodiments shown in FIG. 3A and FIG. 3E. Details are not described herein again.

Optionally, if the interface 580 does not have an appropriate blank area, the electronic device 100 may move another application icon or card, to obtain a blank area that is enough to place the note editing card 581 and the note editing card 585.

In a possible implementation, after the electronic device 100 displays the first window of the first application in the first display area, displays the second window of the first application in the second display area, and locks the first window and the second window, in response to an operation (for example, dragging) performed by the user on the first window (or the second window), the electronic device 100 may display the desktop in the first display area (or the second display area), and display the floating window on the display screen (in a floating manner), where page content displayed in the floating window is the same as the page content displayed in the first window (or the second window).

Figure 6A:
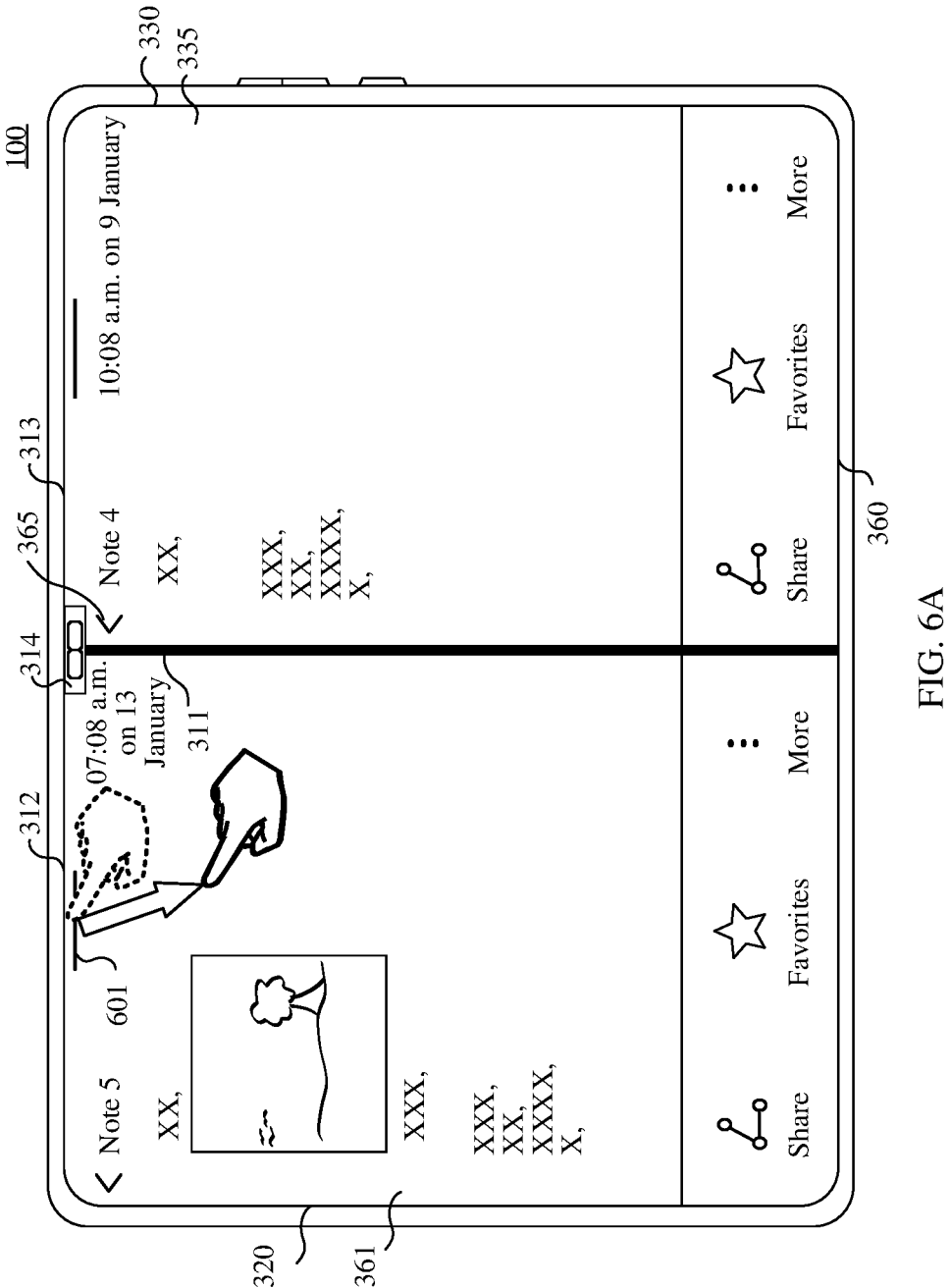
FIG. 6A to FIG. 6E are schematic diagrams of another group of interfaces according to embodiments of this application.

For example, as shown in FIG. 6A, the electronic device 100 may display a notepad application interface 360. The notepad application interface 360 may include a window 320, and the window 320 may include a horizontal bar 601. The horizontal bar 601 may be used to drag/lock the window 320. For a text description of the interface 360, refer to the embodiment shown in FIG. 3E. Details are not described herein again.

Figure 6B:
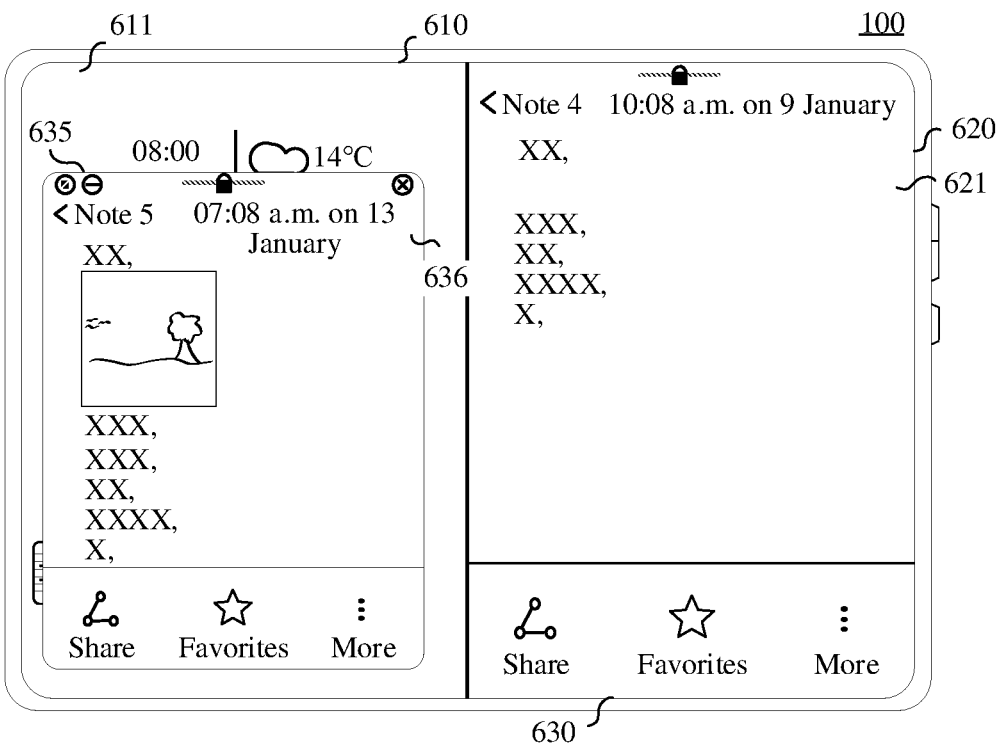

The electronic device 100 may receive an operation (for example, dragging down) performed by the user on the horizontal bar 606. In response to the operation, the electronic device 100 may display an interface 630 shown in FIG. 6B.

The interface 630 may include a window 610 and a window 620. The electronic device 100 may display a floating window 635 on the interface 630. A desktop 611 may be displayed in the window 610. For a text description of the desktop 611, refer to the embodiment shown in FIG. 3A. Details are not described herein again. A note editing page 621 may be displayed in the window 620. For a text description of the page 621, refer to the embodiment shown in FIG. 3E. For a text description of the floating window 635, refer to the embodiment shown in FIG. 5E. Details are not described herein again.

Optionally, when displaying the window 320, the electronic device 100 does not display a horizontal bar 601. The electronic device 100 may display the horizontal bar 601 in response to an operation (for example, tap) performed by the user on the window 320.

Optionally, the floating window may alternatively be locked. When the floating window is locked, the electronic device 100 may display a page to switch to in the floating window in response to a page switching operation performed by the user on the floating window.

In a possible implementation, after the electronic device 100 displays the first window of the first application in the first display area, displays the second window of the first application in the second display area, and locks the first window and the second window, in response to an operation (for example, dragging) performed by the user on the first window (or the second window), the electronic device 100 may display the page in the second window (or the first window) in full screen on the display screen, and display the floating window on the page displayed on the display screen in full screen. Page content displayed in the floating window is the same as the page content displayed in the first window (or the second window).

Figure 6C:
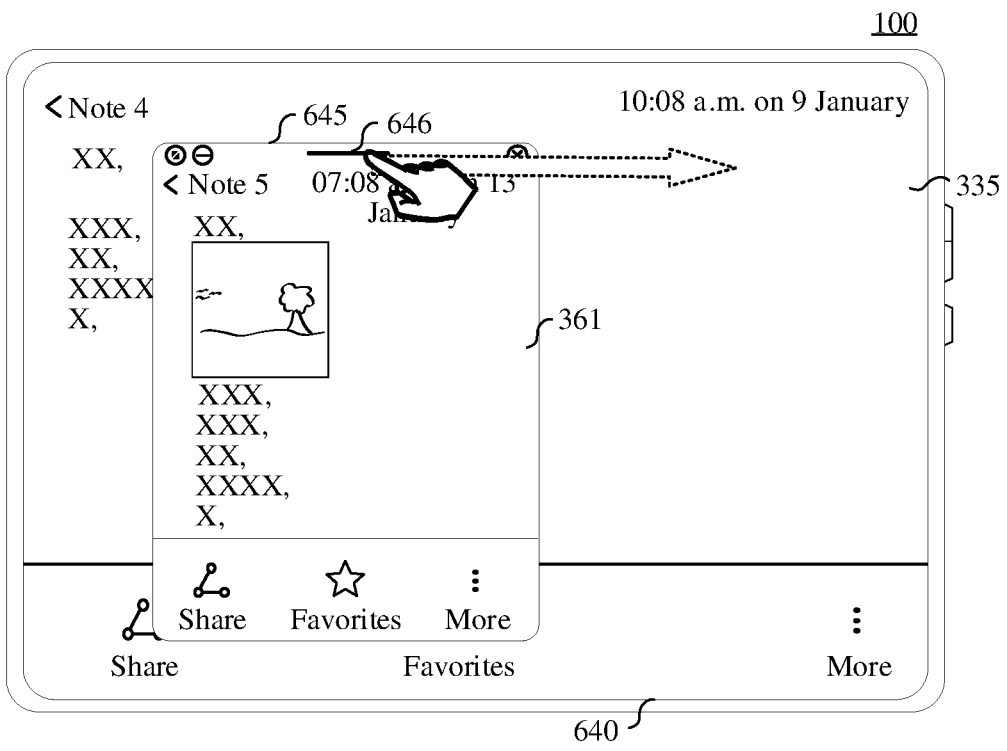

For example, the electronic device 100 may receive an operation (for example, dragging down) performed by the user on the horizontal bar 606. In response to the operation, the electronic device 100 may display a notepad application interface 640 shown in FIG. 6C.

The notepad application interface 640 may include a note editing page 335. For a text description of the note editing page 335, refer to the foregoing embodiment shown in FIG. 3E. The electronic device 100 displays a floating window 645 on the notepad application interface 640. The floating window 645 may include a maximize control, a minimize control, a close control, a horizontal bar 646, a note editing page 361, and the like. The horizontal bar 646 may be used to drag/lock the floating window 645. For a text description of the floating window 645, refer to the embodiment shown in FIG. 5E. Details are not described herein again.

Optionally, both the floating window and a window displayed in full screen are locked.

Further, optionally, after the electronic device 100 displays the page in the second window (or the first window) on the display screen in full screen, and displays the floating window on the page displayed on the display screen in full screen, in response to an operation performed by the user to drag the floating window to the second display area (or the first display area) and hold the floating window for preset time (for example, 1 second), the electronic device 100 may display the second window in the first display area, and display the first window in the second display area. The page content displayed in the floating window is the same as the page content displayed in the first window (or the second window). In this way, the user can exchange positions of the two locked windows.

Figure 6D:
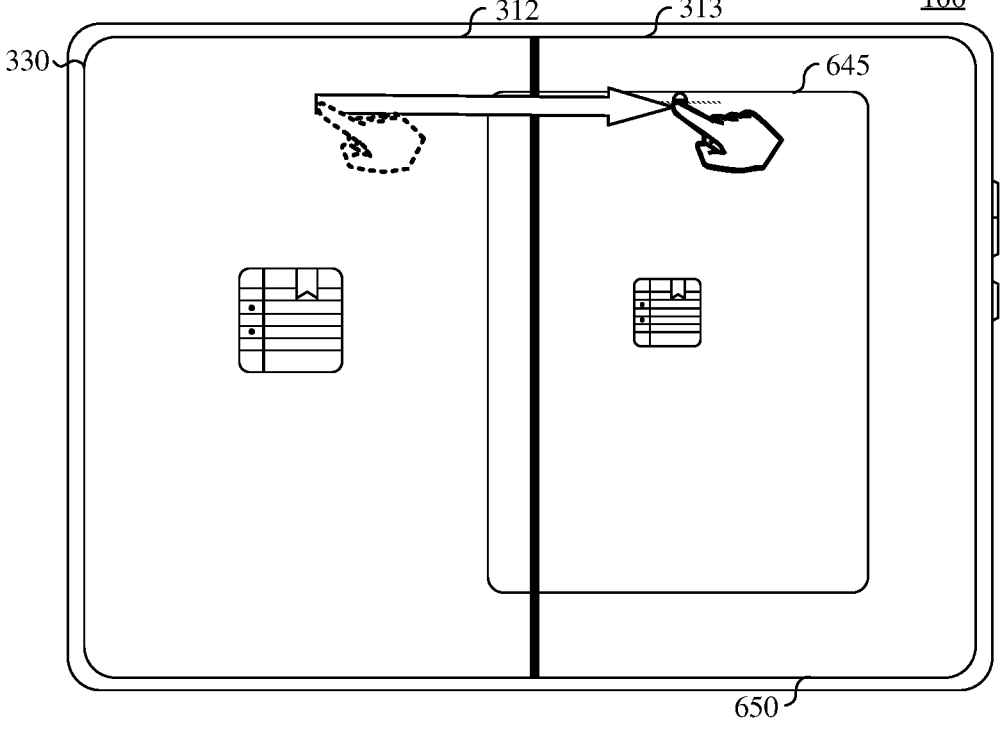

For example, the electronic device 100 receives an operation (for example, dragging to the right and holding) performed by the user on the horizontal bar 646. In response to the operation, the electronic device 100 may display a window switching interface 650 shown in FIG. 6D.

The window switching interface 650 may include a window 320. The window 320 may be displayed in a display area 312 on the display screen of the electronic device 100, and a notepad application icon may be displayed in the window 320. A floating window 645 may be displayed in the display area 312 and a display area 313, and the notepad application icon may be displayed in the floating window 645. For example, the display area 312 may be a left half area of the display screen, and the display area 313 may be a right half area of the display screen.

Figure 6E:
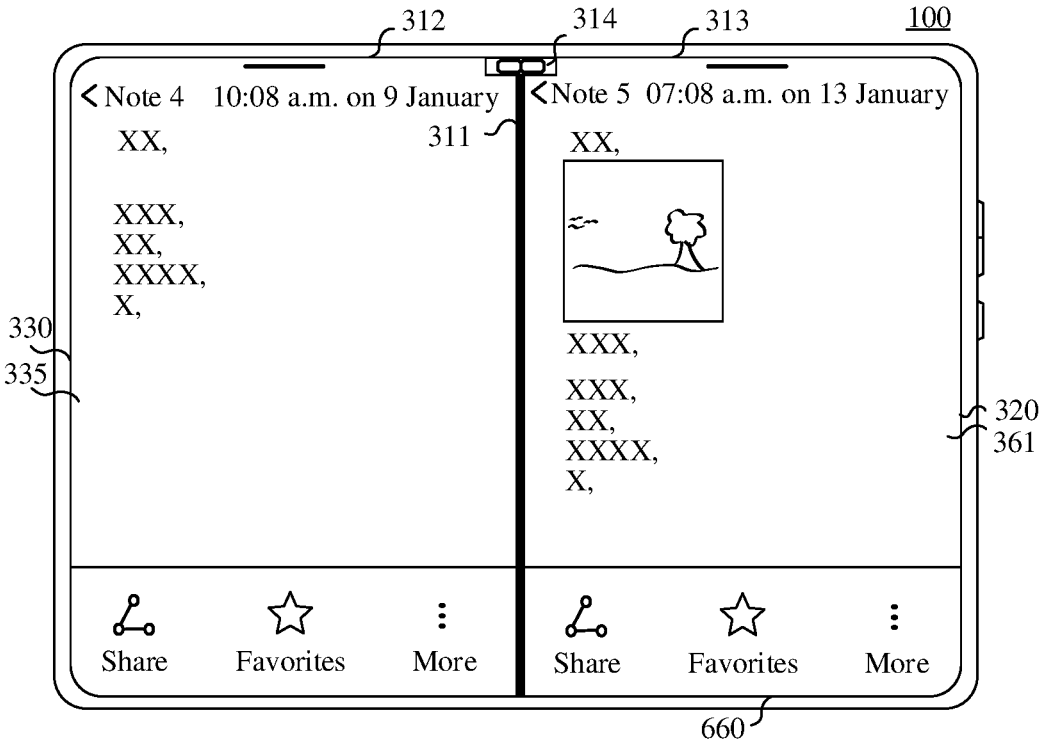

The electronic device 100 receives an operation (for example, releasing) performed by the user on a horizontal bar 646. In response to the operation, the electronic device 100 may display a notepad application interface 660 shown in FIG. 6E.

The notepad application interface 660 may include a window 320, a window 330, a division line 311, and a lock icon 314. The window 330 may be displayed in a display area 312 on the display screen of the electronic device 100, and the window 320 may be displayed in a display area 313 on the display screen of the electronic device 100. For a text description of the notepad application interface 660, refer to the embodiment shown in FIG. 3E. Details are not described herein again.

In embodiments of this application, the window locking operation is not limited to simultaneously locking two windows, and may further be an operation of locking a window. The operation of locking a window may be a tap operation, a double-tap operation, or an operation of another type. This is not limited herein.

Figure 7A:
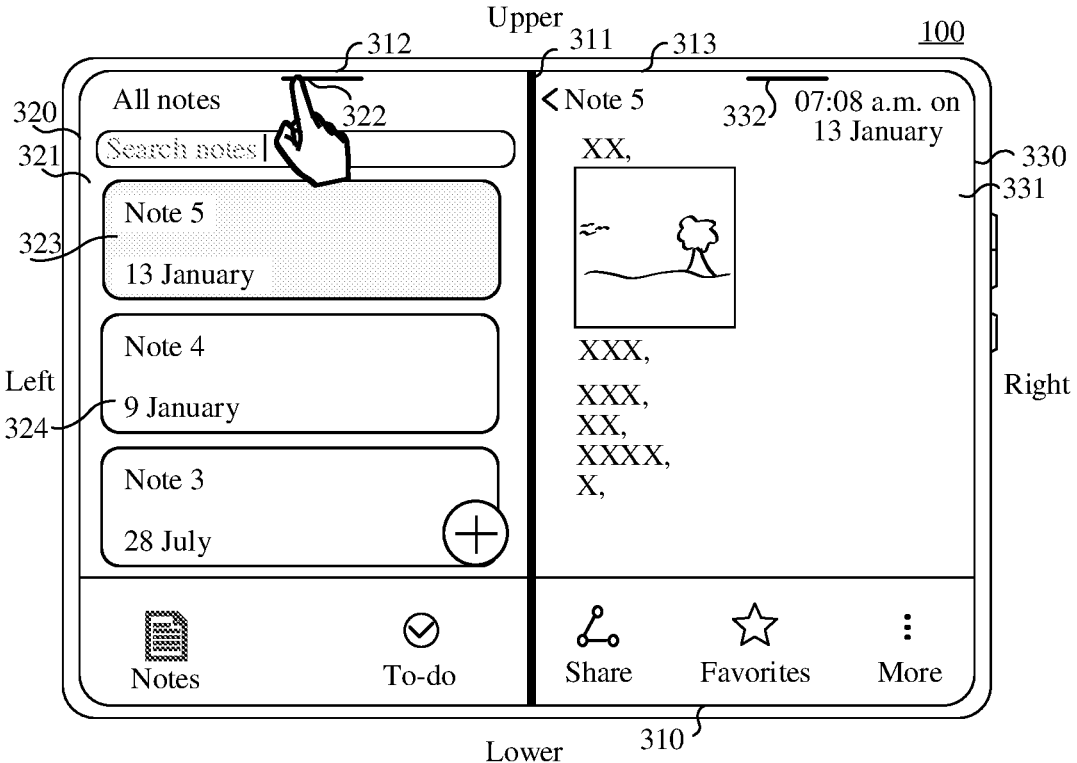
FIG. 7A to FIG. 7C are schematic diagrams of another group of interfaces according to embodiments of this application.

For example, as shown in FIG. 7A, the electronic device 100 may display a notepad application interface 310. A window 320 of the notepad application interface 310 includes a horizontal bar 322. The horizontal bar 322 may be used to trigger the electronic device 100 to drag/lock the window 320. For a text description of the notepad application interface 310, refer to the embodiment shown in FIG. 3B. Details are not described herein again. Optionally, the notepad application interface 310 may further include a division line, and the division line may be used to trigger the electronic device 100 to receive and respond to a user input for locking the window 320 and a window 330.

Figure 7B:
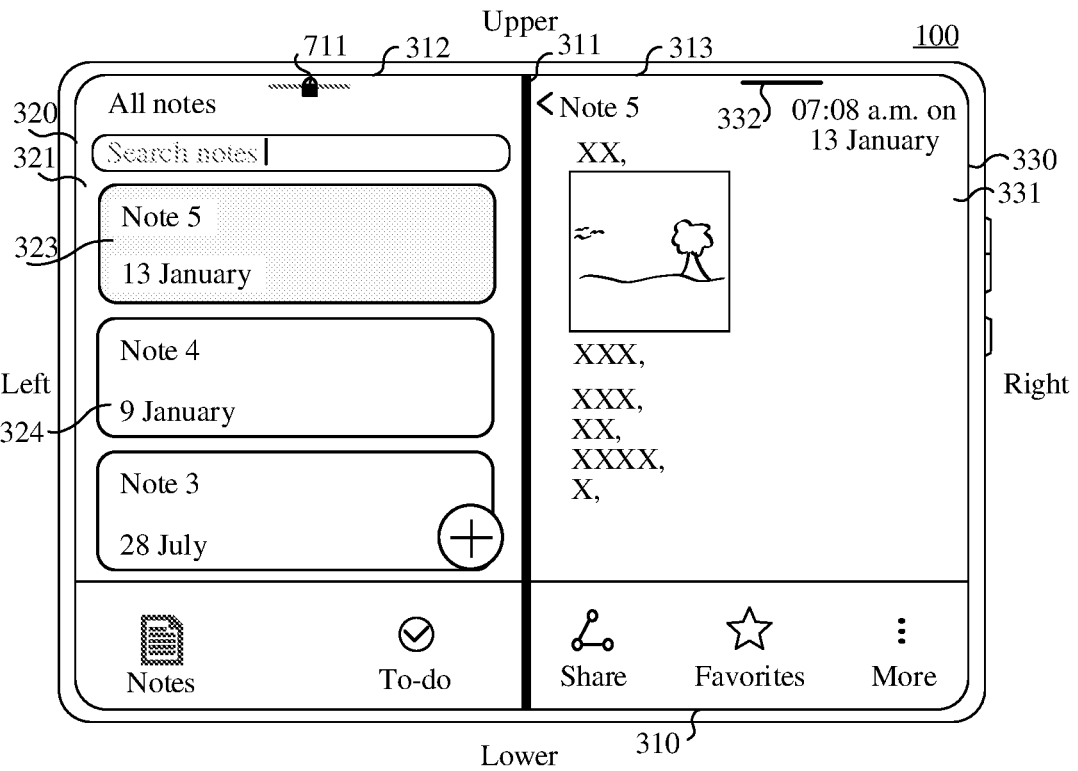

As shown in FIG. 7B, the electronic device 100 may receive an operation (for example, tap) performed by the user on the horizontal bar 322 in FIG. 7A. In response to the operation, the electronic device 100 may lock a window 320, and display a lock icon 711. The lock icon 711 may indicate that the window 320 is locked. When the window 320 is locked, the electronic device 100 may display a page to switch to in the window 320 in response to a page switching operation on the window 320. The lock icon 711 may be further used to trigger the electronic device 100 to unlock the window 320.

In some embodiments, the electronic device 100 displays two windows of the first application. Regardless of whether one window is locked or two windows are simultaneously locked, only a corresponding page to switch to in a locked window can be displayed in the window.

Optionally, the electronic device may display the interface of the first application, where the interface of the first application includes at least two windows. The at least two windows may include the first window, the second window, and a third window. The first page of the first application is displayed in the first window, the second page of the first application is displayed in the second window, and a fourth page of the first application is displayed in the third window. The second page is a sub page of the first page, and the fourth page is a sub page of the second page. After the electronic device 100 locks the first window, the electronic device 100 may receive a page switching operation performed by the user on the first window, and display the fourth page in the first window in response to the operation. The fourth page is a sub page of the first page. In this way, the electronic device 100 can independently display a page in the first window, without interfering with the second window and the third window, to improve screen utilization.

In embodiments of this application, the operation of locking a window is not limited to an operation (for example, tap) on the horizontal bar. The electronic device 100 may display a function menu corresponding to the window in response to an operation (for example, touching and holding) performed by the user on the window. The function menu includes a lock control. The operation of locking a window may be an operation on the lock control of the function menu corresponding to the window. The operation on the window may be an operation on a horizontal bar of the window. In this way, a case in which the window is locked due to an accidental touch can be avoided.

Figure 7C:
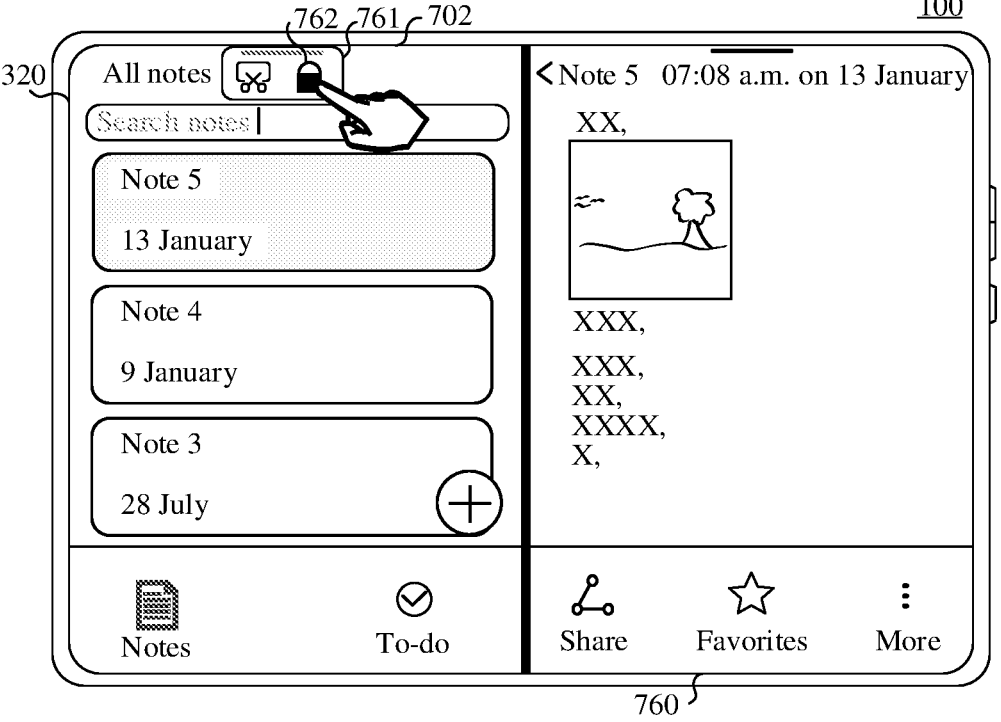

For example, as shown in FIG. 7C, the electronic device 100 receives a touch-and-hold operation performed by the user on the horizontal bar 322 shown in FIG. 7A. In response to the touch-and-hold operation, the electronic device 100 may display a function menu 761 on a window 320. For a text description of the notepad application interface 760, refer to the embodiment shown in FIG. 3B. Details are not described herein again. The function menu 761 may include a lock control 762 and another control (for example, a screenshot control). The lock control 762 may be configured to lock the window 320. The screenshot control may be configured to trigger the electronic device 100 to capture page content displayed in the window 320.

In response to an input operation performed by the user on the lock control 762, the electronic device 100 may lock the window 320, and display a notepad application interface 310 shown in FIG. 7B. The notepad application interface 310 includes the lock icon 711. The lock icon 711 may indicate that the window 320 is locked. When the window 320 is locked, the electronic device 100 may display a page to switch to in the locked window 320 after receiving a page switching operation performed by the user on the window 320.

The following specifically describes, with reference to application scenarios, a display method provided in embodiments of this application.

In some application scenarios, an electronic device 100 may display a floating window on a display screen, where a page including a specified application (for example, a files application) is displayed in the floating window. When the floating window is not locked, after receiving a page switching operation performed by a user in the floating window, the electronic device 100 may display a created floating window, and display a page to switch to in the created floating window. When the floating window is locked, the electronic device 100 may display a page to switch to in the locked floating window after receiving a page switching operation performed by a user in the floating window. The page switching operation may alternatively be an operation of opening a new page.

Figure 8A:
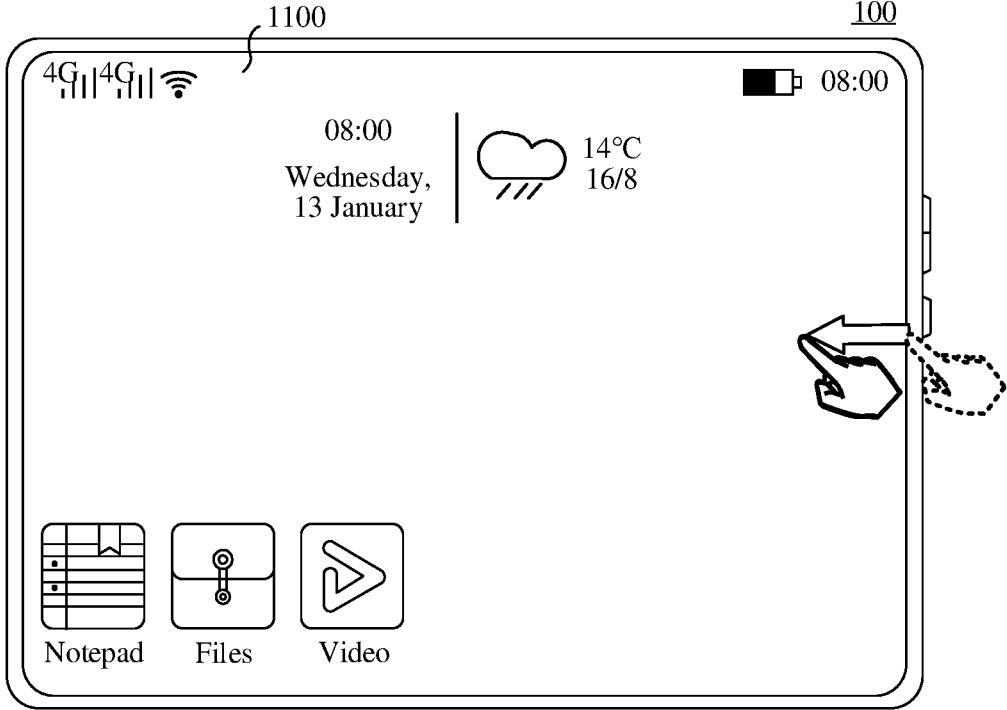
FIG. 8A to FIG. 8G are schematic diagrams of another group of interfaces according to embodiments of this application.

For example, the electronic device 100 may display a desktop 1100 shown in FIG. 8A. For a text description of the desktop 1100, refer to the embodiment shown in FIG. 3A. Details are not described herein again.

The electronic device 100 may receive an operation (for example, sliding to the left) of the user. In response to the operation, the electronic device 100 may display an interface 1110 shown in FIG. 8B.

Figure 8B:
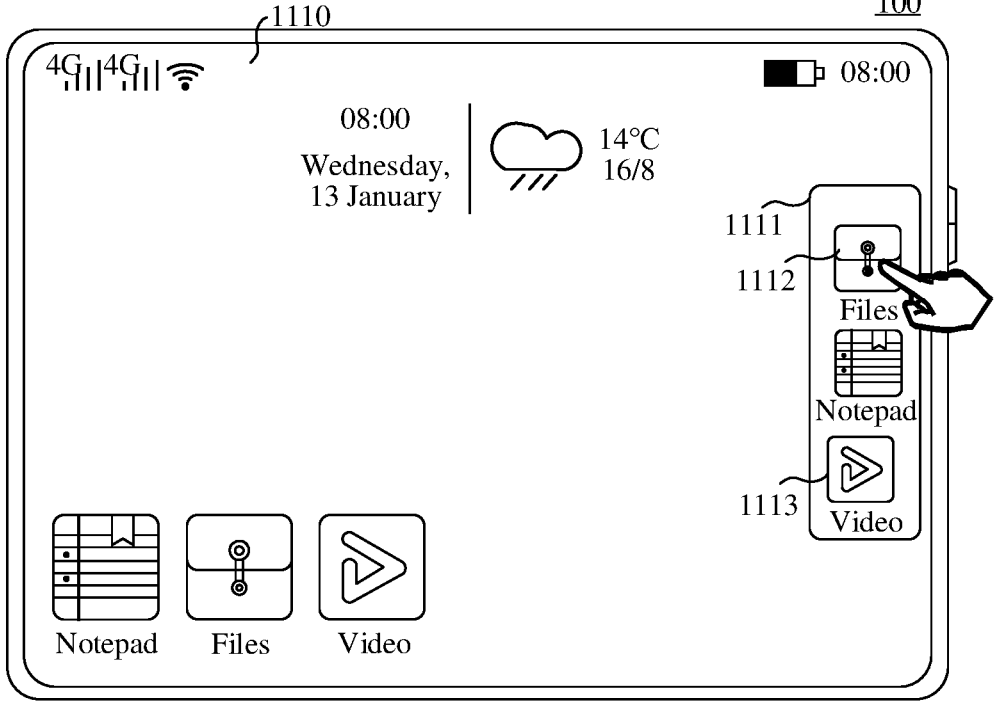

As shown in FIG. 8B, for a text description of the interface 1110, refer to the embodiment shown in FIG. 3A. Details are not described herein again. The electronic device 100 may display a sidebar 1111 of a floating window on the interface 1110. The sidebar 1111 of the floating window may include a plurality of application floating controls. The plurality of application floating controls may include a files application floating control 1112, a notepad application floating control, a video application floating control 1113, and the like. The application floating control may be configured to trigger the electronic device 100 to display the floating window, and display, in the floating window, a page of an application corresponding to the application floating control.

The electronic device 100 may receive an operation (for example, tap) performed by the user on the files application floating control 1111. In response to the operation, the electronic device 100 may display an interface 1120 shown in FIG. 8C.

Figure 8C:
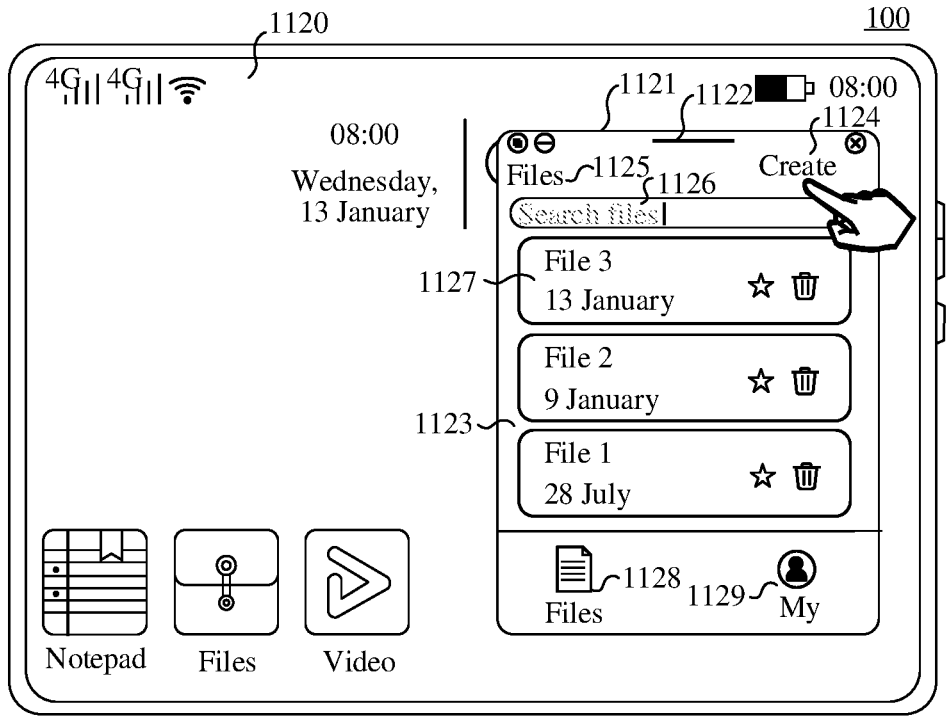

For example, as shown in FIG. 8C, for a text description of the interface 1120, refer to the embodiment shown in FIG. 3A. Details are not described herein again. The electronic device 100 may display a floating window 1121 on the interface 1120. The floating window 1121 may include a horizontal bar 1122 and a page 1125. The horizontal bar 1122 may be used to lock or drag the floating window 1121.

The file management page 1123 may include a files control 1128, a my control 1129, and a file display area. The files control 1128 may be configured to trigger the electronic device 100 to display the file display area. The file display area may include a create control 1124, a file title 1125, a file search bar 1126, file events (for example, a "file 3" event 1127, a "file 2" event, and a "file 1" event) that have been added by the user, and the like. The create control 1124 may be configured to trigger the electronic device 100 to receive and respond to a user input for adding a file event. The create control 1124 may be further configured to trigger the electronic device 100 to display a document editing page. The file title 1125 may be used to identify the file display area. The file search bar 1126 may be used to trigger the electronic device 100 to receive and respond to a user input for displaying some file events. The file event may be used to trigger the electronic device 100 to display a document editing page corresponding to the file event.

The electronic device 100 may receive an operation (for example, tap) performed by the user on the create control 1124 shown in FIG. 8C. In response to the operation, the electronic device 100 may display an interface 1130 shown in FIG. 8D.

Figure 8D:
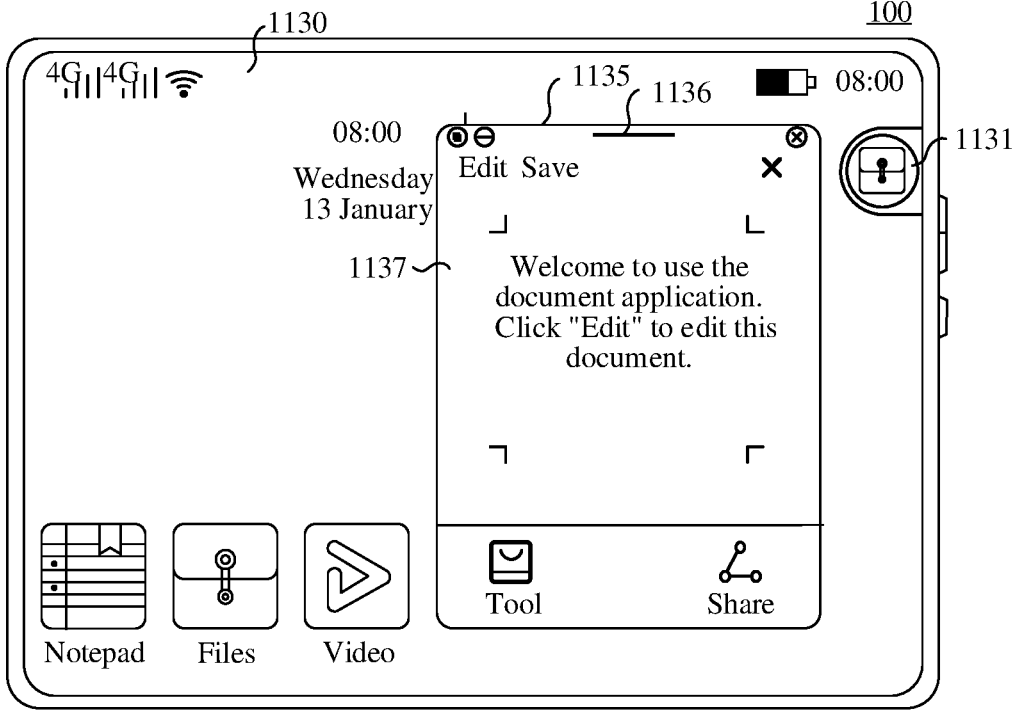

As shown in FIG. 8D, for a text description of the interface 1130, refer to the embodiment shown in FIG. 3A. Details are not described herein again. The electronic device 100 may display a floating window 1135 and a floating control 1131 on the interface 1130.

The floating control 1131 may be configured to trigger the electronic device 100 to display the foregoing floating window 1121 on a desktop.

A document editing page 1137 and a horizontal bar 1136 may be displayed in the floating window 1135. The horizontal bar 1136 may be used to drag/lock the floating window 1135. The document editing page 1137 may include an edit control, a save control, a text enter area, a tool control, a share control, and the like. The edit control may be configured to trigger the electronic device 100 to receive a user input for editing the text enter area. The save control may be configured to save edited content. The text enter area may be used to receive text content entered by the user. The tool control may be configured to trigger the electronic device 100 to display a toolbar. The share control may be used by the electronic device 100 to display a sharing bar.

It can be learned from the foregoing that, when a floating window is in an unlocked state, in response to a page switching operation on the floating window, the electronic device 100 may display a new floating window, and display a page to switch to in the new floating window.

The electronic device 100 may receive an operation (for example, tap) performed by the user on the horizontal bar 1122 shown in FIG. 8C. In response to the operation, the electronic device 100 may display an interface 1150 shown in FIG. 8E.

Figure 8E:
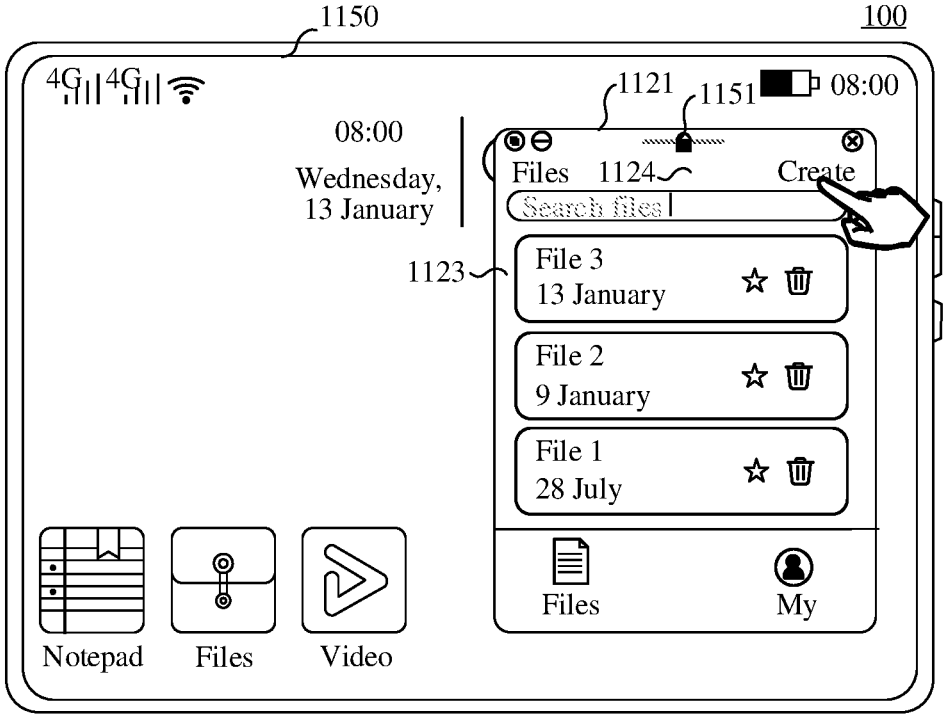

As shown in FIG. 8E, for a text description of the interface 1150, refer to the embodiment shown in FIG. 3A. Details are not described herein again. The electronic device 100 may display a floating window 1121 on the interface 1150. The floating window 1121 may include a lock icon 1151 and a file management page 1123. The lock icon 1151 may indicate that the floating window 1121 is locked. The electronic device 100 may display a page to switch to in the floating window 1121 in response to a page switching operation on the floating window 1121. For a text description of the file management page 1123, refer to the embodiment shown in FIG. 8C. Details are not described herein again.

The electronic device 100 may receive an operation (for example, tap) performed by the user on the create control 1124 shown in FIG. 8E. In response to the operation, the electronic device 100 may display an interface 1160 shown in FIG. 8F.

Figure 8F:
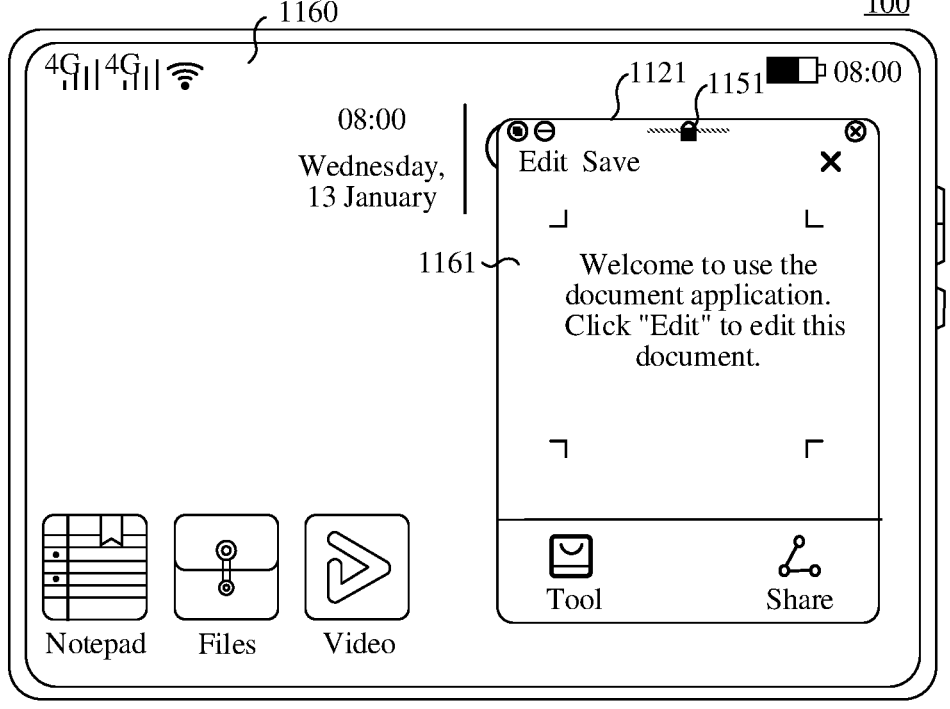

As shown in FIG. 8F, for a text description of the interface 1160, refer to the embodiment shown in FIG. 3A. Details are not described herein again. The electronic device 100 may display a floating window 1121 on the interface 1160. The floating window 11121 may include a lock icon 1151 and a document editing page 1161. For a text description of the document editing page 1161, refer to the embodiment shown in FIG. 8D. Details are not described herein again.

In this way, the electronic device 100 can display a page to switch to in an original floating window.

In embodiments of this application, the operation of locking the floating window is not limited to an operation on a horizontal bar of the floating window. After receiving an operation (for example, touching and holding) performed by the user on a floating window, the electronic device 100 may further display a function menu corresponding to the floating window, where the function menu may include a lock control. An operation of locking the floating window may be an operation on the lock control. In this way, a case in which the floating window is locked due to an accidental touch can be avoided.

Optionally, after receiving an operation (for example, touching and holding) performed by the user on a horizontal bar, the electronic device 100 may display the function menu corresponding to the floating window.

Figure 8G:
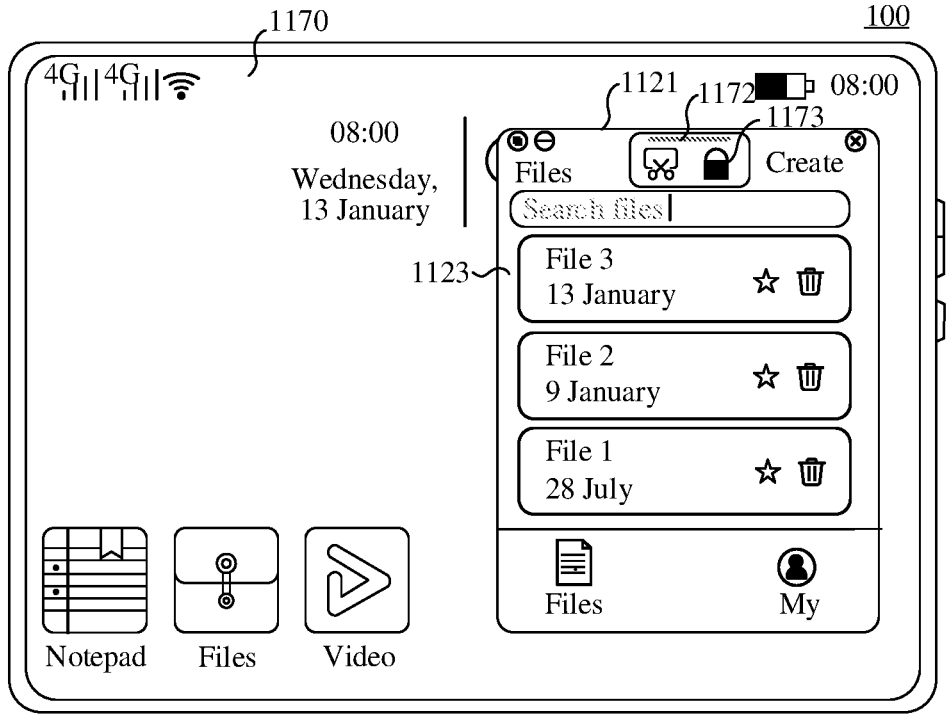

For example, as shown in FIG. 8G, the electronic device 100 may receive an operation (for example, touching and holding) performed by the user on the horizontal bar 1122 shown in FIG. 8C. In response to the operation, the electronic device 100 may display a horizontal bar menu 1172 on a floating window 1121. For a text description of an interface 1170, refer to the embodiment shown in FIG. 8C. Details are not described herein again. The floating window 1121 may be displayed at an upper layer than the interface 1170. The floating window 1121 may include the horizontal bar menu 1172. The horizontal bar menu 1172 may include a lock control 1173 and another control (for example, a screenshot control). The lock control 1173 may be configured to lock the floating window 1121. The screenshot control may be configured to trigger the electronic device 100 to capture page content displayed in the floating window 1121. The electronic device 100 may lock the floating window 1121 in response to an input operation performed by the user on the lock control 1173. When the floating window 1121 is locked, the electronic device 100 may display a page to switch to in the locked floating window after receiving a page switching operation performed by the user in the floating window 1121.

In a possible implementation, in a process of dragging the floating window, the electronic device 100 may display one, two, or more locked hot zones (for example, an upper left corner area and/or an upper right corner area of the display screen of the electronic device 100). When the electronic device 100 detects that a specified floating window is dragged to a position near the locked hot zone, in response to the operation, the electronic device 100 may lock the specified floating window, and the electronic device 100 may display the locked floating window at the position of the specified floating window after the dragging operation. In this way, not only more operation gestures can be supported to lock the floating window, but also a scenario in which the floating window is locked due to an accidental touch of the horizontal bar can be avoided.

Figure 9A:
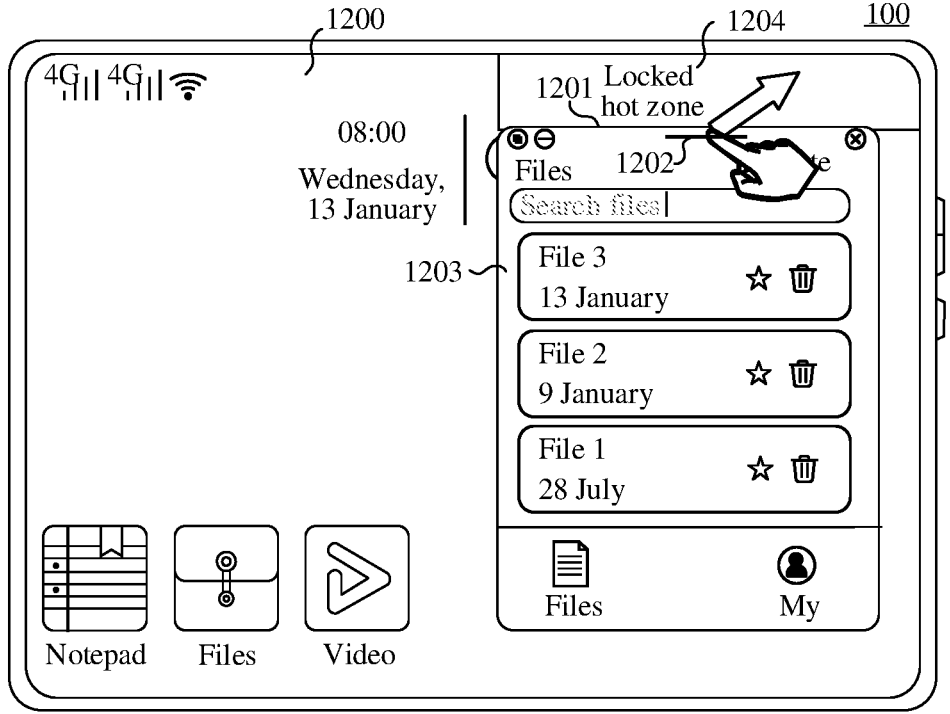
FIG. 9A to FIG. 9E are schematic diagrams of another group of interfaces according to embodiments of this application.
Figure 11A:
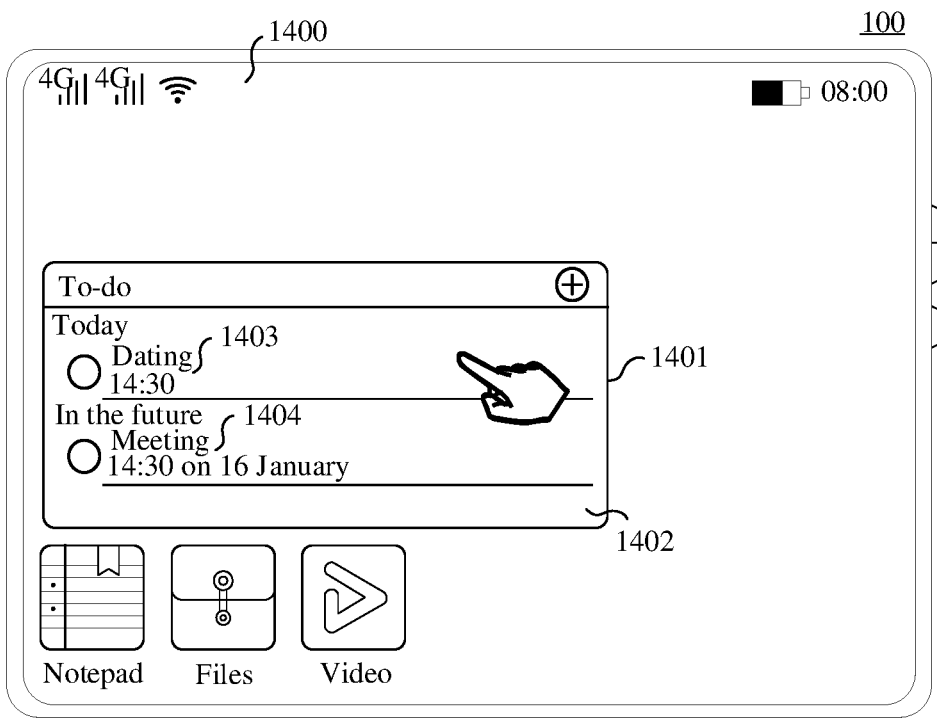
FIG. 11A to FIG. 11E are schematic diagrams of another group of interfaces according to embodiments of this application.
Figure 11B:
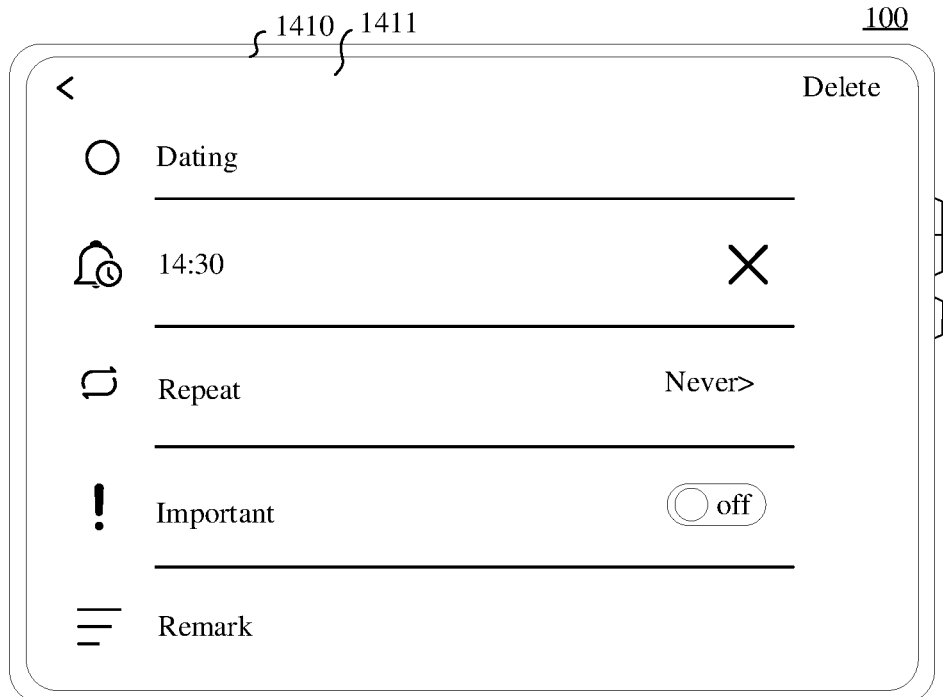
Figure 11C:
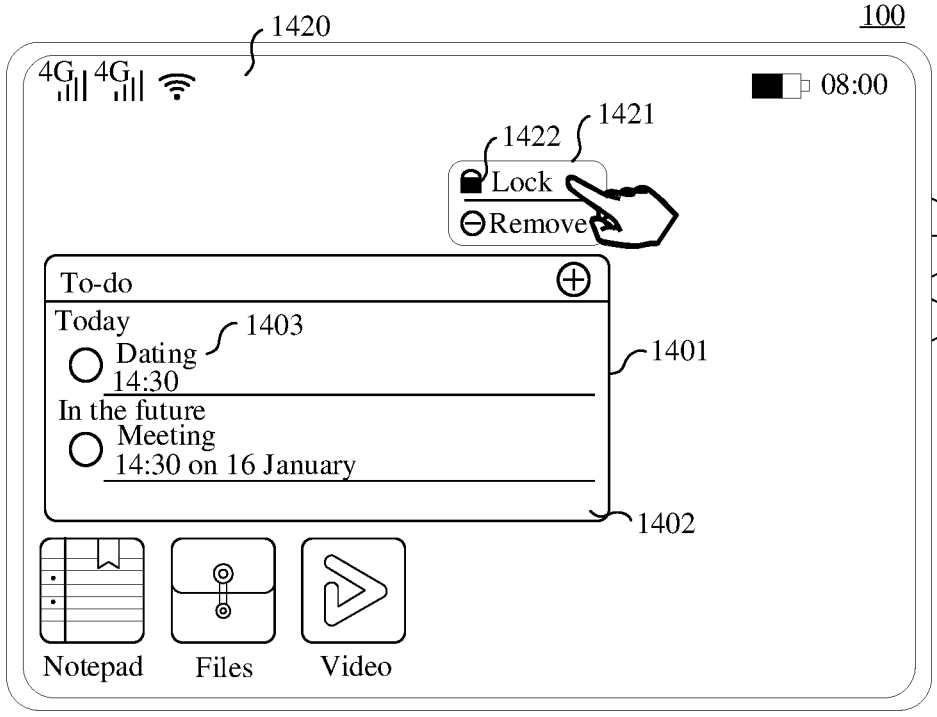

For example, the electronic device 100 may receive an operation (for example, dragging) performed by the user on the horizontal bar 1122 shown in FIG. 11C. In response to the operation, the electronic device 100 may display an interface 1200 shown in FIG. 9A.

For a text description of the interface 1200, refer to the embodiment shown in FIG. 8C. Details are not described herein again. A locked hot zone 1204 is displayed on the interface 1200. The locked hot zone 1204 may be used to trigger the electronic device 100 to lock a floating window 1201.

The electronic device 100 receives an operation (for example, dragging to a position near the locked hot zone 1204) performed by the user on a horizontal bar 1202. In response to the operation, the electronic device 100 may display an interface 1210 shown in FIG. 9B.

Figure 9B:
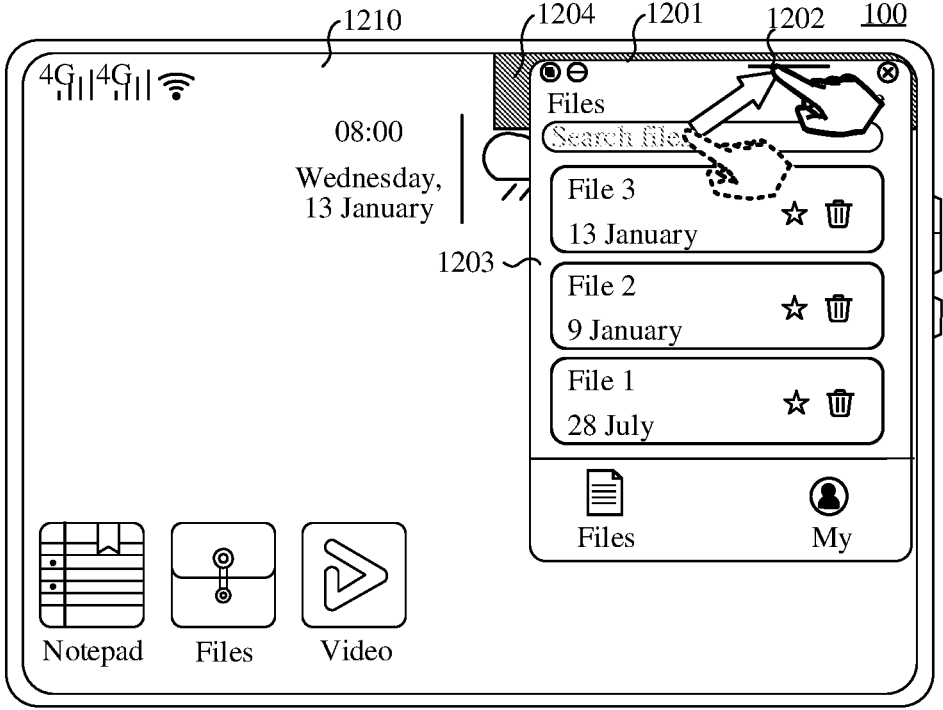

As shown in FIG. 9B, for a text description of the interface 1210, refer to the embodiment shown in FIG. 8C. Details are not described herein again. A locked hot zone 1204 is displayed on the interface 1200. A floating window 1201 is in a locked hot zone range of the electronic device 100.

The electronic device 100 receives an operation (for example, releasing in the locked hot zone 1204) performed by the user on a horizontal bar 1202 shown in FIG. 9B. In response to the operation, the electronic device 100 may display an interface 1220 shown in FIG. 9C.

Figure 9C:
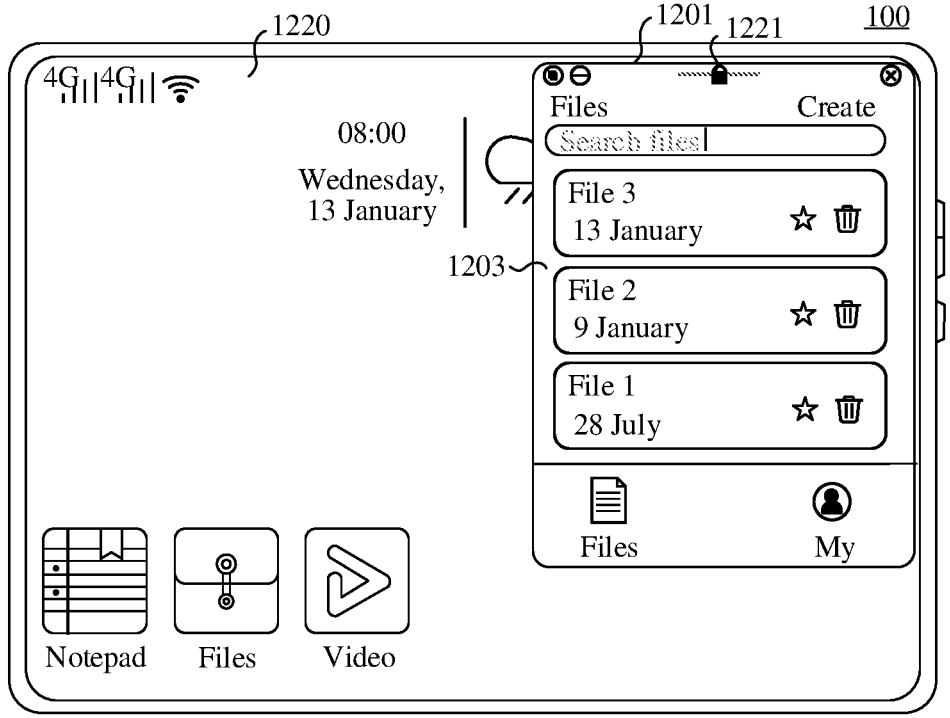

For example, as shown in FIG. 9C, for a text description of the interface 1220, refer to the embodiment shown in FIG. 8C. Details are not described herein again. The electronic device 100 may display a floating window 1201 on the interface 1220. The floating window 1201 may include a lock icon 1221. The lock icon 1221 may indicate that the floating window 1201 is locked. A position of the floating window 1201 on the interface 1220 is the same as a position of the floating window 1201 on the interface 1210.

In a possible implementation, when the electronic device 100 detects that a specified floating window is dragged to a position near a locked hot zone, in response to the operation, the electronic device 100 may lock the specified floating window, and the electronic device 100 may display the locked floating window at a position of the specified floating window before the dragging operation.

Figure 9D:
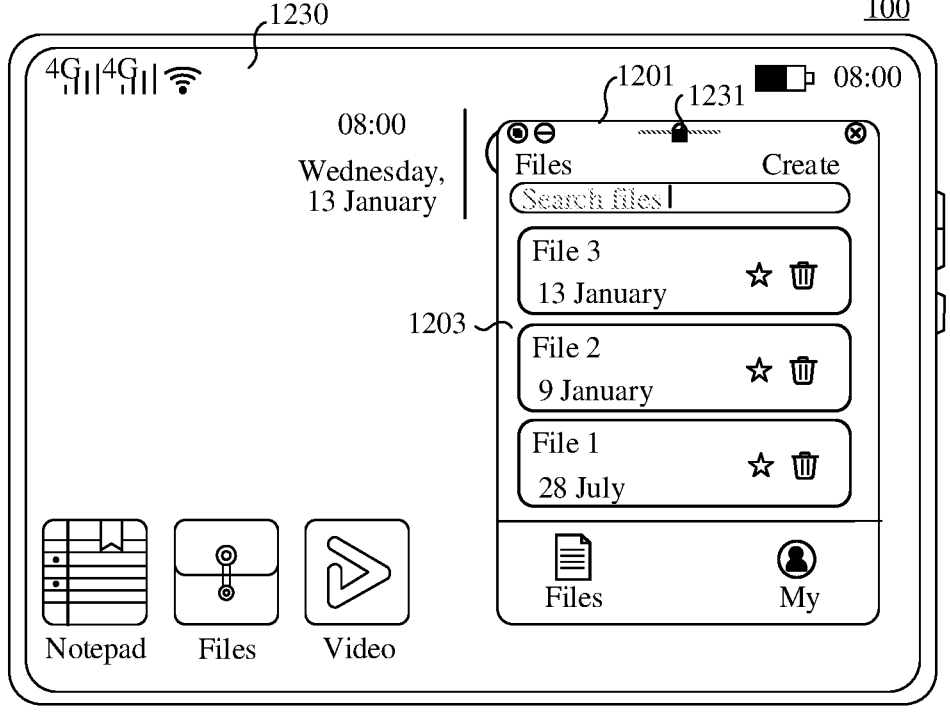

For example, as shown in FIG. 9D, the electronic device 100 receives an operation (for example, releasing in a locked hot zone) performed by the user on the horizontal bar 1202 shown in FIG. 9B. In response to the operation, the electronic device 100 may display a floating window 1201 at an upper layer than an interface 1230. The floating window 1201 may include a lock icon 1231 and a page 1203. A position of the floating window 1201 on the interface 1230 is the same as a position of the floating window 1201 on the interface 1200. For a text description of the interface 1230, refer to the embodiment shown in FIG. 8C. Details are not described herein again.

Optionally, the electronic device 100 may unlock a locked floating window in response to an operation (for example, tap) performed by the user on the lock icon.

Optionally, when the electronic device 100 detects that the locked floating window is dragged to a position near the locked hot zone, in response to the operation, the electronic device 100 may unlock the specified floating window, and the electronic device 100 may display the unlocked floating window at a position of the specified floating window before the dragging operation.

In a possible implementation, when the electronic device 100 detects that the specified floating window is dragged to a position near the locked hot zone, in response to the operation, the electronic device 100 may lock the specified floating window and reduce a size of the floating window to a preset size (where the preset size is less than an original size of the specified floating window), and the electronic device 100 may display the locked floating window at the position of the specified floating window after the dragging operation.

Figure 9E:
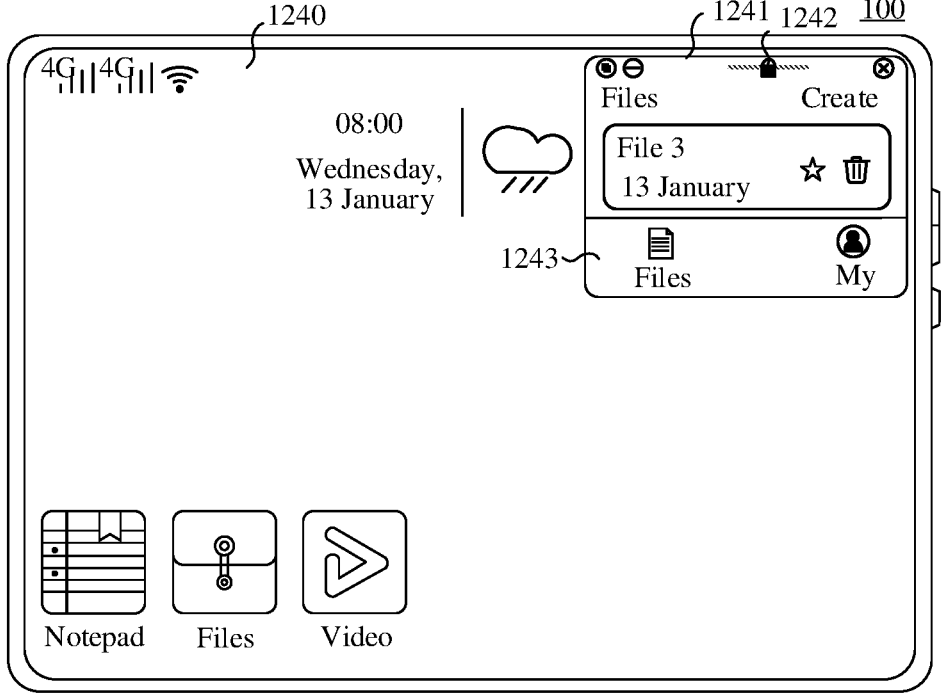

For example, as shown in FIG. 9E, the electronic device 100 receives an operation (for example, releasing in a locked hot zone) performed by the user on the horizontal bar 1202 shown in FIG. 9B. In response to the operation, the electronic device 100 may display a floating window 1241 at an upper layer than the interface 1210. The floating window 1241 may include a lock icon 1242 and a page 1243. A position of the floating window 1241 on the interface 1240 is the same as a position of the floating window 1201 on the interface 1210. A size of the floating window 1241 is a preset size, and the preset size is less than a size of the floating window 1201. For a text description of the interface 1240, refer to the embodiment shown in FIG. 8C. Details are not described herein again.

Optionally, the electronic device 100 may display a locked floating window with a preset size at a position of the specified floating window before the dragging operation.

In a possible implementation, a device type of the electronic device 100 may be a personal computer, a laptop computer, or a tablet computer in a PC mode. The electronic device 100 may concurrently display a plurality of floating windows in a stack manner. The electronic device 100 may display the locked floating window at an uppermost layer of the plurality of floating windows in a stack manner in response to an input performed by the user to lock the specified floating window. When the electronic device 100 displays a new floating window in response to an input operation performed by the user to create the new floating window, the electronic device 100 may keep displaying the locked floating window at an upper layer than the new floating window in a stack manner. In this way, the electronic device 100 can keep displaying a locked window at an uppermost layer of the interface, without requiring an additional operation (for example, switching a window) of the user, and the locked window is not covered.

Figure 10A:
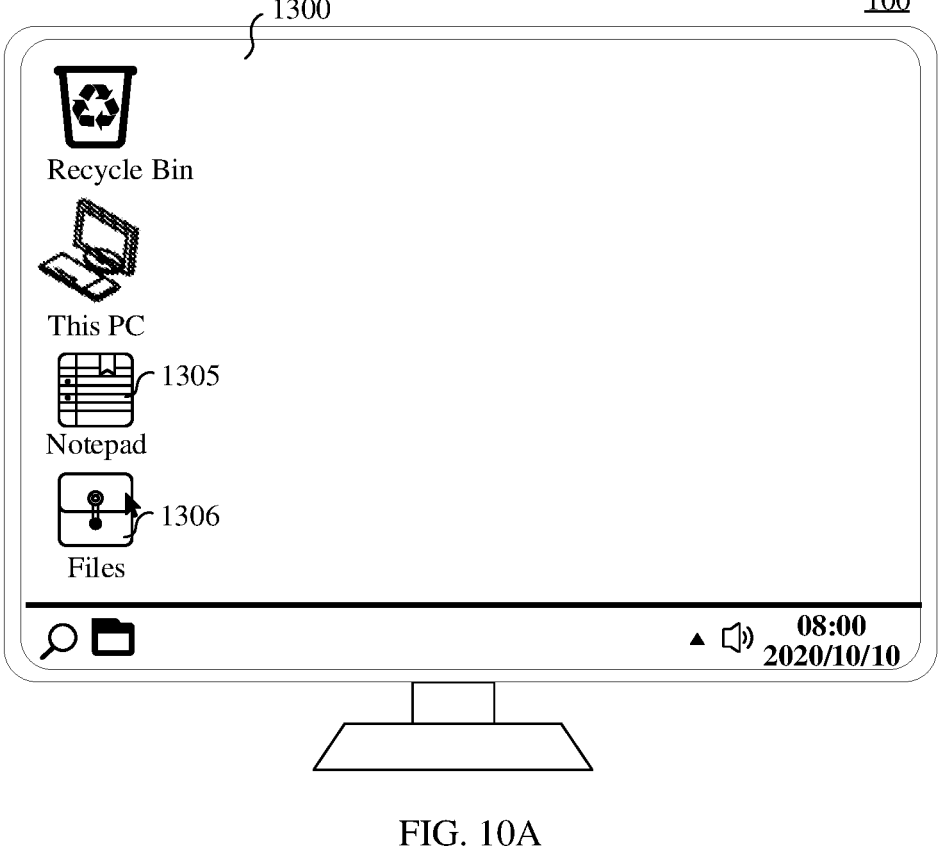
FIG. 10A to FIG. 10E are schematic diagrams of another group of interfaces according to embodiments of this application.

For example, as shown in FIG. 10A, the electronic device 100 displays an interface 1300 (which may be referred to as a desktop). The interface 1300 may include a plurality of application icons (for example, a recycle bin icon, a this PC icon, a notepad icon 1301, and a files icon 1305). Optionally, the electronic device 100 may display a taskbar below the plurality of application icons, and the taskbar may display a plurality of shortcut icons (for example, a search icon and a folder icon).

The electronic device 100 may receive an operation (for example, double click with a left mouse button) performed by the user on the files icon 1306. In response to the operation, the electronic device 100 may display an interface 1301 shown in FIG. 10B.

Figure 10B:
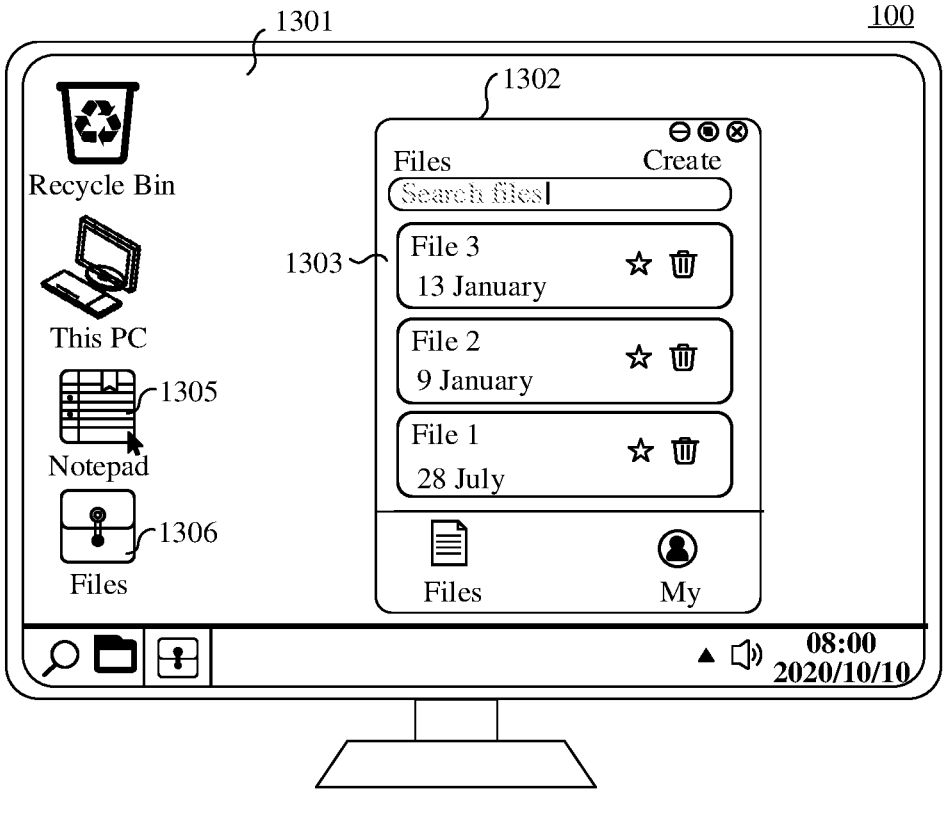

As shown in FIG. 10B, for a text description of the interface 1301, refer to the embodiment shown in FIG. 10A. Details are not described herein again. The electronic device 100 may display a floating window 1302 on the interface 1301. The floating window 1302 may include a minimize control, a maximize control, a close control, a page 1303, and the like. For a text description of the page 1303, refer to the embodiment shown in FIG. 8C. Details are not described herein again.

The electronic device 100 may receive an operation (for example, double click with a left mouse button) performed by the user on a notepad icon 1305. In response to the operation, the electronic device 100 may display an interface 1310 shown in FIG. 10C.

Figure 10C:
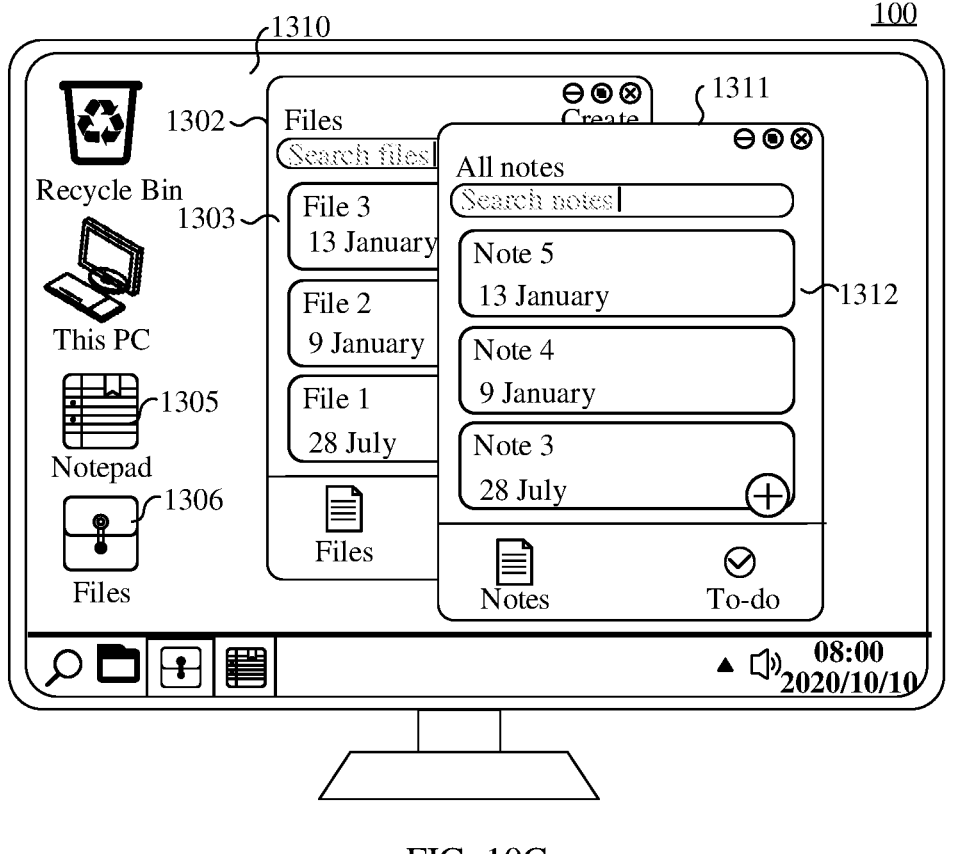

As shown in FIG. 10C, for a text description of the interface 1310, refer to the embodiment shown in FIG. 10B. Details are not described herein again. The electronic device 100 may display a floating window 1302 at an upper layer than the interface 1310, and display a floating window 1311 at an upper layer than the floating window 1302. The floating window 1311 may include a minimize control, a maximize control, a close control, a page 1312, and the like. For a text description of the page 1312, refer to the embodiment shown in FIG. 3B. Details are not described herein again.

It can be learned from the foregoing that, when the floating window 1302 is not locked, the electronic device 100 may display a new floating window 1311 at the upper layer than the floating window 1302 in response to an operation (for example, double click with a left mouse button) performed by the user on a notepad icon 1305.

The electronic device 100 may receive an operation (for example, double click with a left mouse button) performed by the user on the floating window 1302 (for example, an upper frame) in FIG. 10B. In response to the operation, the electronic device 100 may display an interface 1320 shown in FIG. 10D.

Figure 10D:
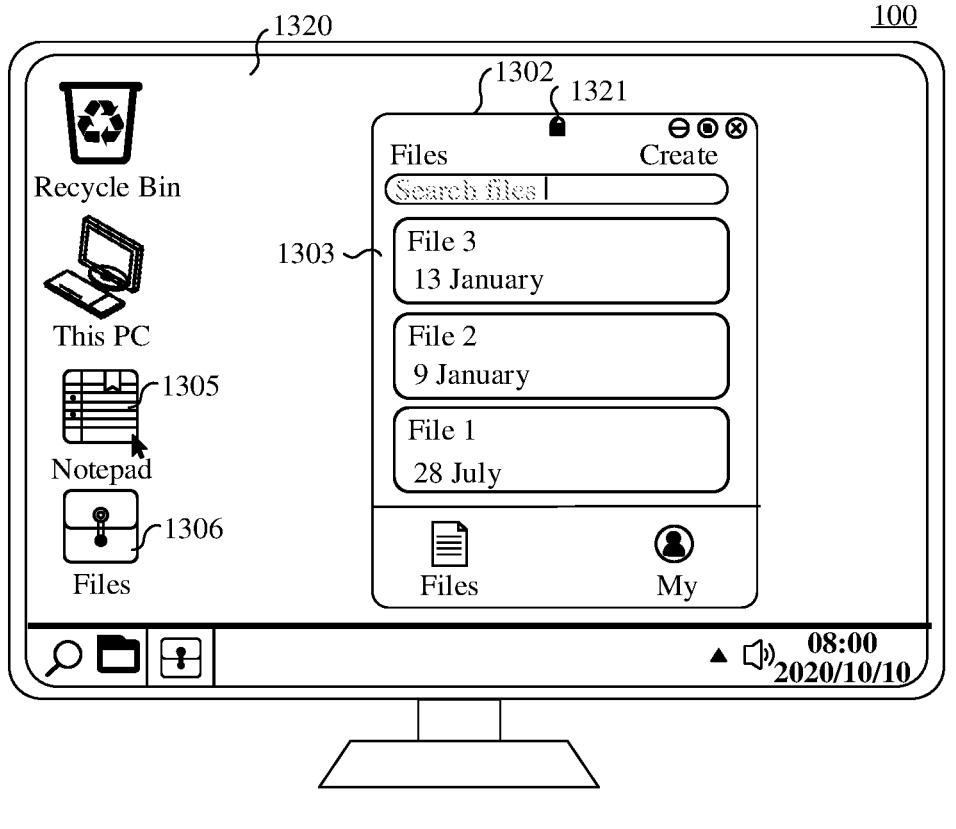

As shown in FIG. 10D, for a text description of the interface 1320, refer to the embodiment shown in FIG. 10B. Details are not described herein again. The electronic device 100 may display a floating window 1302 on the interface 1320. The floating window 1302 may include a lock icon 1321, a page 1303, and the like. The lock icon 1321 may indicate that the floating window 1302 is in a locked state. The electronic device 100 may display a page to switch to in the floating window 1302 in response to a page switching operation performed by the user on the floating window 1302. The electronic device 100 may display a created window at a lower layer than the floating window 1302 in response to an operation performed by the user to create a window.

The electronic device 100 may receive an operation (for example, double click with a left mouse button) performed by the user on a notepad icon 1305. In response to the operation, the electronic device 100 may display an interface 1330 shown in FIG. 10E.

Figure 10E:
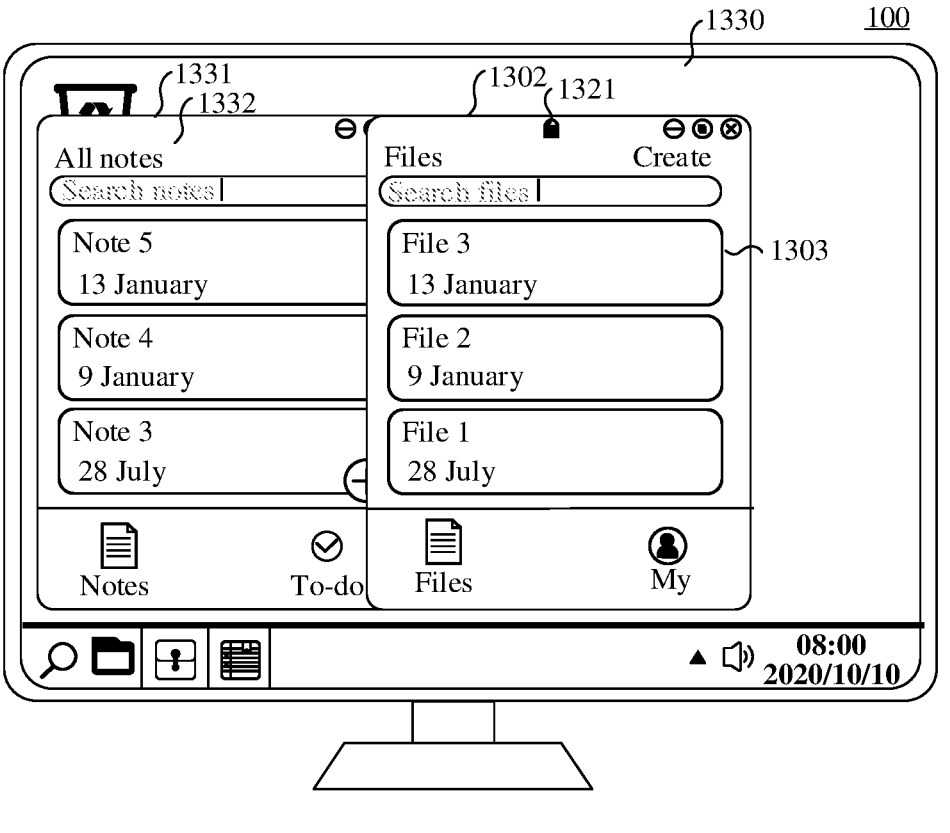

As shown in FIG. 10E, for a text description of the interface 1330, refer to the embodiment shown in FIG. 10C. Details are not described herein again. The electronic device 100 may display a window 1331 at an upper layer than the interface 1330, and display a floating window 1302 at an upper layer than the window 1331. Because the floating window 1302 is locked, the electronic device 100 may display the locked window at an uppermost layer. In this way, no additional operation (for example, switching a window) of the user is required, and the locked window is also not covered.

In a possible implementation, a quantity of floating windows that can be displayed by the electronic device 100 is limited. For example, the electronic device 100 may display a maximum of N floating windows (where N is a positive integer, for example, N may be 2) on the display screen. If the electronic device 100 has displayed N floating windows, when the electronic device 100 receives an operation performed by the user to display a new floating window, in response to the operation, the electronic device 100 may minimize a floating window whose creation time is the earliest. The electronic device 100 may receive an operation performed by the user to lock a specified floating window. The electronic device 100 may lock the specified floating window in response to the operation. Herein, the specified floating window may be a window whose creation time is the earliest. When the electronic device 100 has displayed N windows including a locked floating window, if the electronic device 100 receives an operation performed by the user to display a new floating window, in response to the operation, the electronic device 100 may minimize a window whose creation time is the earliest other than the locked floating window.

In this way, the electronic device 100 not only can ensure that the locked window is not covered, but also can ensure that the locked window is not minimized.

It should be noted that all the foregoing embodiments may be applied to the electronic device 100. A device type of the electronic device 100 may be a mobile phone, a personal computer, a laptop computer, or a tablet computer.

The following specifically describes, with reference to application scenarios, a display method provided in embodiments of this application.

In some application scenarios, an interface displayed by an electronic device 100 includes a card of a specified application (for example, a notepad application), and the card of the specified application displays specified function information of the specified application. When the card of the specified application is not locked, the electronic device 100 may receive an operation (for example, tap) performed by a user on the card of the specified application. The electronic device 100 may display a specified page of the specified application in full screen in response to the operation. When the card of the specified application is locked, the electronic device 100 may receive an operation (for example, tap) performed by a user on the locked card. The electronic device 100 may display a specified page of the specified application on the locked card in response to the operation. In this way, not only the electronic device 100 can enrich a display style for displaying the interface, but also the electronic device 100 can display, on the current interface, a page corresponding to card content.

In an embodiment of this application, the card of the specified application may display some function information of the specified application, and the some function information may be used to trigger the electronic device 100 to display the specified page of the specified application. In other words, the electronic device 100 may display the specified page of the specified application in full screen in response to an input (for example, tap) performed by the user on the card of the specified application. The card may be displayed on a desktop or another specified shortcut interface (for example, HiBoard or a service center), and the card may be added or deleted by the user. Some cards may be referred to as window widgets (widgets). Optionally, the card may display some function information of a plurality of specified applications.

In an embodiment of this application, the card of the specified application may further display the specified page of the specified application in the card.

For example, as shown in FIG. 11A, the electronic device 100 may display a desktop 1400, where the desktop 1400 may include a plurality of application icons (for example, a notepad application icon, a files application icon, and a video application icon). The desktop 1400 may further include one or more cards (for example, a to-do card 1401). Optionally, a status bar including an icon like a power identifying icon may be further displayed at the top of the desktop 1400.

The to-do card 1401 may include to-do function information 1402. The to-do function information 1402 belongs to a notepad application. For example, the to-do function information 1402 may be a part of a page including a to-do event display area. The page including the to-do event display area may be obtained by the electronic device 100 in response to an operation performed by the user on the to-do control shown in FIG. 3B. The to-do function information 1402 may include a create icon, the to-do event display area, and the like. The to-do event display area may include to-do events (for example, a to-do event 1403 and a to-do event 1404) that have been added by the user. The create icon may be used to create a to-do event. The to-do event may be used to trigger the electronic device 100 to display a to-do editing page of the to-do event. In some embodiments, the to-do card 1401 may be obtained by using the notepad application icon. For example, the electronic device 100 may display the to-do card 1401 on the desktop 1400 in response to an operation (for example, touching and holding or swiping up) on the notepad application icon.

The electronic device 100 may receive an operation (for example, tap) performed by the user on the to-do event 1403. In response to the operation, the electronic device 100 may display a notepad application interface 1410 shown in FIG. 11B.

For example, as shown in FIG. 11B, the notepad application interface 1410 may include a to-do editing page 1411. The to-do editing page 1411 may include a return control, a delete control, a content entry, a time entry, a repeat entry, an important entry, a remark entry, and the like. The return control may be configured to return to display a desktop. The delete control may be configured to delete a to-do event 1403. The title entry may be used to receive a title entered by the user. The time entry may be used to receive reminder time entered by the user. The repeat entry may be used to set whether the to-do event 1403 needs to be repeatedly reminded. The important item may be used to mark whether the to-do event 1403 is important. The remark item may be used to receive remark content entered by the user.

It can be learned from the foregoing that, when a to-do card is not locked, the electronic device 100 may display a page to switch to in full screen in response to a page switching operation performed on the to-do card.

The electronic device 100 may receive an operation (for example, touching and holding) performed by the user on the to-do card 1401 shown in FIG. 11A. In response to the operation, the electronic device 100 may display an interface 1420 shown in FIG. 11C.

As shown in FIG. 11C, for a part that is of the interface 1420 and that is not described in detail, refer to the embodiment shown in FIG. 11A. Details are not described herein again. A function menu 1421 of a to-do card 1401 may be further displayed on the interface 1420. The function menu 1421 may include a lock control 1422 and another control (for example, a remove control). The lock control 1422 may be configured to lock the to-do card 1401. The remove control may be configured to trigger the electronic device 100 to remove the to-do card 1401.

The electronic device 100 may receive an operation (for example, tap) performed by the user on the lock control 1422. In response to the operation, the electronic device 100 may lock the to-do card 1401, and display an interface 1430 shown in FIG. 11D.

Figure 11D:
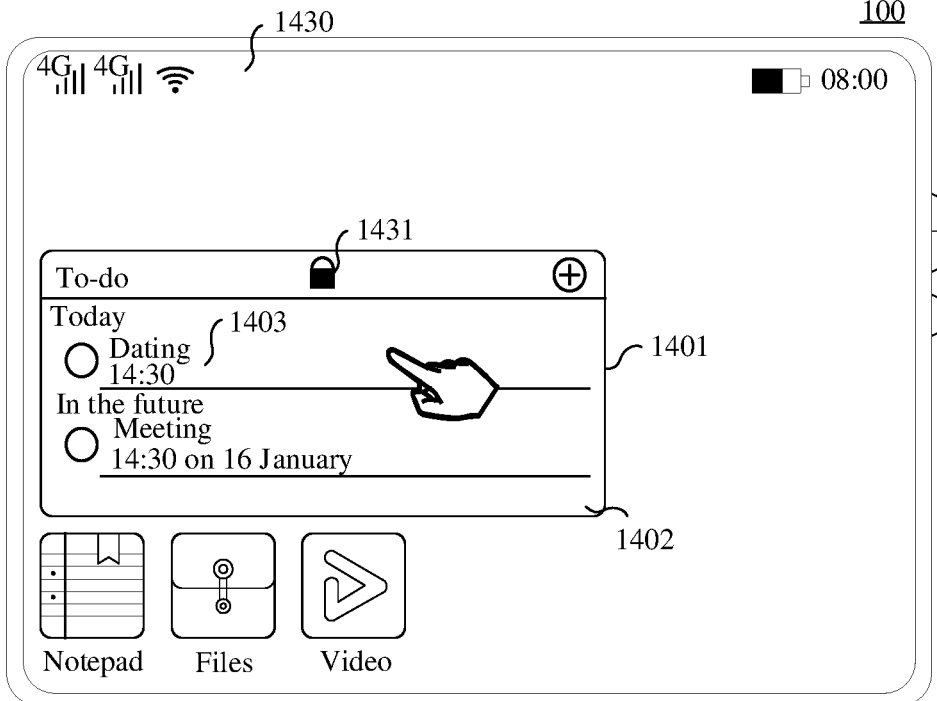

As shown in FIG. 11D, for a part that is of the interface 1430 and that is not described in detail, refer to the embodiment shown in FIG. 11A. Details are not described herein again. The to-do card 1401 may further include a lock icon 1431. The lock icon 1431 may indicate that the to-do card 1401 is locked, and the electronic device 100 may display a page to switch to on the locked to-do card in response to a page switching operation on the to-do card.

The electronic device 100 may receive an operation (for example, tap) performed by the user on a to-do event 1403 shown in FIG. 11D. In response to the operation, the electronic device 100 may display an interface 1440 shown in FIG. 11E.

Figure 11E:
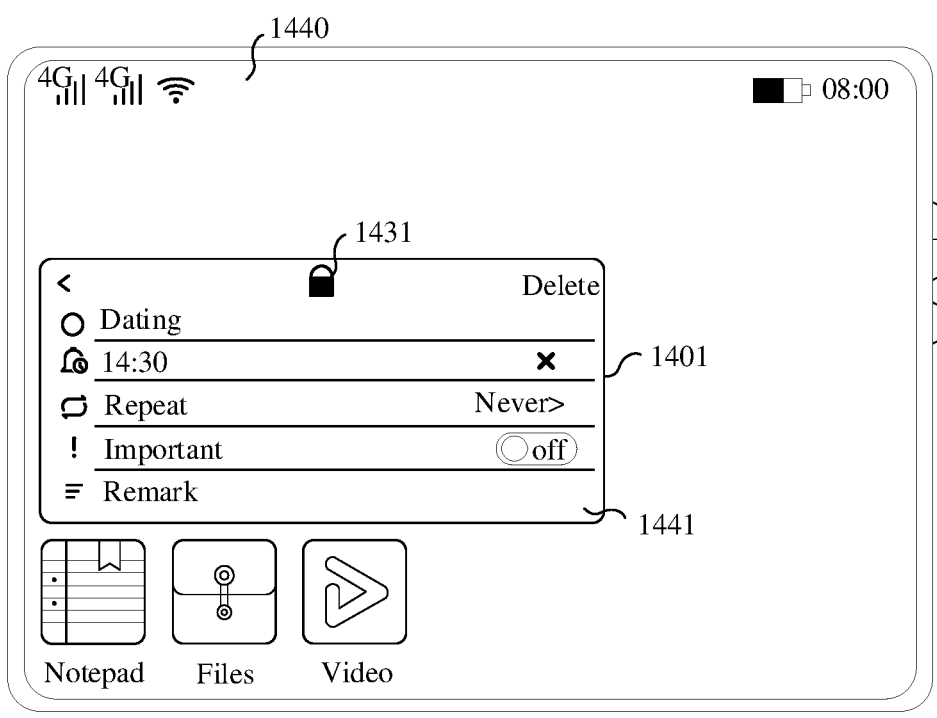

For example, as shown in FIG. 11E, for a part that is of the interface 1440 and that is not described in detail, refer to the embodiment shown in FIG. 11A. Details are not described herein again. A to-do card 1401 may include a lock icon 1431 and a page 1441. For a part that is of the page 1441 and that is not described in detail, refer to the embodiment shown in FIG. 11B. Details are not described herein again.

Optionally, the electronic device 100 may alternatively receive an operation (for example, double tap) performed by the user on an upper frame of the to-do card 1401 of a notepad application. The electronic device 100 may lock the to-do card 1401 in response to the operation.

Optionally, the electronic device 100 may alternatively receive an operation (for example, tap) performed by the user on the lock icon 1431. The electronic device 100 may unlock the locked to-do card 1401 in response to the operation.

Optionally, the card locking operation and the card unlocking operation each are not limited to a double-tap operation or an operation on the lock control, and may be an operation of dragging a specified card to a position near a locked hot zone (for example, an upper left corner area and/or an upper right corner area of a display screen of the electronic device 100), or an operation of another type. This is not limited herein.

In this way, the electronic device 100 can display, on a current interface, a page corresponding to a locked card.

The following specifically describes, with reference to application scenarios, a display method provided in embodiments of this application.

In some application scenarios, an electronic device 100 may display an interface of a first application, where the interface of the first application includes at least two windows. The at least two windows may include a first window and a second window. A first page of the first application is displayed in the first window, and a second page of the first application is displayed in the second window. The second page is a sub page of the first page. When the second page is not locked, the electronic device 100 may receive an operation performed by a user on a new page open control, and display a third page in the second window in response to the operation. When the second page is locked, the electronic device 100 may receive an operation performed by a user on a new page open control, and display a third page in the first window in response to the operation, where the third page is a sub page of the second page.

For example, the electronic device 100 may receive an operation (for example, tap) performed by the user on the video application icon 303 shown in FIG. 3A. In response to the operation, the electronic device 100 may display a video application interface 1610 shown in FIG. 12A. The video application interface 1610 may include a window 1620 and a window 1630. The window 1620 may be displayed in a display area 1612 on a display screen of the electronic device 100, and the window 1630 may be displayed in a display area 1613 on the display screen of the electronic device 100. For example, the display area 1612 may be a left half area of the display screen, and the display area 1613 may be a right half area of the display screen. In some other embodiments, the video application interface 1610 may further include a division line 1611. The division line 1611 may be displayed at a junction of the window 1620 and the window 1630. The division line 1611 may be used to trigger the electronic device 100 to receive and respond to a user input (for example, dragging to the left) for adjusting horizontal lengths of the window 1620 and the window 1630. Optionally, the division line 1611 may be further used to trigger the electronic device 100 to receive and respond to a user input for locking a video recommendation page 1621 and a historical record page 1631.

The video recommendation page 1621 may be displayed in the window 1620. A video display area and the like may be displayed on the video recommendation page 1621. The video recommendation page 1621 may further include a horizontal bar 1622. The horizontal bar 1622 may be used to lock the video recommendation page 1621. In some embodiments, a historical record control, a personal center control, a video search bar, and the like may be further displayed on the video recommendation page 1621. The historical record control may be configured to trigger the electronic device 100 to display a historical record page (for example, the historical record page 1631) of a video application. The personal center control may be configured to trigger the electronic device 100 to display a page including personal account information. A video search bar may be used to trigger the electronic device 100 to receive and respond to a user input for displaying some video options. The video display area may include a plurality of video options, and the plurality of video options may be used to trigger the electronic device 100 to display a corresponding video playback page.

The historical record page 1631 may be displayed in the window 1630. A historical video option (for example, a historical video option 1633) of a video that has been watched by the user may be displayed in the historical record page 1631. The historical video option may be used to trigger the electronic device 100 to display a video playback page corresponding to the historical video option. The window 1630 may further include a horizontal bar 1632. The horizontal bar 1632 may be used to lock the historical record page 1631.

In some other embodiments, the electronic device 100 may receive an operation (for example, tap) performed by the user on the video application icon 303 shown in FIG. 3A. In response to the operation, the electronic device 100 may independently display an interface including the video recommendation page 1621. Then, in response to an operation (for example, tap) performed by the user on a historical record control of the interface including the video recommendation page 1621, the electronic device 100 may display the video application interface 1610 shown in FIG. 12A.

The electronic device 100 may receive an operation (for example, tap) performed by the user on the historical video option 1633. In response to the operation, the electronic device 100 may display a video application interface 1640 shown in FIG. 12B.

Figure 12A:
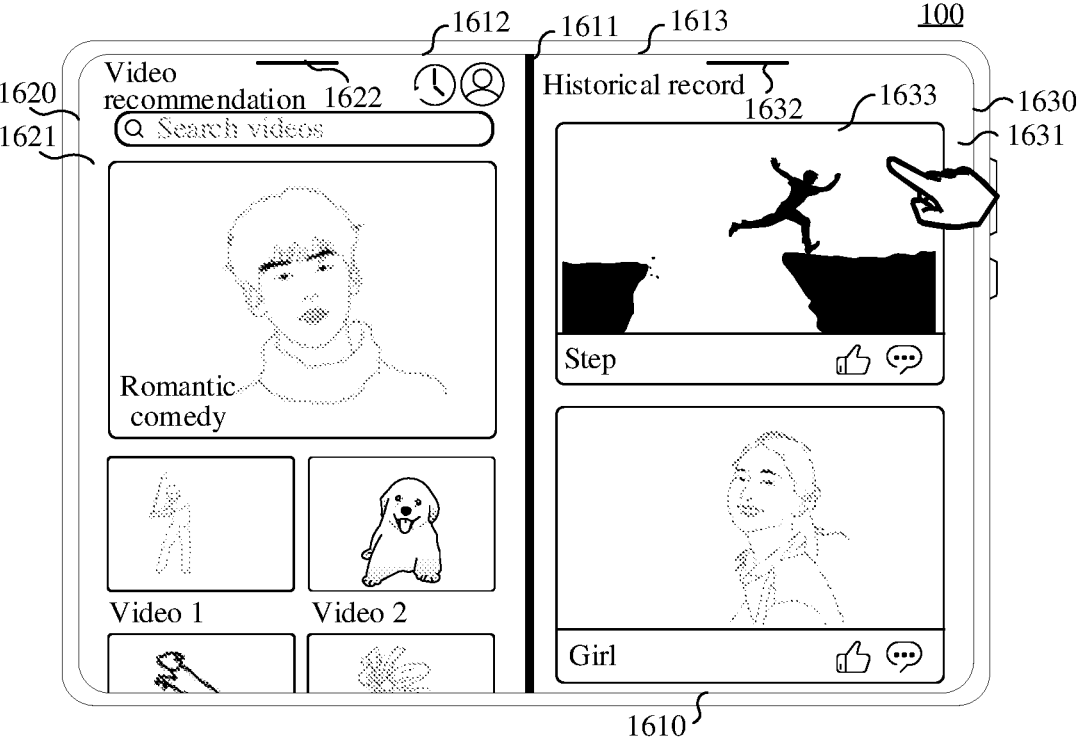
FIG. 12A to FIG. 12E are schematic diagrams of another group of interfaces according to embodiments of this application.
Figure 12B:
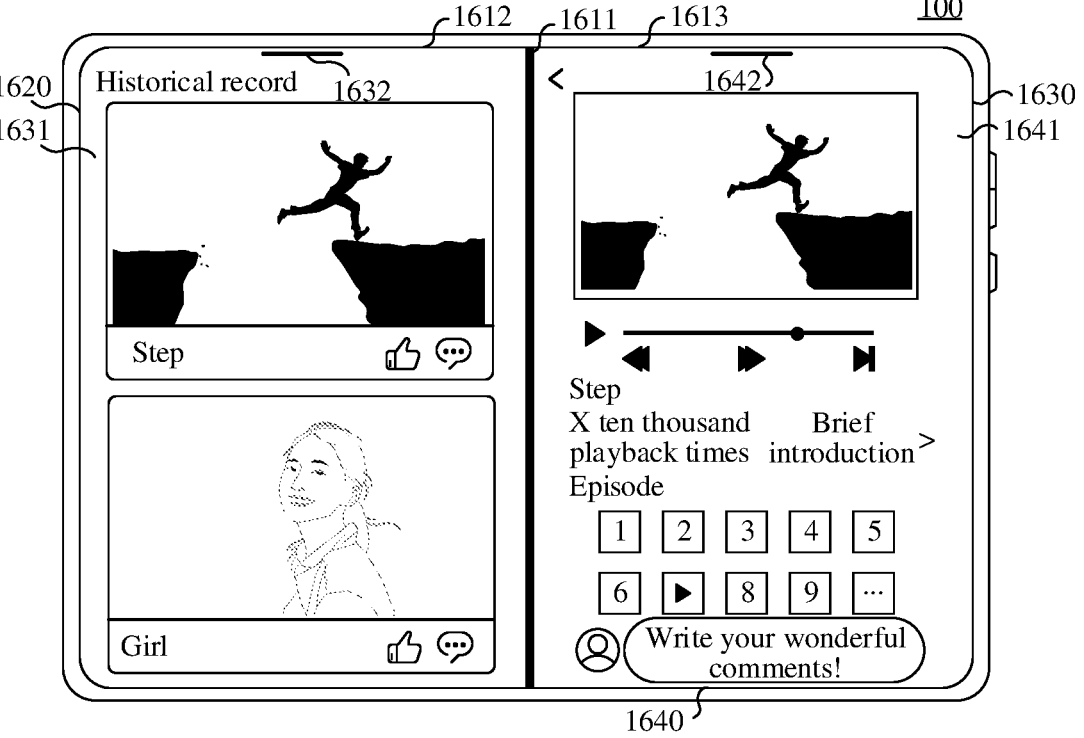

As shown in FIG. 12B, the video application interface 1640 may include a window 1620, a window 1630, and a division line 1611. The window 1620 may be displayed in a display area 1612 on a display screen of the electronic device 100, and the window 1630 may be displayed in a display area 1613 on the display screen of the electronic device 100.

A historical record page 1631 may be displayed in the window 1620. A video playback page 1641 may be displayed in the window 1630. A video playback window, a video playback control, a video episode list, and the like may be displayed on the video playback page 1641. The video playback window may be used to display a video image (for example, a video of a seventh episode of "Step"). The video playback control is configured to trigger the electronic device 100 to play/pause/fast forward/rewind a video. The video episode list may be used to display a video playback page corresponding to an episode. For a text description of a part that is of the video application interface 1640 and that is not described in detail, refer to the embodiment shown in FIG. 12A. Details are not described herein again.

It can be learned from the foregoing that, when the historical record page 1631 is not locked, the electronic device 100 displays a new page (the video playback page 1641) in the window 1630 in response to an operation performed by the user on a new page open control of the historical record page 1631. The historical record page 1631 is displayed in the window 1620.

The electronic device 100 may receive an operation (for example, tap) performed by the user on the horizontal bar 1632 in FIG. 12A. In response to the operation, the electronic device 100 may display a video application interface 1650 shown in FIG. 12C.

Figure 12C:
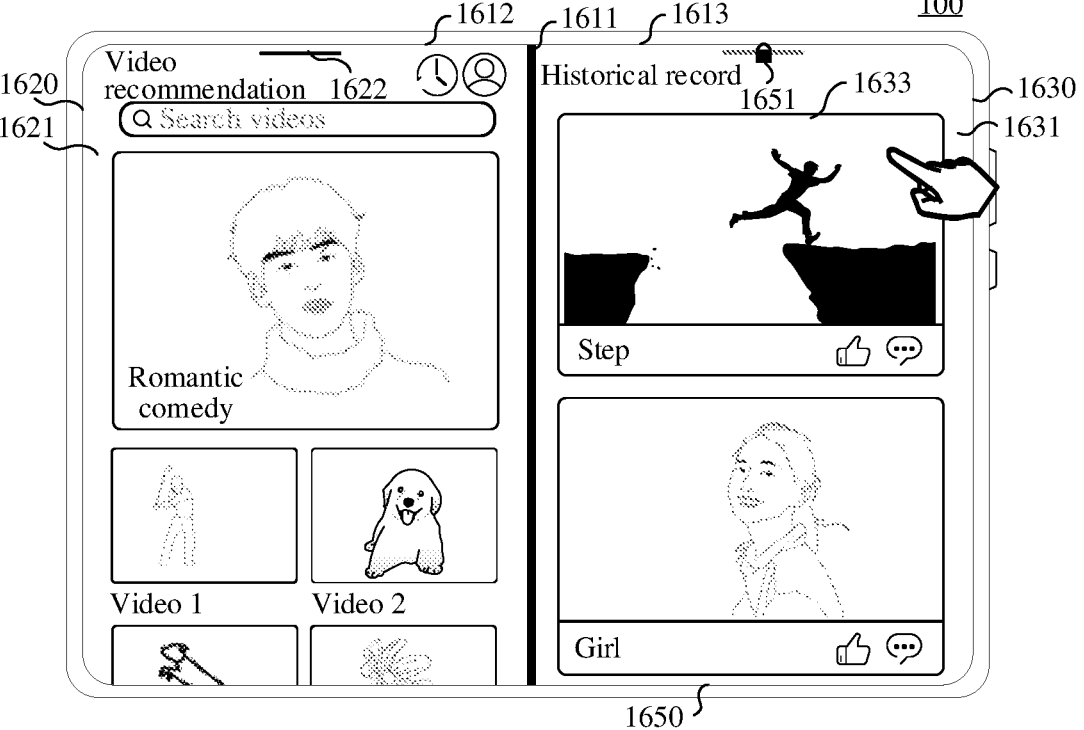

As shown in FIG. 12C, for a text description of the video application interface 1650, refer to the embodiment shown in FIG. 12A. Details are not described herein again. A lock icon 1651 may be displayed on a page 1631 of the video application interface 1650. The lock icon 1651 may indicate that the historical record page 1631 is locked, and the electronic device 100 may display a page to switch to in a window 1620 in response to a page switching operation performed by the user on the page. The lock icon 1651 may be further used to trigger the electronic device 100 to unlock the historical record page 1631.

The electronic device 100 may receive an operation (for example, tap) performed by the user on a historical video option 1633 in FIG. 12C. In response to the operation, the electronic device 100 may display a video application interface 1660 shown in FIG. 12D.

Figure 12D:
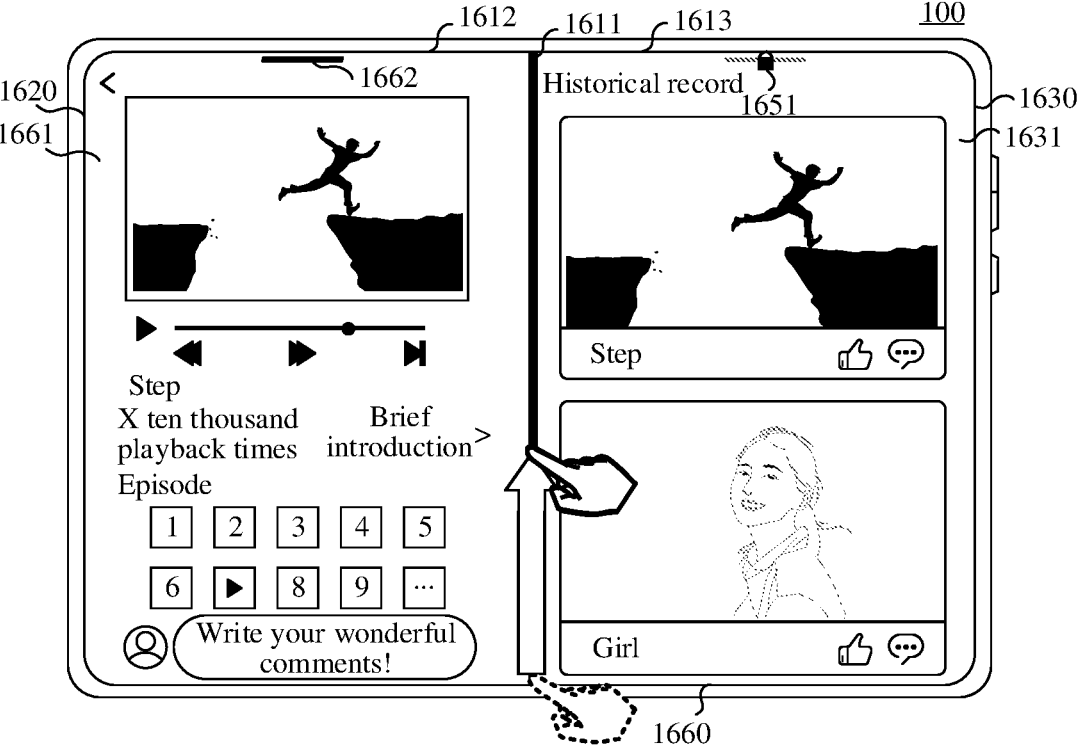

As shown in FIG. 12D, the video application interface 1660 may include a window 1620, a window 1630, and a division line 1611. A video playback page 1661 may be displayed in the window 1620, and a historical record page 1631 may be displayed in the window 1630. The historical record page 1631 may include a lock icon 1651. For a part that is of the video application interface 1660 and that is not described in detail, refer to the embodiment shown in FIG. 12B. Details are not described herein again.

Optionally, the electronic device 100 may receive a page unlocking operation of the user. In response to the operation, the electronic device 100 may display the video application interface 1640 shown in FIG. 12B.

In a possible implementation, the electronic device 100 may display the interface of the first application, where the interface of the first application includes at least two pages. The at least two pages may include the first page and the second page. The first page is displayed in a first display area (for example, a left half area of the display screen of the electronic device 100) on the electronic device 100, and the second page is displayed in a second display area (for example, a right half area of the display screen of the electronic device 100) on the electronic device 100. After the electronic device 100 locks the second page, in response to a desktop return operation of the user, the electronic device 100 may return to display a desktop and the second page in split screen. In this way, the electronic device 100 can display the locked page when returning to display the desktop.

Figure 12E:
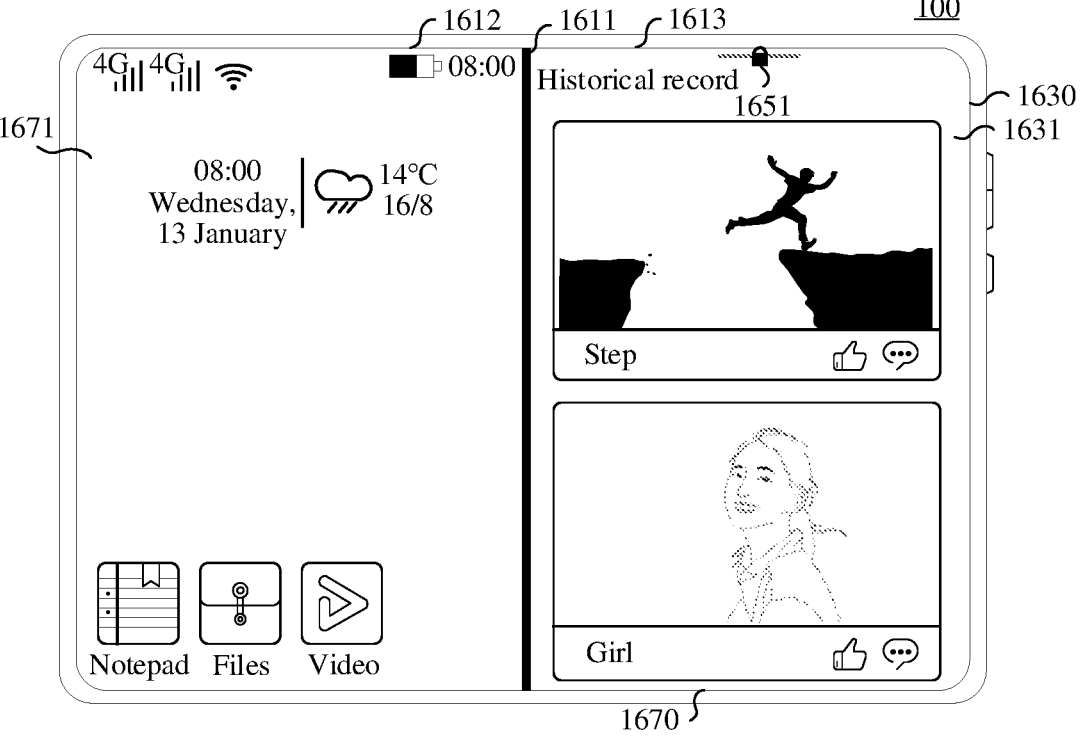

For example, the electronic device 100 may receive an operation (for example, swiping up) performed by the user on the video application interface 1660. In response to the operation, the electronic device 100 may display a split-screen interface 1670 shown in FIG. 12E. The electronic device 100 may display a desktop 1671 in a display area 1612. A historical record page 1651 is displayed in a display area 1613. For a text description of the desktop 1671, refer to the embodiment shown in FIG. 3A. Details are not described herein again. For a text description of the historical record page 1651, refer to the embodiment shown in FIG. 12A. Details are not described herein again.

Optionally, in the scenarios shown in FIG. 12A to FIG. 12E, the electronic device 100 may not display a horizontal bar. The electronic device 100 may display the horizontal bar in an area of a specified page in response to an operation (for example, tap) performed by the user on the specified page.

Optionally, the electronic device 100 may receive an operation (for example, dragging) performed by the user on a window of a locked page. In response to the operation, the electronic device 100 may display a floating window, and display the locked page in the floating window.

In a possible implementation, the electronic device 100 may display the interface of the first application, where the first page is displayed in the first display area on the electronic device 100, and the second page is displayed in the second display area on the electronic device 100. After the electronic device 100 locks both the first page and the second page, the electronic device 100 may receive an operation performed by the user on a new page open control, and in response to the operation, display the floating window on the interface of the first application, and display a third page in the floating window. The third page is a new page displayed by the electronic device 100 after the new page open control is triggered. In this way, the electronic device 100 not only can display the locked page, to ensure that the locked page is not replaced, but also can display a newly opened page.

For example, the electronic device 100 may receive an operation (for example, double tap) performed by the user on a horizontal bar 1622 in FIG. 12D. In response to the operation, the electronic device 100 may display a video application interface 1660 shown in FIG. 13A. For a text description of the video application interface 1660, refer to the embodiment shown in FIG. 12D. Details are not described herein again. A lock icon 1701 is further displayed on a video playback page 1661 of the video application interface 1660. The lock icon may indicate that the video playback page 1661 is locked. A historical video option 1705 is further displayed on a historical record page 1631 of the video application interface 1660.

The electronic device 100 may receive an operation (for example, tap) performed by the user on the historical video option 1705. In response to the operation, the electronic device 100 may display a video application interface 1660 shown in FIG. 13B.

Figure 13A:
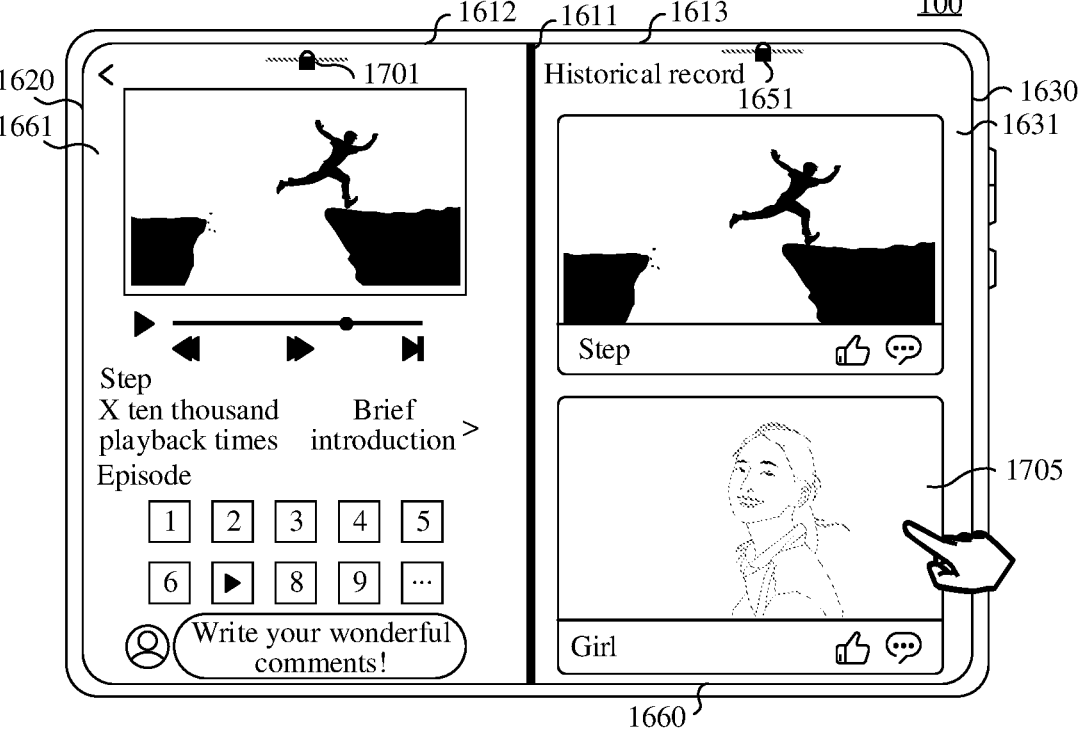
FIG. 13A to FIG. 13E are schematic diagrams of another group of interfaces according to embodiments of this application.
Figure 13B:
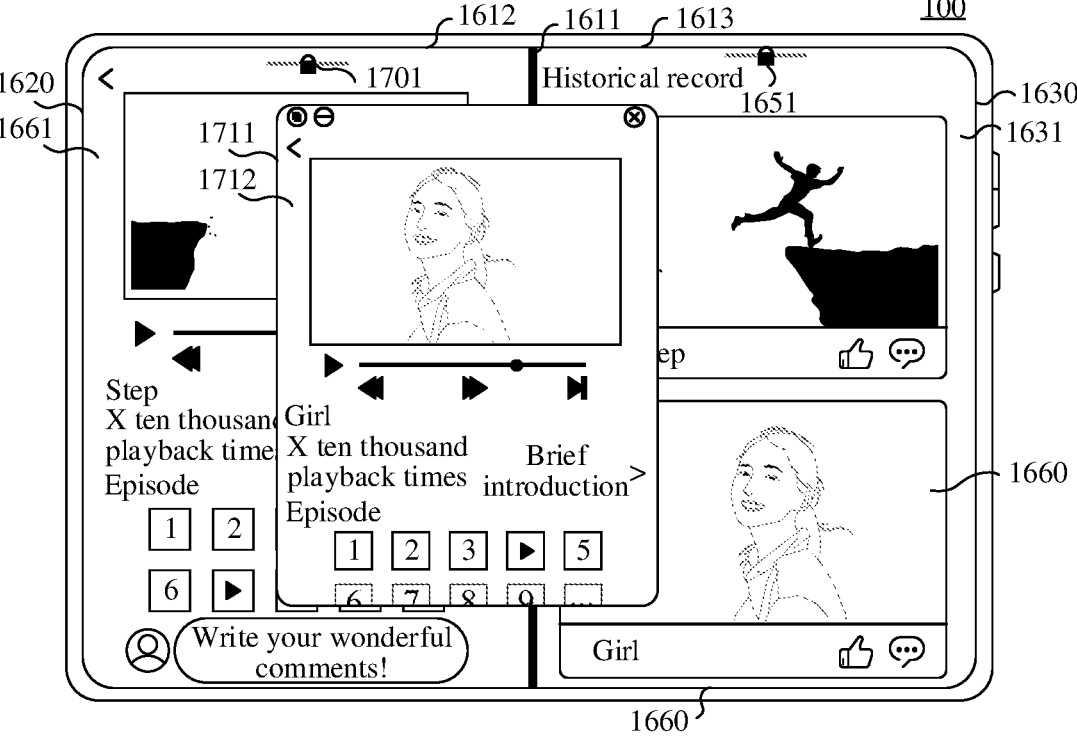

As shown in FIG. 13B, for a text description of the video application interface 1660, refer to the embodiment shown in FIG. 12D. Details are not described herein again. The electronic device 100 may display a floating window 1711 on the video application interface 1660. The floating window 1711 may include a video playback page 1712. The video playback page 1712 is a page displayed after a historical video option 1705 is triggered. The video playback page 1712 may include a video playback window, a video playback control, a video episode list, and the like. The video playback window may be used to display a video image (for example, a video of a fourth episode of "Girl"). The video playback control is configured to trigger the electronic device 100 to play/pause/fast forward/rewind a video. The video episode list may be used to display a video playback page corresponding to an episode.

In a possible implementation, the electronic device 100 may display the interface of the first application. The first page is displayed in the first display area on the electronic device 100, and the second page is displayed in the second display area on the electronic device 100. After the electronic device 100 locks both the first page and the second page, the electronic device 100 may receive an operation performed by the user on a new page open control in the second page, and in response to the operation, display a semi-fixed window in a display area of the second window, and display the third page in the semi-fixed window. The third page is a new page displayed by the electronic device 100 after the new page open control is triggered. A position of the semi-fixed window is fixed, and the electronic device 100 may change a size of the semi-fixed window in response to a user operation. In this way, the electronic device 100 not only can display the locked page, but also can display a newly opened page. In addition, because a position at which the operation is triggered is on the second page, the created semi-fixed window is also displayed on the second window.

Figure 13C:
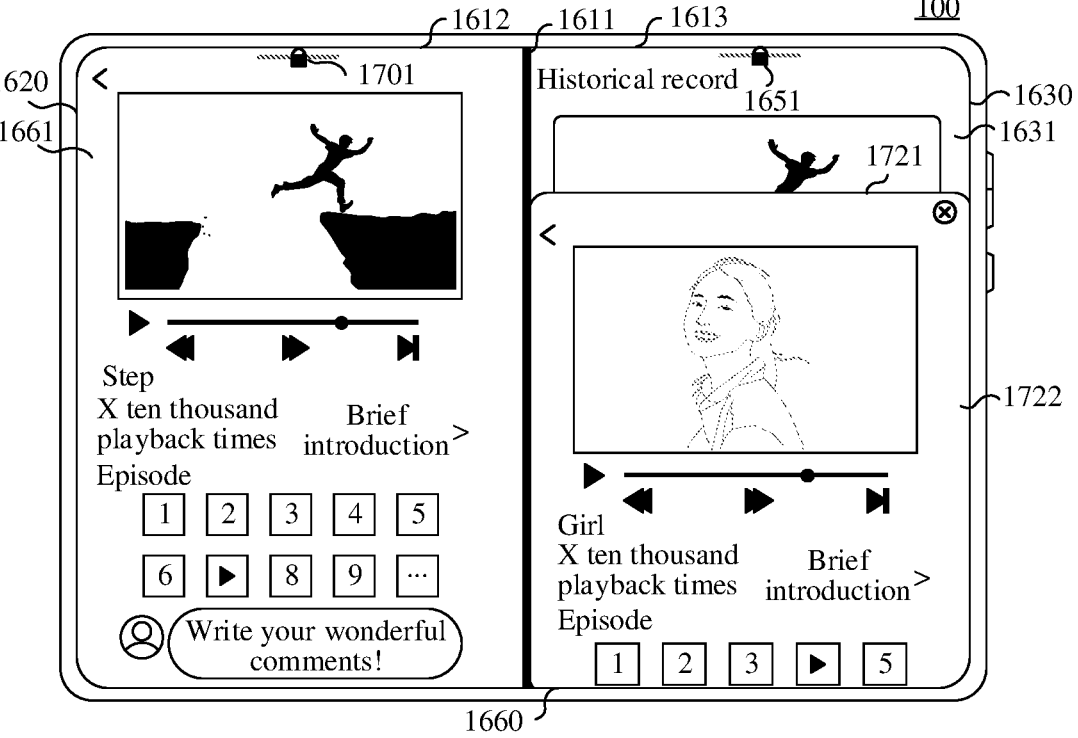

For example, the electronic device 100 may receive an operation (for example, tap) performed by the user on the historical video option 1705 shown in FIG. 13A. In response to the operation, the electronic device 100 may display a video application interface 1660 shown in FIG. 13C.

For a text description of the video application interface 1660, refer to the embodiment shown in FIG. 12D. Details are not described herein again. The electronic device 100 may display a semi-fixed window 1721 on a window 1630. The electronic device 100 may display a video playback page 1722 in the semi-fixed window 1721. The electronic device 100 may change a vertical length of the semi-fixed window in response to a dragging operation (for example, dragging upwards) performed by the user on an upper frame of the semi-fixed window. For a text description of the video playback page 1722, refer to the embodiment shown in FIG. 12B. Details are not described herein again.

Optionally, the semi-fixed window may be displayed in a display area of the first window. In this way, the electronic device 100 not only can display the locked page, but also can display a newly opened page. Because a position at which the operation is triggered is on the second page, and the second page is a page that the user may further need to view, the created semi-fixed window may be displayed on the first window, to ensure that the second page is not covered.

In a possible implementation, the electronic device 100 may display the interface of the first application. The first page of the first application is displayed in the first display area. The second page of the first application is displayed in the second display area. After the electronic device 100 locks both the first page and the second page, the electronic device 100 may receive an operation performed by the user on a new page open control. In response to the operation, the electronic device 100 may divide the first display area into a first display sub-area and a second display sub-area, display the first page in the first display sub-area, display the second page in the second display sub-area, and display the third page in the second display area. The third page is a new page displayed by the electronic device 100 after the new page open control is triggered. For example, the first display sub-area may be an upper half area of the first display area, and the second display sub-area may be a lower half area of the first display area. In this way, the electronic device 100 not only can display the locked page, to ensure that the locked page is not replaced, but also can display a newly opened page. Because the third page is the page last triggered by the user, a display area of the third page is the largest.

Optionally, after receiving an operation performed by the user on a new page open control, the electronic device 100 may divide the second display area into a third display sub-area and a fourth display sub-area, display the third page in the first display area, display the first page in the third display sub-area, and display the second page in the fourth display sub-area. For example, the third display sub-area may be an upper half area of the second display area, and the fourth display sub-area may be a lower half area of the second display area.

Figure 13D:
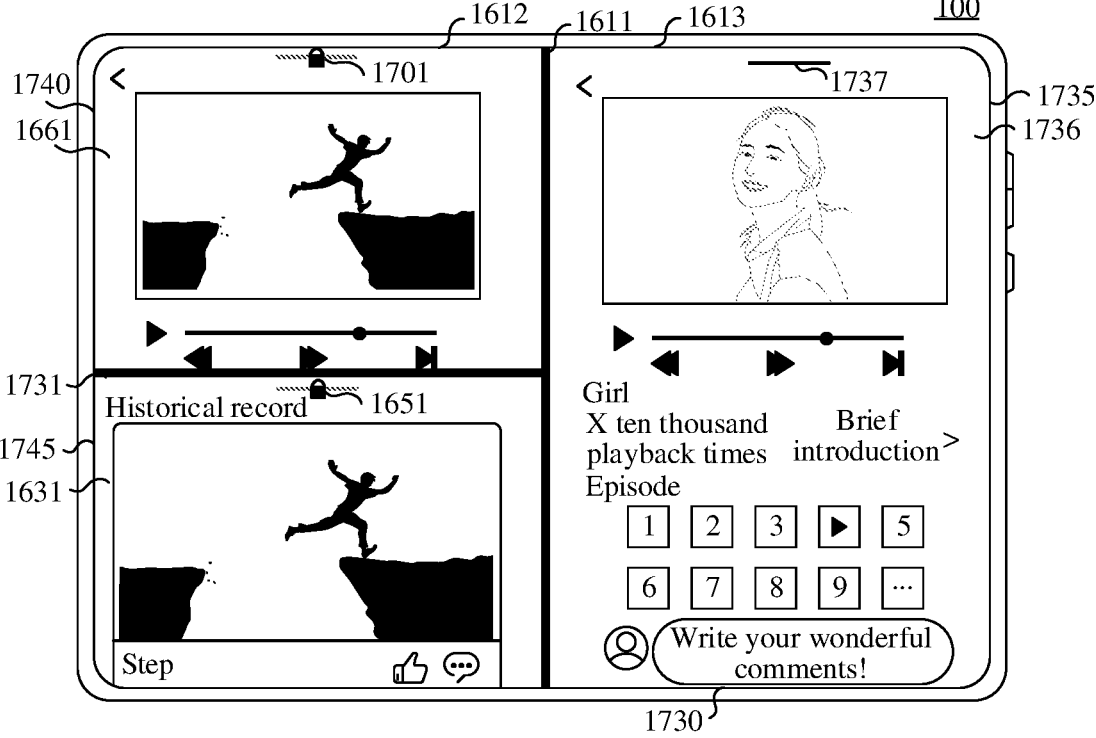

For example, the electronic device 100 may receive an operation (for example, tap) performed by the user on the historical video option 1705 shown in FIG. 13A. In response to the operation, the electronic device 100 may display a video application interface 1730 shown in FIG. 13D. The video application interface 1730 may include a window 1740, a window 1745, a window 1735, a division line 1611, and a division line 1731. The division line 1731 may be used to adjust longitudinal lengths of the window 1740 and the window 1745. The division line 1611 may be used to adjust horizontal lengths of the window 1740, the window 1745, and the window 1735.

The window 1740 and the window 1745 may be displayed in a display area 1612 on a display screen of the electronic device 100, and the window 1735 may be displayed in a display area 1613 on the display screen of the electronic device 100. For example, the display area 1612 may be a left half area of the display screen, and the display area 1613 may be a right half area of the display screen. A video playback page 1661 may be displayed in the window 1740, a historical record page 1631 may be displayed in the window 1745, and a video playback page 1736 may be displayed in the window 1735. For a text description of the video application interface 1730, refer to the embodiment shown in FIG. 13B. Details are not described herein again.

In a possible implementation, the electronic device 100 may display the interface of the first application. The first page of the first application is displayed in the first display area. The second page of the first application is displayed in the second display area. After the electronic device 100 locks both the first page and the second page, if the electronic device 100 receives an operation performed by the user on a new page open control in the first page, in response to the operation, the electronic device 100 may divide the first display area into a first display sub-area and a second display sub-area, display the first page in the first display sub-area, display the third page in the second display sub-area, and display the second page in the second display area. The third page is a new page displayed by the electronic device 100 after the new page open control is triggered.

If the electronic device 100 receives an operation performed by the user on a new page open control in the second page, in response to the operation, the electronic device 100 may divide the second display area into a third display sub-area and a fourth display sub-area, display the second page in the third display sub-area, display the third page in the fourth display sub-area, and display the third page in the first display area. The third page is a new page displayed by the electronic device 100 after the new page open control is triggered. In this way, the electronic device 100 not only can display the locked page, but also can display a newly opened page, and can further ensure that a page on which a user operation is not received is not covered.

Figure 13E:
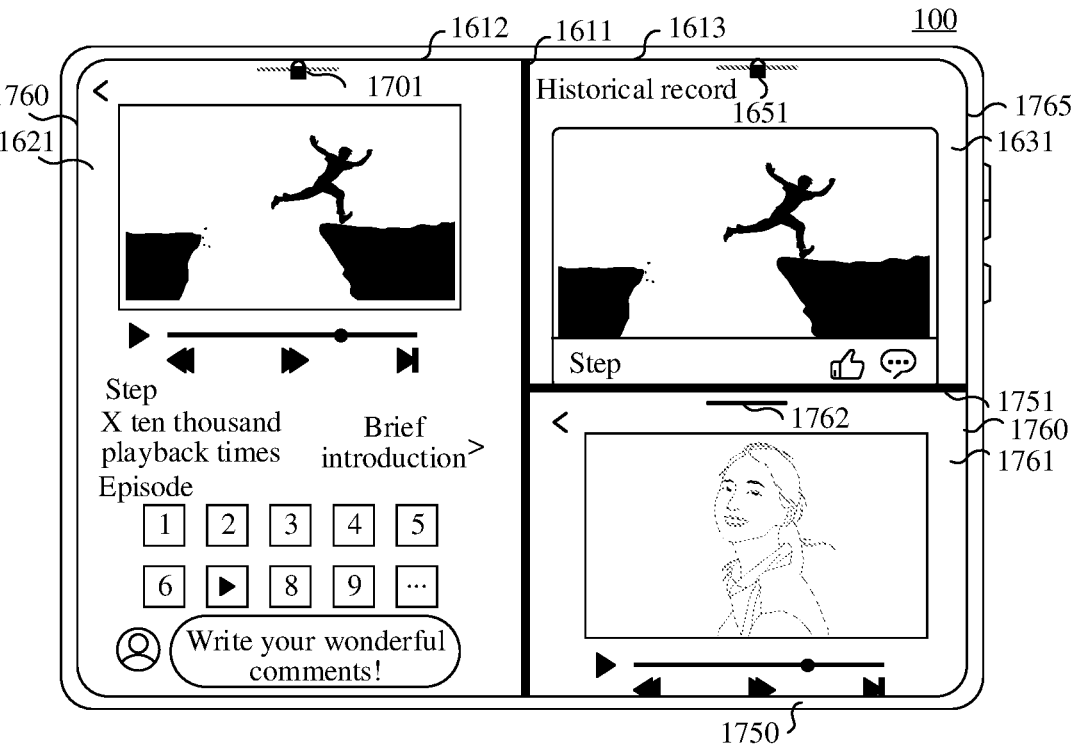

For example, the electronic device 100 may receive an operation (for example, tap) performed by the user on the historical video option 1705 shown in FIG. 13A. In response to the operation, the electronic device 100 may display a video application interface 1750 shown in FIG. 13E. The video application interface 1520 may include a window 1760, a window 1765, a window 1760, a division line 1611, and a division line 1751. The division line 1751 may be used to adjust longitudinal lengths of the window 1765 and the window 1760. The division line 1611 may be used to adjust horizontal lengths of the window 1765, the window 1760, and the window 1760.

The window 1760 may be displayed in a display area 1612 on a display screen of the electronic device 100, and the window 1760 and the window 1765 may be displayed in a display area 1613 on the display screen of the electronic device 100. For example, the display area 1612 may be a left half area of the display screen, and the display area 1613 may be a right half area of the display screen. A video playback page 1661 may be displayed in the window 1760, a historical record page 1631 may be displayed in window 1765, and a video playback page 1761 may be displayed in the window 1760. For a text description of the video application interface 1750, refer to the embodiment shown in FIG. 13B. Details are not described herein again.

Optionally, if the electronic device 100 receives an operation performed by the user on a new page open control in the second page, in response to the operation, the electronic device 100 may divide the first display area into a first display sub-area and a second display sub-area, display the first page in the first display sub-area, display the third page in the second display sub-area, and display the second page in the second display area. If the electronic device 100 receives an operation performed by the user on a new page open control in the first page, in response to the operation, the electronic device 100 may divide the second display area into a third display sub-area and a fourth display sub-area, display the second page in the third display sub-area, display the third page in the fourth display sub-area, and display the first page in the first display area. The third page is a new page displayed by the electronic device 100 after the new page open control is triggered. In this way, the electronic device 100 not only can display the locked page, to ensure that the locked page is not replaced, but also can display a newly opened page. Because a page on which the user operation is received is a page that the user may further need to view, it can be ensured that the page is not covered.

In a possible application scenario, two pages of a specified application displayed by the electronic device 100 are locked. The electronic device 100 receives an application close operation of the user, and the electronic device 100 may display prompt information in response to the application close operation. The prompt information may be used to prompt the user that the page of the specified application is locked, and prompt the user that if the electronic device 100 receives the application close operation again, the electronic device 100 may close the specified page. For example, the prompt information may display "the current page is locked, please close it again".

In some application scenarios, the electronic device 100 may display a floating window on the display screen, where a page including a specified application (for example, a files application) is displayed in the floating window. When the page is not locked, the electronic device 100 may display a page to switch to in the floating window after receiving a page switching operation performed by the user in the floating window. When the page is locked, after receiving a page switching operation performed by the user in the floating window, the electronic device 100 may display a created floating window, and display a page to switch to in the created floating window. In this way, the electronic device 100 can concurrently display the locked page and the page to switch to.

For example, the electronic device 100 may receive an operation (for example, tap) performed by the user on the video application floating control 1113 shown in FIG. 8B. In response to the operation, the electronic device 100 may display an interface 1800 shown in FIG. 14A. For a text description of the interface 1800, refer to the embodiment shown in FIG. 3A. Details are not described herein again. The electronic device 100 may display a floating window 1801 on the interface 1800. The floating window 1801 may include a video recommendation page 1803. The video recommendation page 1803 may further include a horizontal bar 1802. The horizontal bar 1802 may be used to lock the video recommendation page 1803. For a text description of the video recommendation page 1803, refer to the embodiment shown in FIG. 12A. Details are not described herein again.

The electronic device 100 may receive an operation (for example, tap) performed by the user on a video option 1804. In response to the operation, the electronic device 100 may display an interface 1800 shown in FIG. 14B.

Figure 14A:
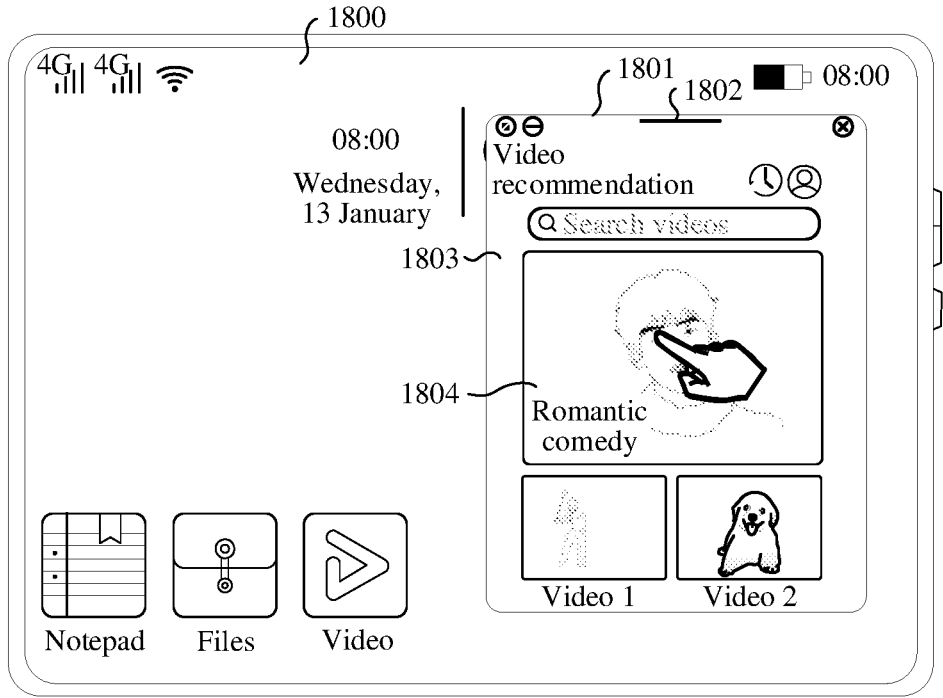
FIG. 14A to FIG. 14D are schematic diagrams of another group of interfaces according to embodiments of this application.
Figure 14B:
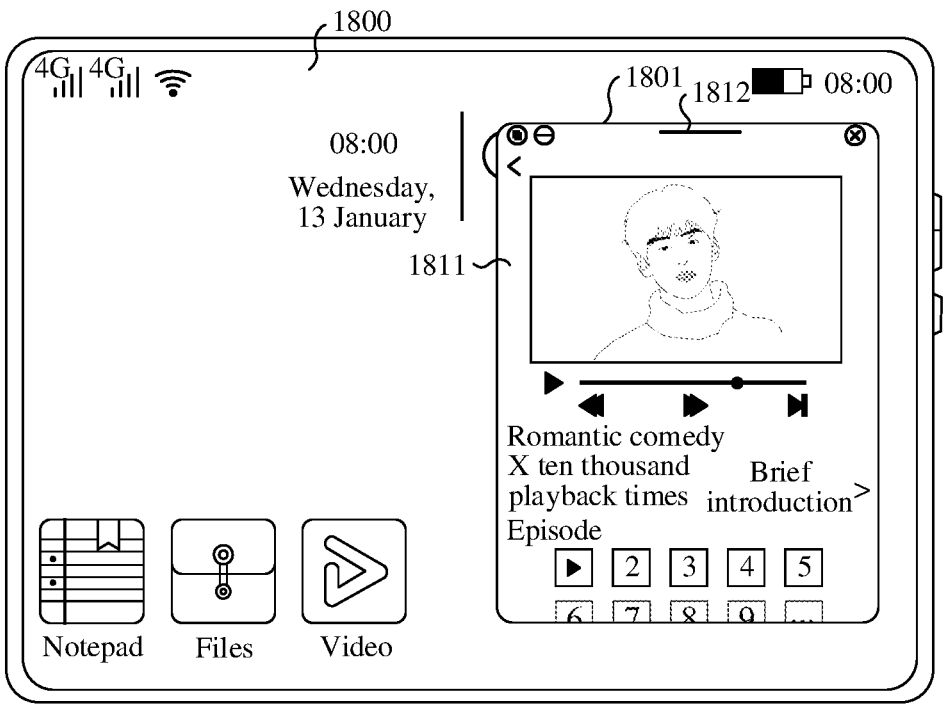

As shown in FIG. 14B, for a text description of the interface 1800, refer to the embodiment shown in FIG. 3A. Details are not described herein again. The electronic device 100 may display a floating window 1801 on the interface 1800. The floating window 1801 may include a video playback page 1811. A horizontal bar 1812 may be displayed on the video playback page 1811. The horizontal bar 1812 may be used to lock the video playback page 1811. A video playback window, a video playback control, a video episode list, and the like may be further displayed on the video playback page 1811. For a part that is of the video playback page 1811 and that is not described in detail, refer to the embodiment shown in FIG. 12B. Details are not described herein again.

The electronic device 100 may receive an operation (for example, tap) performed by the user on the horizontal bar 1802 shown in FIG. 14A. In response to the operation, the electronic device 100 may display an interface 1800 shown in FIG. 14C.

Figure 14C:
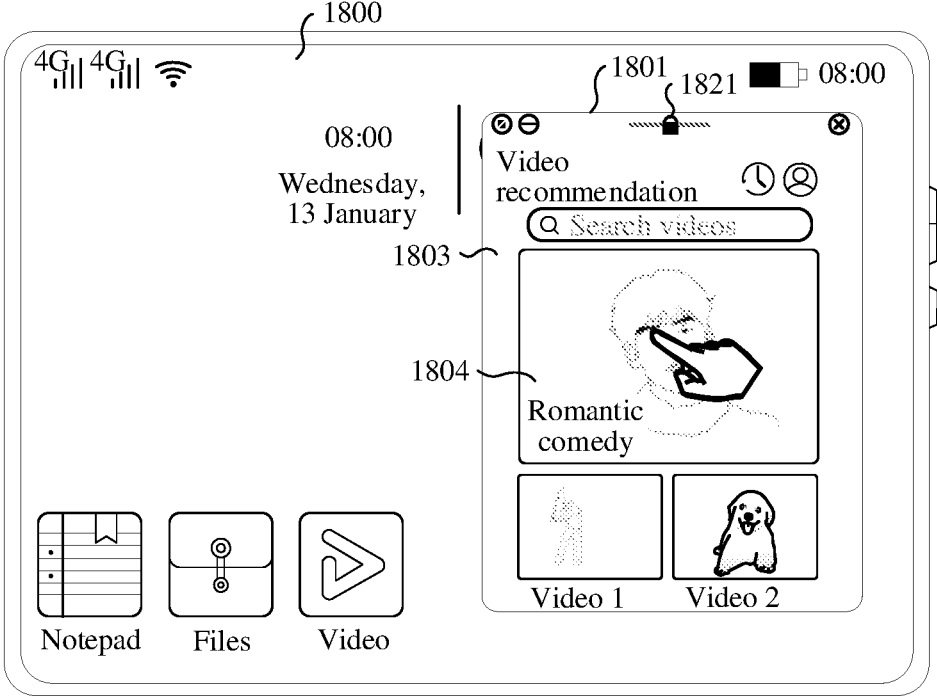

As shown in FIG. 14C, for a text description of the interface 1800, refer to the embodiment shown in FIG. 3A. Details are not described herein again. The electronic device 100 may display a floating window 1801 on the interface 1800. The floating window 1801 may include a video recommendation page 1803. A lock icon 1821 and a video option 1804 may be displayed on the video recommendation page 1803. The lock icon 1821 may indicate that the video recommendation page 1803 is locked. For a part that is of the video recommendation page 1803 and that is not described in detail, refer to the embodiment shown in FIG. 12A. Details are not described herein again.

The electronic device 100 may receive an operation (for example, tap) performed by the user on the video option 1804. In response to the operation, the electronic device 100 may display an interface 1800 shown in FIG. 14D.

Figure 14D:
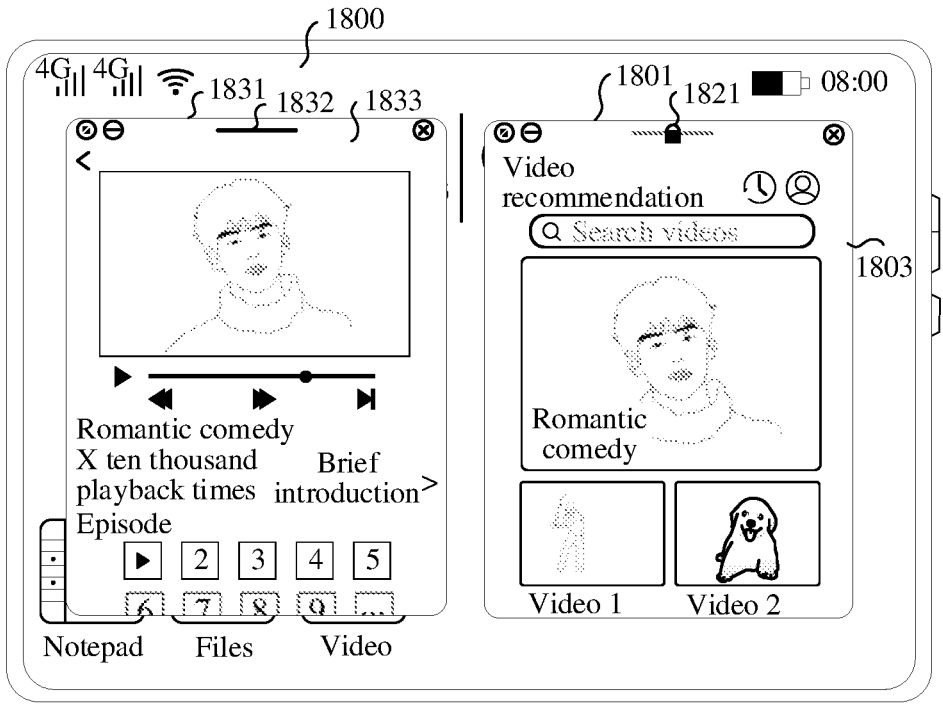

As shown in FIG. 14D, for a text description of the interface 1800, refer to the embodiment shown in FIG. 3A. Details are not described herein again. The electronic device 100 may display a floating window 1801 and a floating window 1831 on the interface 1820. The floating window 1801 may include a video recommendation page 1803. A lock icon 1821 may be displayed on the video recommendation page 1803. A video playback page 1833 may be displayed in the floating window 1831. For parts that are of the floating window 1801 and the floating window 1831 and that are not described in detail, refer to embodiments shown in FIG. 14A and FIG. 14B. Details are not described herein again.

In this way, the electronic device 100 not only can display the locked page, to ensure that the locked page is not replaced, but also can display a created page.

In some possible application scenarios, the interface displayed by the electronic device 100 includes a card of a specified application (for example, a notepad application), and the card of the specified application displays specified function information of the specified application. When the specified function information is not locked, the electronic device 100 may receive an operation (for example, tap) performed by the user on the card. The electronic device 100 may display a specified page of the specified application in full screen in response to the operation. When the specified function information is locked, the electronic device 100 may receive an operation (for example, tap) performed by the user on the card, and in response to the operation, display a created card near a locked card, and display a page to switch to on the created card. Content of the page to switch to is the same as content of a specified page of the specified application. In this way, the electronic device 100 not only can display the locked page, but also can display the page to switch to without covering an original page element.

Optionally, if there are page elements (for example, an application icon and a card) in all areas near the locked card, the electronic device 100 may move positions of the page elements until a blank area in which the created card can be placed appears.

Figure 15A:
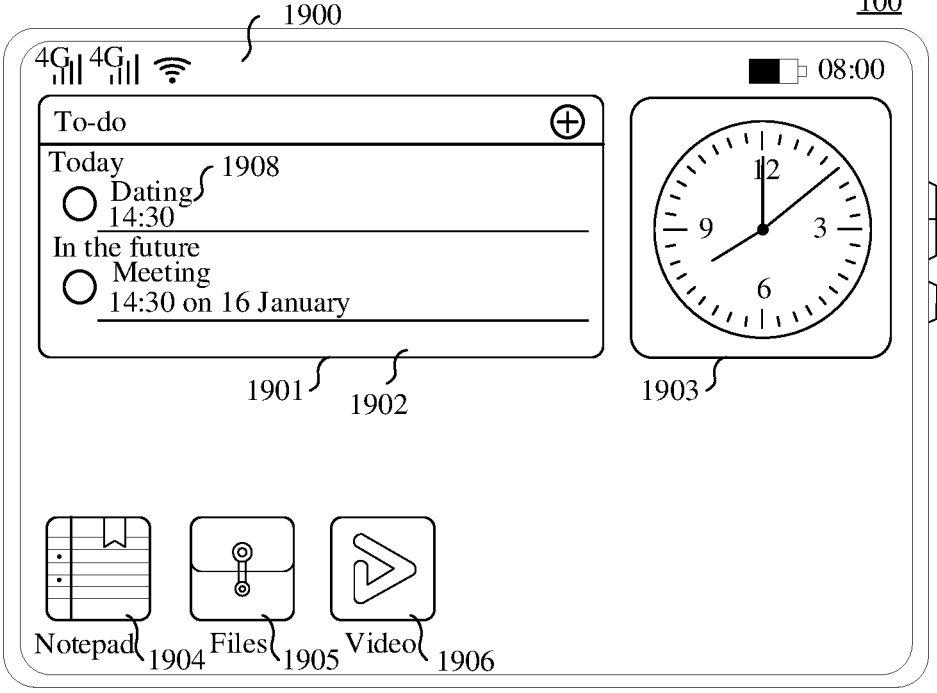
FIG. 15A to FIG. 15E are schematic diagrams of another group of interfaces according to embodiments of this application.

For example, as shown in FIG. 15A, the electronic device 100 may display a desktop 1900, where the desktop 1900 may include a plurality of application icons (for example, a notepad application icon 1904, a files application icon 1905, and a video application icon 1906). A page may further include a card (for example, a to-do card 1901 or a clock card 1903). Optionally, a status bar including an icon like a power identifying icon may be further displayed at the top of a page on which the application icon is placed. In some embodiments, the to-do card 1901 may be obtained by using the notepad application icon 1904. For example, the electronic device 100 may display the to-do card 1901 on the desktop 1900 in response to an operation (for example, touching and holding or swiping up) on the notepad application icon 1904. The clock card 1903 may display time in a form of a clock dial.

The to-do card 1901 displays to-do function information 1902. The to-do function information 1902 may include a create icon, a to-do event display area, and the like. The to-do event display area may include a to-do event (for example, a to-do event 1908) added by the user. For a part that is of the desktop 1900 and that is not described in detail, refer to the embodiment shown in FIG. 11A. Details are not described herein again.

The electronic device 100 may receive an operation (for example, tap) performed by the user on the to-do event 1908. In response to the operation, the electronic device 100 may display the notepad application interface 1410 shown in FIG. 11B. Because the to-do function information 1902 is not locked, the electronic device 100 displays a page to switch to in full screen.

Figure 15B:
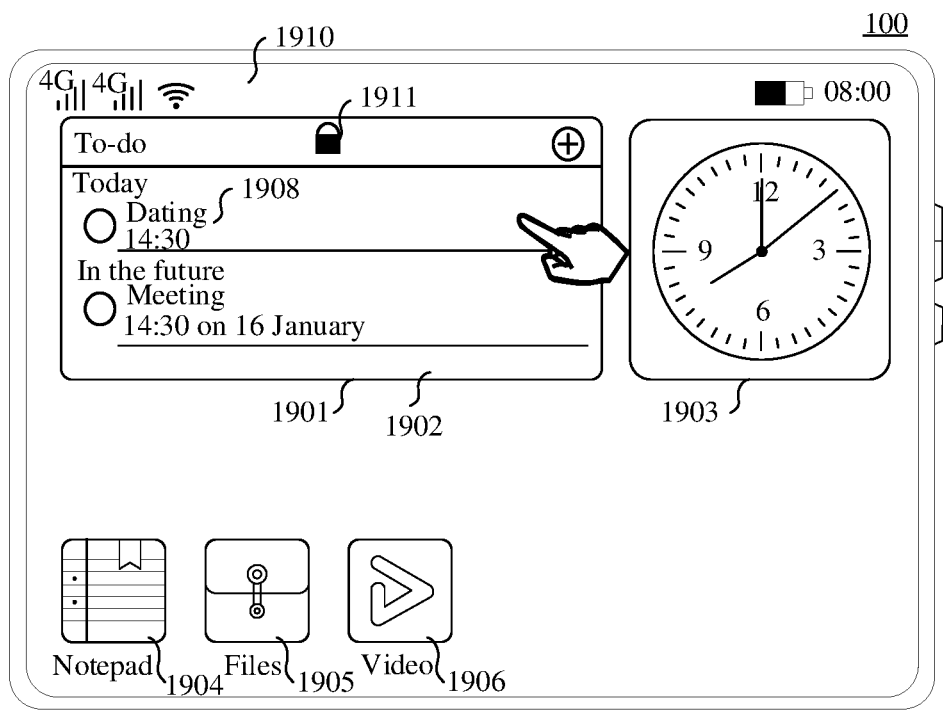

As shown in FIG. 15B, the electronic device 100 may receive an operation (for example, double tap) performed by the user on the to-do card 1901 shown in FIG. 15A. In response to the operation, the electronic device 100 may display an interface 1910 shown in FIG. 15B. For a text description of the interface 1910, refer to the embodiment shown in FIG. 15A. Details are not described herein again. A lock icon 1911 is displayed in to-do function information 1902 of the to-do card 1901. The lock icon 1911 may indicate that the to-do function information 1902 is locked.

The electronic device 100 may receive an operation (for example, tap) performed by the user on a to-do event 1908 shown in FIG. 15B. In response to the operation, the electronic device 100 may display an interface 1920 shown in FIG. 15C.

Figure 15C:
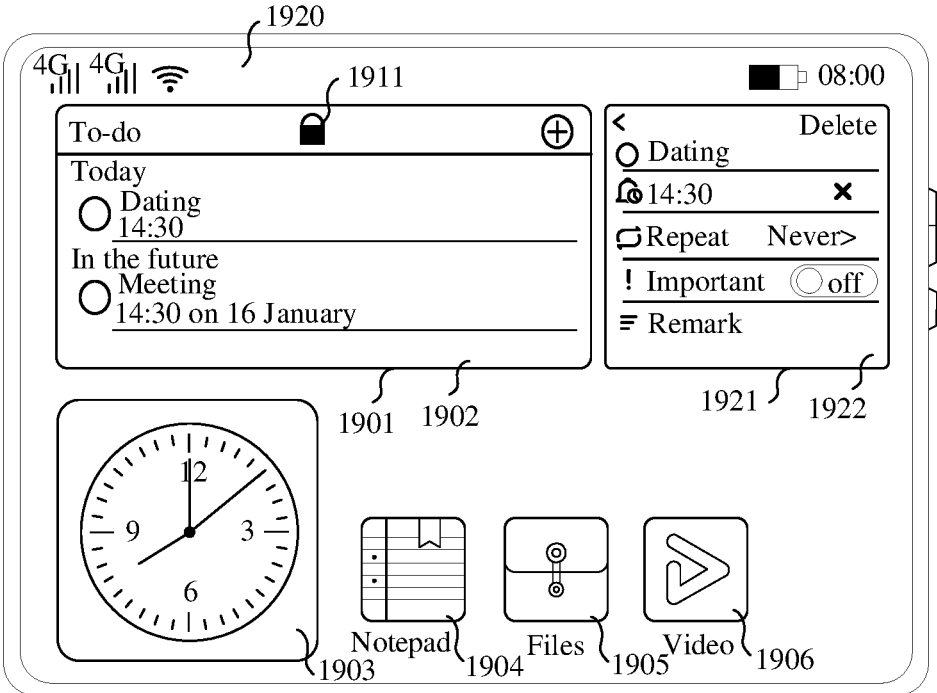

As shown in FIG. 15C, the interface 1920 includes a page on which an application icon is placed. The page may include a to-do card 1901, a clock card 1903, a notepad application icon 1504, a files application icon 1905, a video application icon 1906, a temporary card 1921, and the like. The temporary card 1921 may display a card editing page 1922. Because to-do function information 1902 is locked, in response to an operation performed by the user on the to-do event 1908 shown in FIG. 15B, the electronic device 100 may create the temporary card 1921 to display the switched-to card editing page 1922. Because the clock card 1903 already exists beside the to-do card 1901, the electronic device 100 may move the clock card 1903 and place the temporary card 1921 in an original position of the clock card 1903. Because the electronic device 100 moves the clock card 1903, the electronic device 100 may simultaneously move the notepad application icon 1504, the files application icon 1905, and the video application icon 1906. In this way, the electronic device 100 can concurrently display the card editing page 1922 and the to-do function information 1902. For a part that is of the interface 1920 and that is not described in detail, refer to the embodiment shown in FIG. 15A. Details are not described herein again.

Optionally, a size of the created card may be set to a preset size. The preset size may be the same as a size of an original card. Alternatively, the preset size may be the same as a size of an adjacent card of the card whose position is moved.

In a possible implementation, the interface displayed by the electronic device 100 includes a card of a specified application, and the card of the specified application displays a specified page. When the specified page is locked, the electronic device 100 may receive a page switching operation (for example, tap) performed by the user on the card, and in response to the operation, display a page to switch to in full screen, and display, on the page to switch to, a card including the locked specified page. In this way, the electronic device 100 not only can display the locked page, but also can display the page to switch to.

Figure 15D:
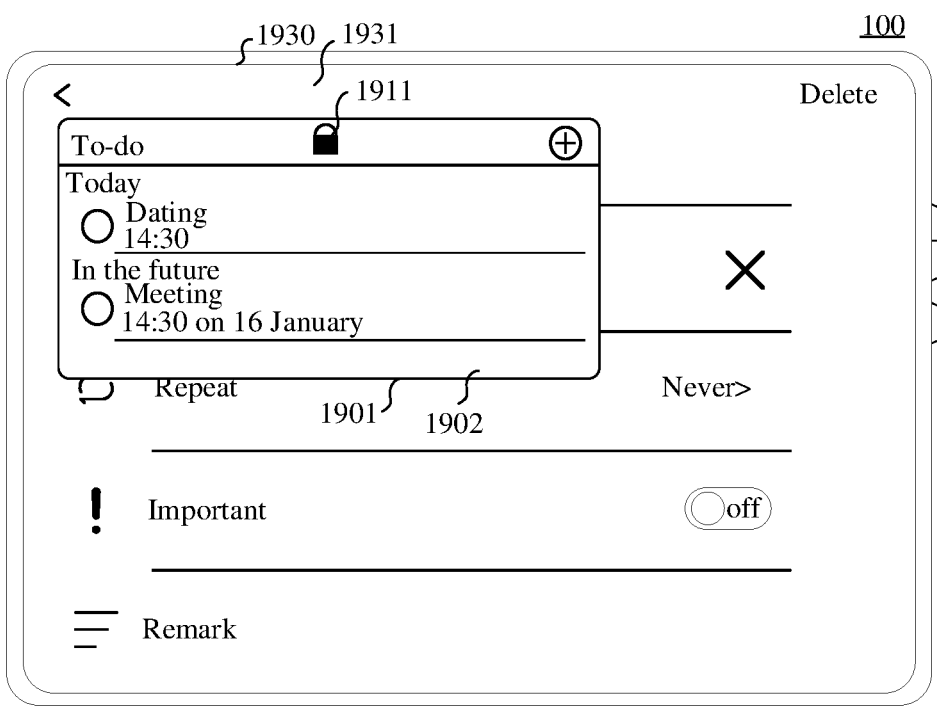

For example, the electronic device 100 may receive an operation (for example, tap) performed by the user on the to-do event 1908 shown in FIG. 15B. In response to the operation, the electronic device 100 may display a notepad application interface 1930 shown in FIG. 15D. For a text description of the notepad application interface 1930, refer to the embodiment shown in FIG. 11B. Details are not described herein again. A to-do card 1901 may be further displayed on the notepad application interface 1930. The to-do card 1901 displays locked to-do function information 1902. A lock icon 1911 is displayed in the to-do function information 1902.

In a possible implementation, the interface displayed by the electronic device 100 includes a card of a specified application, and the card of the specified application displays a specified page. When the specified page is locked, the electronic device 100 may receive a page switching operation (for example, tap) performed by the user on the card, and in response to the operation, display a pop-up window near the card, and display a page to switch to in the pop-up window. In this way, the electronic device 100 not only can display the locked page, but also can display the page to switch to without changing a page layout.

Figure 15E:
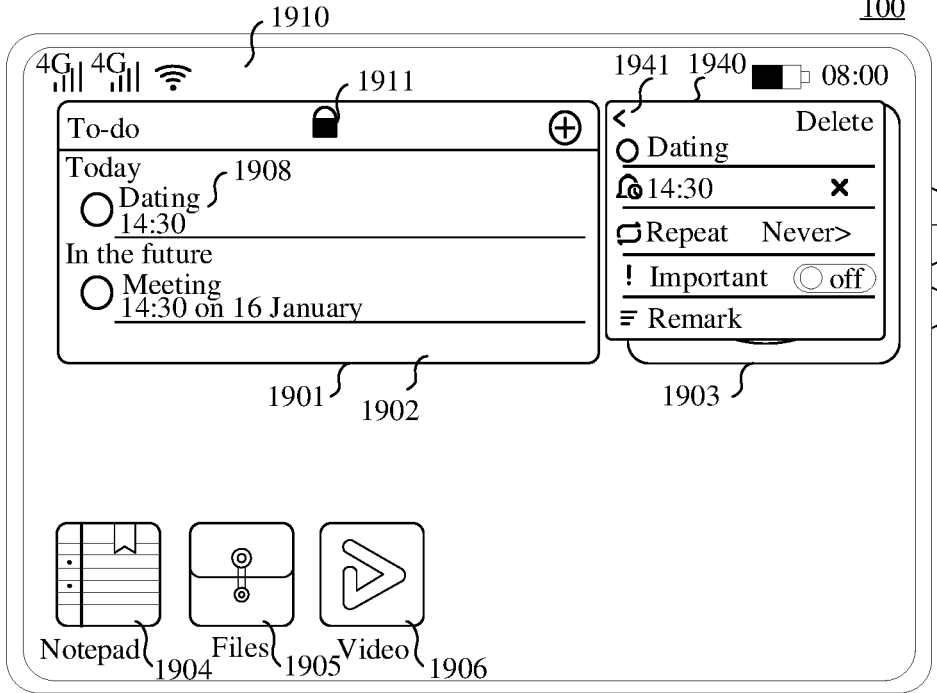

For example, the electronic device 100 may receive an operation (for example, tap) performed by the user on the to-do event 1908 shown in FIG. 15B. In response to the operation, the electronic device 100 may display a notepad application interface 1910 shown in FIG. 15E. For a text description of the notepad application interface 1910, refer to the embodiment shown in FIG. 11B. Details are not described herein again. A pop-up window 1940 may be further displayed on the notepad application interface 1910. A card editing page 1941 is displayed in the pop-up window 1940.

In some application scenarios, the electronic device 100 may display a specified page in full screen. If the specified page is not locked, the electronic device 100 may receive a page switching operation of the user, and display a page to switch to in full screen in response to the operation. If the specified page is locked, the electronic device 100 may receive a page switching operation of the user, and in response to the operation, display a created floating window, and display a page to switch to in the created floating window. In this way, the electronic device 100 can concurrently display the locked page and the page to switch to.

For example, the electronic device 100 may receive an operation (for example, tap) performed by the user on the files application icon 302 shown in FIG. 3A. In response to the operation, the electronic device 100 may display a files application interface 2000 shown in FIG. 16A. The files application interface 2000 may include a files control, a my control, and a file display area. The files control may be configured to trigger the electronic device 100 to display the file display area. The file display area may include a create control 2002, a file title, a file search bar, file events (for example, a "file 3" event 2003, a "file 2" event, and a "file 1" event) that have been added by the user, and the like. The create control 2002 may be configured to trigger the electronic device 100 to receive and respond to a user input for adding a file event. The create control 2002 may be further configured to trigger the electronic device 100 to display a document editing page. For a part that is of the page 2001 and that is not described in detail, refer to the embodiment shown in FIG. 8C. Details are not described herein again.

Figure 16A:
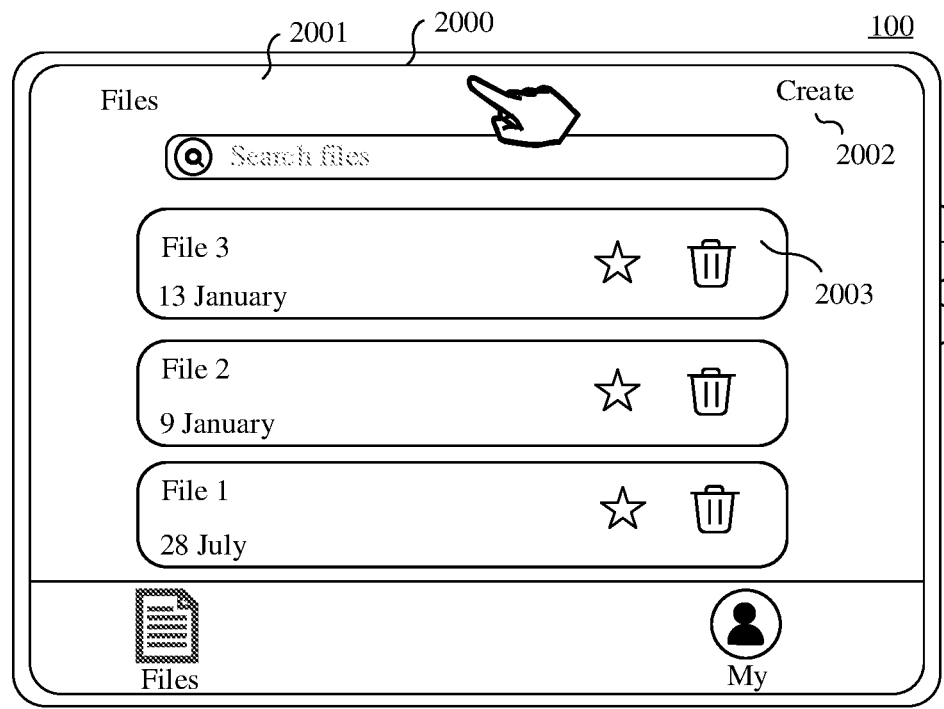
FIG. 16A to FIG. 16E are schematic diagrams of another group of interfaces according to embodiments of this application.

The electronic device 100 may receive an operation (for example, tap) performed by the user on the create control 2002 shown in FIG. 16A. In response to the operation, the electronic device 100 may display, in full screen, the document editing page 1137 shown in FIG. 8D. Because the page 2001 is not locked, the electronic device 100 may receive a page switching operation of the user, and the electronic device 100 may display a page to switch to (the document editing page 1137) in full screen in response to the operation.

The electronic device 100 may receive an operation (for example, tap) performed by the user on the page 2001 shown in FIG. 16A. In response to the operation, the electronic device 100 may display a files application interface 2010 shown in FIG. 16B.

For a text description of the files application interface 2010, refer to the embodiment shown in FIG. 16A. Details are not described herein again. The files application interface 2010 may include a page 2001. The page 2001 may include a lock icon 2011, a create control 2002, and the like. The lock icon 2011 may indicate that the page 2001 is in a locked state. In response to a page switching operation of the user, the electronic device 100 may display a created floating window, and display a page to switch to in the created floating window.

Figure 16B:
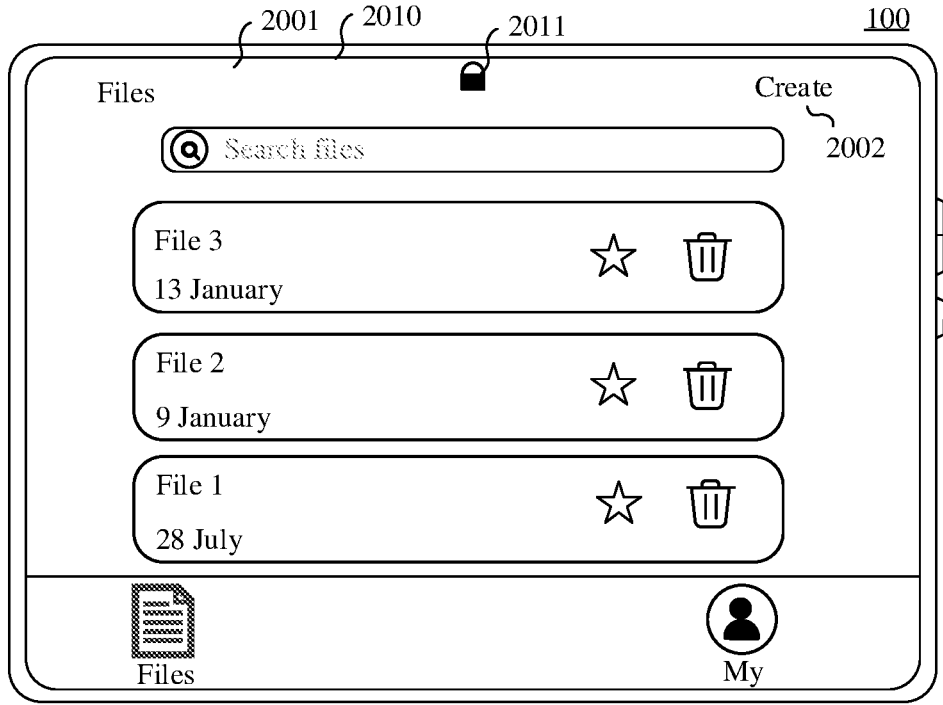
Figure 16C:
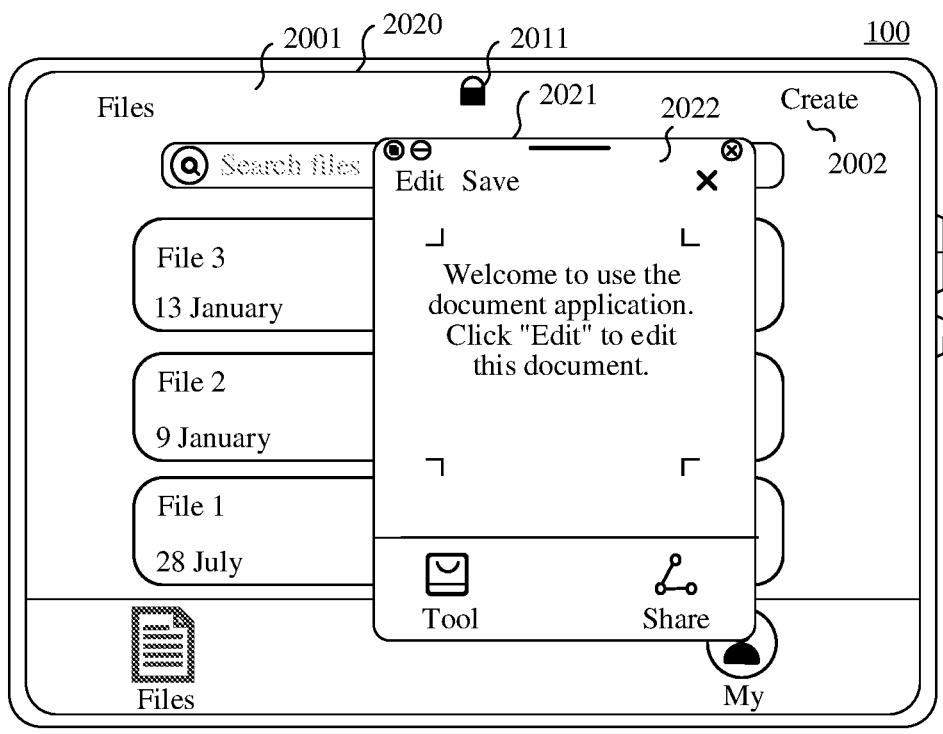

The electronic device 100 may receive an operation (for example, tap) performed by the user on the create control 2002 shown in FIG. 16B. In response to the operation, the electronic device 100 may display a files application interface 2020 shown in FIG. 16C.

For a text description of the files application interface 2020, refer to the embodiment shown in FIG. 16A. Details are not described herein again. The electronic device 100 may display a floating window 2021 on the files application interface 2020. A document editing page 2022 and the like may be displayed in the floating window 2021. The document editing page 2022 may include an edit control, a save control, a text enter area, a tool control, a share control, and the like. For a part that is of the document editing page 2022 and that is not described in detail, refer to the embodiment shown in FIG. 8D. Details are not described herein again.

In a possible implementation, the electronic device 100 may display a specified page in full screen. If the specified page is not locked, the electronic device 100 may receive a page switching operation of the user, and display a page to switch to in full screen in response to the operation. If the specified page is locked, the electronic device 100 may receive a page switching operation of the user, and in response to the operation, display a created semi-fixed window, and display a page to switch to in the created semi-fixed window. A position of the created semi-fixed window is fixed, and a vertical length is variable. In this way, the electronic device 100 can display the page to switch to when displaying the locked page.

Figure 16D:
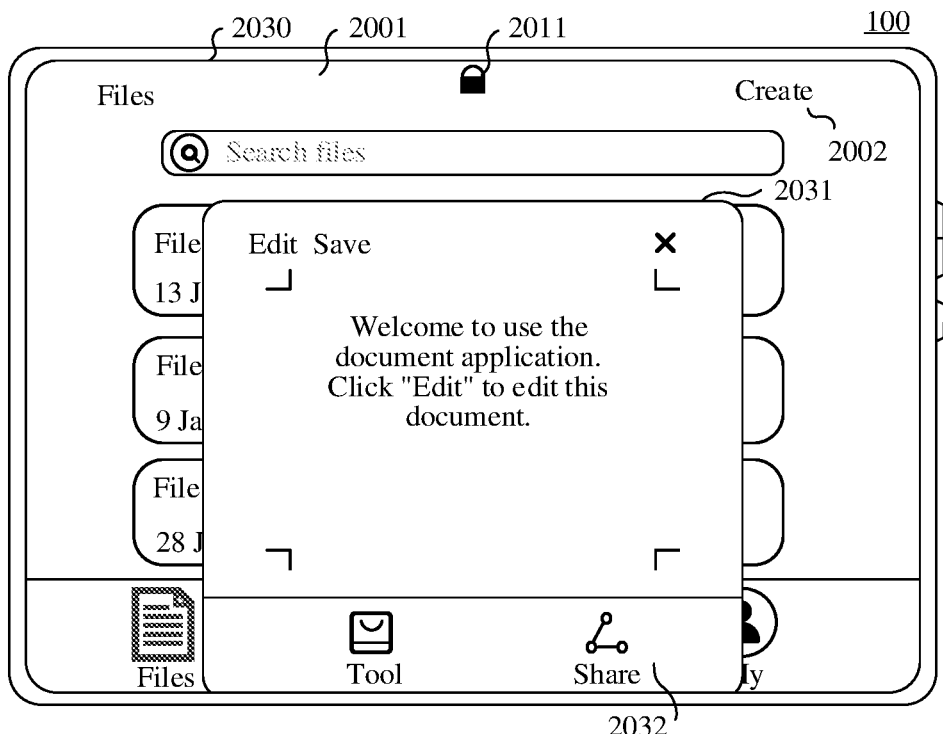

For example, the electronic device 100 may receive an operation (for example, tap) performed by the user on the create control 2002 shown in FIG. 16B. In response to the operation, the electronic device 100 may display a files application interface 2030 shown in FIG. 16D. For a text description of the files application interface 2030, refer to the embodiment shown in FIG. 16A. Details are not described herein again. The electronic device 100 may display a semi-fixed window 2031 on the files application interface 2030. A document editing page 2032 and the like may be displayed in the semi-fixed window 2031. For a part that is of the document editing page 2032 and that is not described in detail, refer to the embodiment shown in FIG. 8D. Details are not described herein again. The electronic device 100 may receive a dragging operation (for example, dragging upwards) performed by the user on an upper frame of the semi-fixed window 2031. The electronic device 100 may change a vertical length of the semi-fixed window 2031 in response to the operation.

In a possible implementation, the electronic device 100 may display a specified page in full screen. If the specified page is not locked, the electronic device 100 may receive a page switching operation of the user, and display a page to switch to in full screen in response to the operation. If the specified page is locked, the electronic device 100 may receive a page switching operation of the user, and display the locked page and a page to switch to in split screen in response to the operation. In this way, the electronic device 100 can display the page to switch to when displaying the locked page.

Figure 16E:
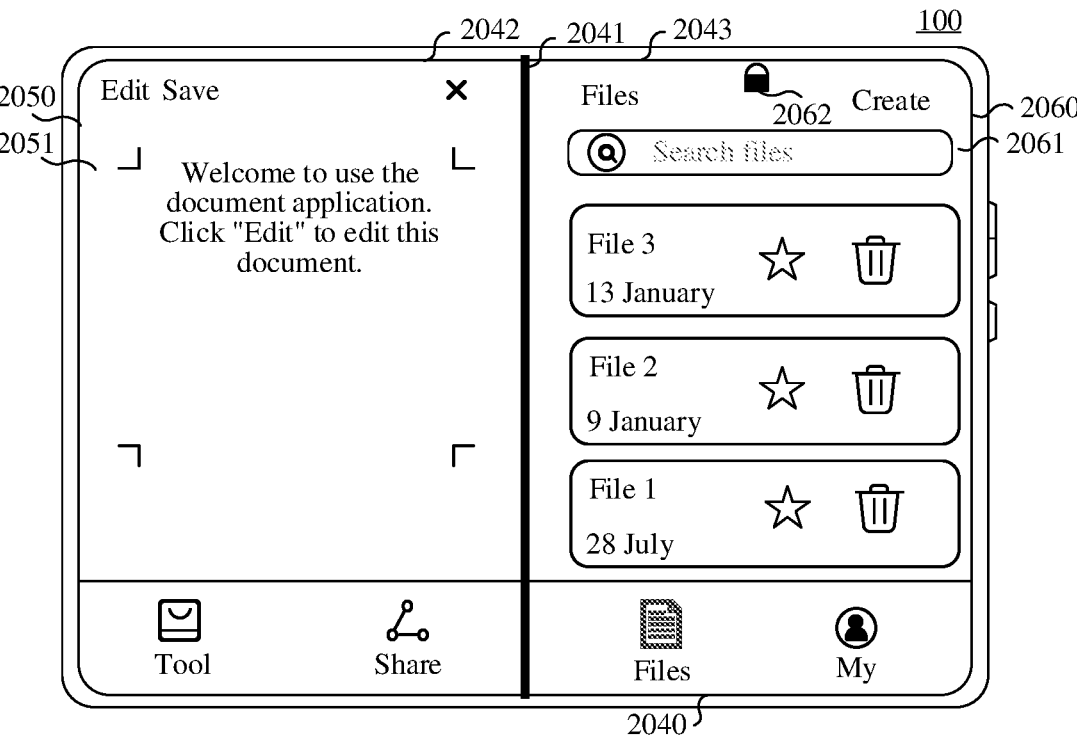

For example, the electronic device 100 may receive an operation (for example, tap) performed by the user on the create control 2002. In response to the operation, the electronic device 100 may display a notepad application interface 2040 shown in FIG. 16E. The notepad application interface 2040 may include a window 2050, a window 2060, and a division line 2041. The window 2050 may be displayed in a display area 2042, and the window 2060 may be displayed in a display area 2043. For example, the display area 2042 may be a left half area of a display screen of the electronic device 100, and the display area 2043 may be a right half area of the display screen of the electronic device 100. A document editing page 2051 may be displayed in the window 2050, and a file management page may be displayed in the window 2060. A lock icon 2062 is displayed on the file management page 2061. Because the file management page 2061 is locked, the electronic device 100 displays the locked file management page 2061 and the switched-to document editing page 2051 in split screen. For a part that is of the file management page 2061 and that is not described in detail, refer to the embodiment shown in FIG. 16A. Details are not described herein again. For a part that is of the document editing page 2051 and that is not described in detail, refer to the embodiment shown in FIG. 8D. Details are not described herein again.

In some application scenarios, the electronic device 100 may display a specified interface. The specified interface includes a specified interface element. The electronic device 100 may lock the specified interface element in response to a user operation (for example, touching and holding). If the specified interface element is not locked, the electronic device 100 may receive an interface switching operation performed by the user on the specified interface, and display a switched-to interface in response to the interface switching operation. If the specified interface element is locked, the electronic device 100 may receive an interface switching operation performed by the user on the specified interface. In response to the interface switching operation, the electronic device 100 may display a switched-to interface, and the electronic device 100 may display the locked specified interface element on the switched-to interface. The specified interface element may be used to trigger the electronic device 100 to display an interface corresponding to the specified interface element. In this way, the electronic device 100 can concurrently display the locked interface element and the switched-to interface. After the user locks an interface element, the user may switch an interface to process a related transaction on the switched-to interface, and may trigger, by using the locked interface element, the electronic device 100 to display an interface corresponding to the interface element, to reduce an operation performed by the user to return to the interface of the interface element.

For example, the electronic device 100 may receive an operation (for example, double tap) performed by the user on the "file 3" event 2002 shown in FIG. 16A. In response to the operation, the electronic device 100 may display a files application interface 2100 shown in FIG. 17A. For a text description of the files application interface 2100, refer to the embodiment shown in FIG. 16A. Details are not described herein again. A create control 2102, a "file 3" event 2105, and the like may be displayed on the files application interface 2100. A lock icon 2106 may be displayed in the "file 3" event 2105. The lock icon 2106 may indicate that the "file 3" event 2105 is locked.

Figure 17A:
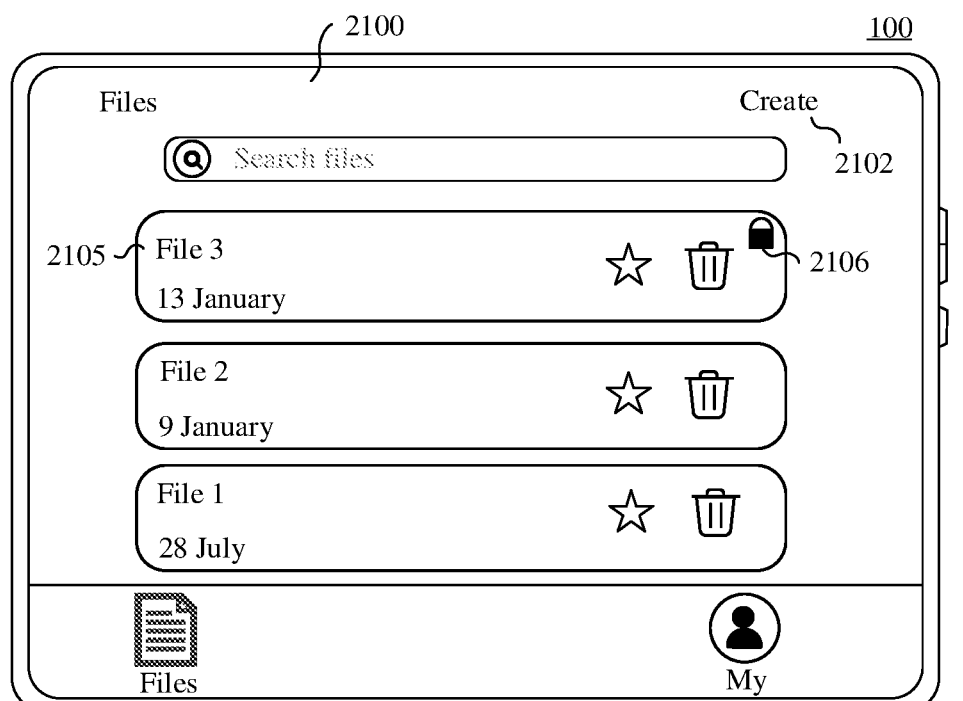
FIG. 17A to FIG. 17E are schematic diagrams of another group of interfaces according to embodiments of this application.

The electronic device 100 may receive an operation (for example, tap) performed by the user on the create control 2102 shown in FIG. 17A. In response to the operation, the electronic device 100 may display a files application interface 2110 shown in FIG. 17B.

Figure 17B:
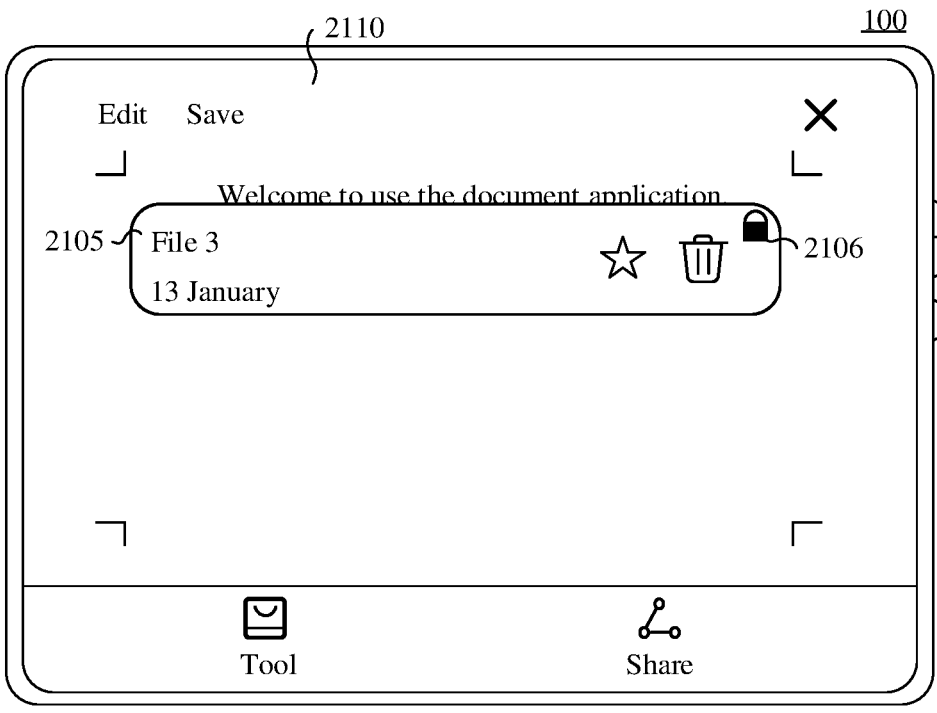

For example, as shown in FIG. 17B, for a text description of the files application interface 2110, refer to the embodiment shown in FIG. 8D. Details are not described herein again. The electronic device 100 may display a locked "file 3" event 2105 on the files application interface 2110. A position of the "file 3" event 2105 on the files application interface 2110 is the same as a position of the "file 3" event 2105 on the files application interface 2100.

The electronic device 100 may receive an operation (for example, tap) performed by the user on the "file 3" event 2105 shown in FIG. 17B. In response to the operation, the electronic device 100 may display a files application interface 2120 shown in FIG. 17C.

Figure 17C:
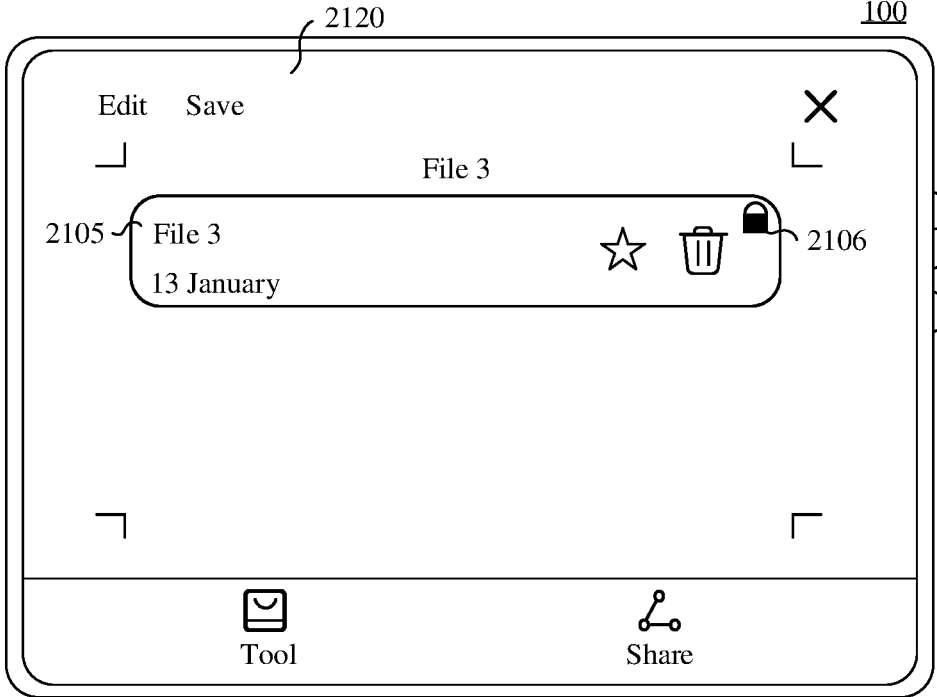

As shown in FIG. 17C, the electronic device 100 displays the files application interface 2120. The files application interface 2120 may be used to edit detailed content of a "file 3". The files application interface 2120 includes an edit control, a save control, a tool control, and the like. The electronic device 100 may further display a locked "file 3" event 2105 on the files application interface 2120 in a floating manner.

Optionally, the electronic device 100 may receive a dragging operation performed by the user on a locked interface element. In response to the dragging operation, the electronic device 100 may change a position of the locked interface element on a display screen.

Optionally, the electronic device 100 may not display the locked interface element after displaying an interface corresponding to the locked interface element.

In a possible implementation, the electronic device 100 may display a specified interface. The specified interface includes a specified interface element. The electronic device 100 may lock the specified interface element in response to a user operation (for example, touching and holding). If the specified interface element is not locked, the electronic device 100 may receive an interface switching operation performed by the user on the specified interface, and display a switched-to interface in full screen in response to the interface switching operation. If the specified interface element is locked, the electronic device 100 may receive an interface switching operation performed by the user on the specified interface. In response to the interface switching operation, the electronic device 100 may display, in split screen, a switched-to interface and an interface including the locked interface element. In this way, the electronic device 100 can concurrently display the locked interface element and the switched-to interface. The interface including the locked interface element may include at least one locked interface element.

Figure 17D:
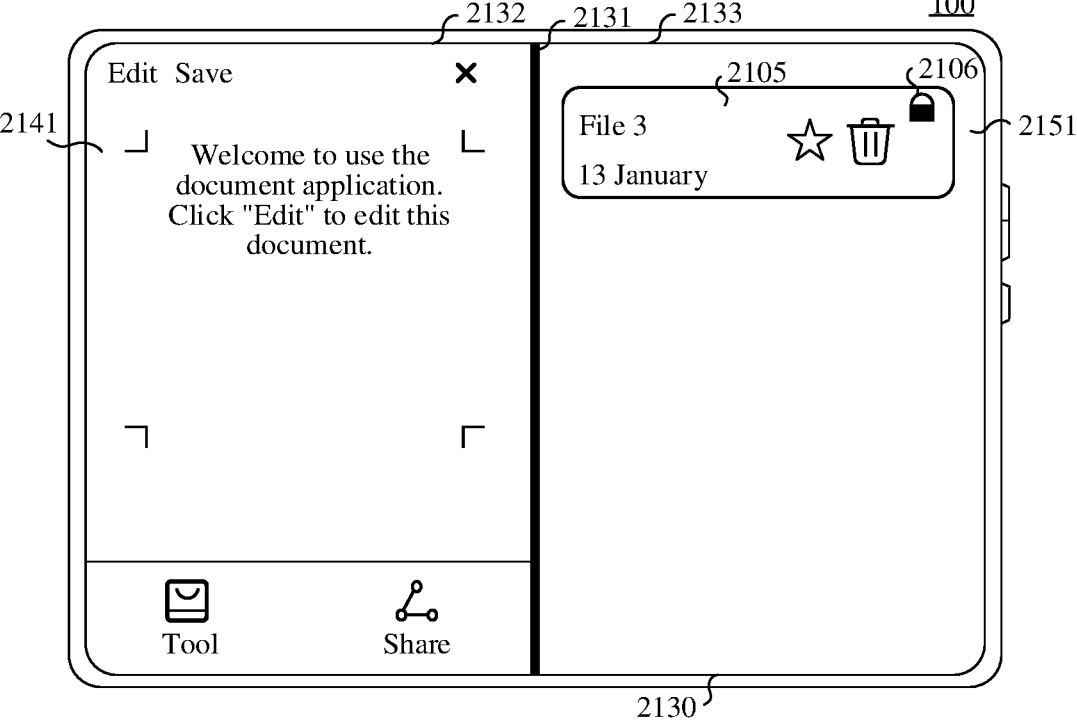

For example, the electronic device 100 may receive an operation (for example, tap) performed by the user on the create control 2102 shown in FIG. 17A. In response to the operation, the electronic device 100 may display a files application interface 2130 shown in FIG. 17D.

A document editing page 2141 of the files application interface 2130 is displayed in a display area 2132, and a locked element page 2151 of the files application interface 2130 is displayed in a display area 2133. The locked element page 2151 includes a "file 3" event 2105, the "file 3" event 2105 includes a lock icon 2106, and the lock icon 2106 may indicate that the "file 3" event 2105 is locked. The locked element page 2151 may be used to display one or more locked interface elements. The one or more locked interface elements may be used to trigger to display a page corresponding to the interface element. For a part that is of the files application interface 2120 and that is not described in detail, refer to the embodiment shown in FIG. 16E. Details are not described herein again.

The electronic device 100 may receive an operation (for example, tap) performed by the user on the "file 3" event 2105 shown in FIG. 17B. In response to the operation, the electronic device 100 may display a files application interface 2140 shown in FIG. 17E.

Figure 17E:
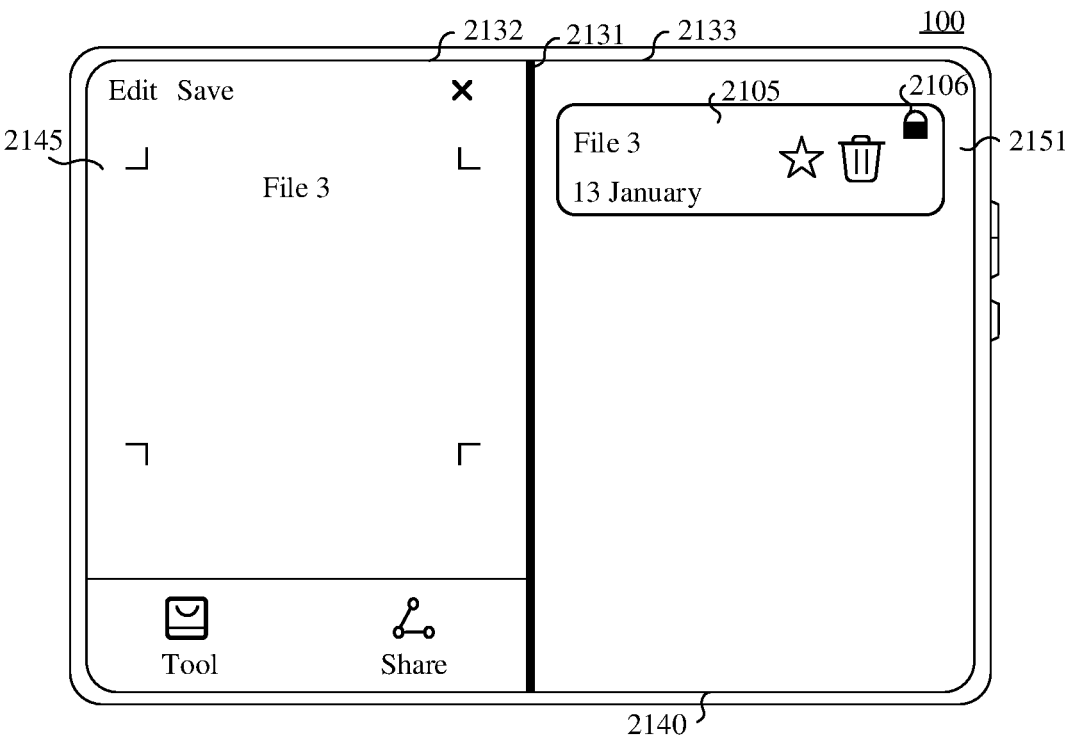

As shown in FIG. 17E, the electronic device 100 displays the files application interface 2140. A document editing page 2145 of the files application interface 2140 is displayed in a display area 2132, and a locked element page 2151 of the files application interface 2130 is displayed in a display area 2133. The document editing page 2141 may be used to edit detailed content of a "file 3". The locked element page 2151 may be used to display a locked interface element.

In this way, the electronic device 100 not only can display an interface including the locked interface element, but also can display a switched-to interface.

In a possible implementation, the electronic device 100 may display a specified interface. The electronic device 100 may obtain a user-defined area selected by the user on the specified interface. The electronic device 100 may lock the user-defined interface based on a user input. If the user-defined area is locked, the electronic device 100 may receive a page switching operation performed by the user on the specified interface. In response to the page switching operation, the electronic device 100 may display a switched-to interface in full screen, and display an interface element of the locked user-defined area on the switched-to interface. If the user-defined area is not locked, the electronic device 100 may receive an interface switching operation performed by the user on the specified interface, and display a switched-to interface in full screen in response to the interface switching operation. An interface element in the user-defined area may be used to trigger the electronic device 100 to display an interface corresponding to the interface element. In this way, the electronic device 100 can concurrently display the interface element of the locked user-defined area and the switched-to interface. The user may trigger, by using the interface element of the locked user-defined area, the electronic device 100 to display the interface corresponding to the interface element.

Figure 18A:
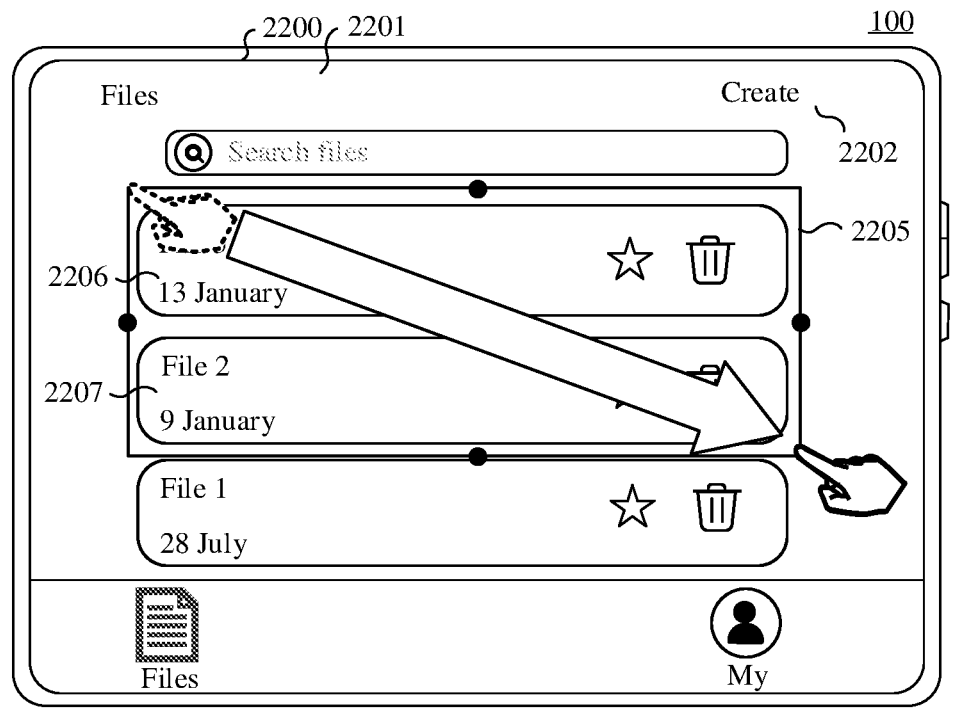
FIG. 18A to FIG. 18D are schematic diagrams of another group of interfaces according to embodiments of this application.
Figure 18B:
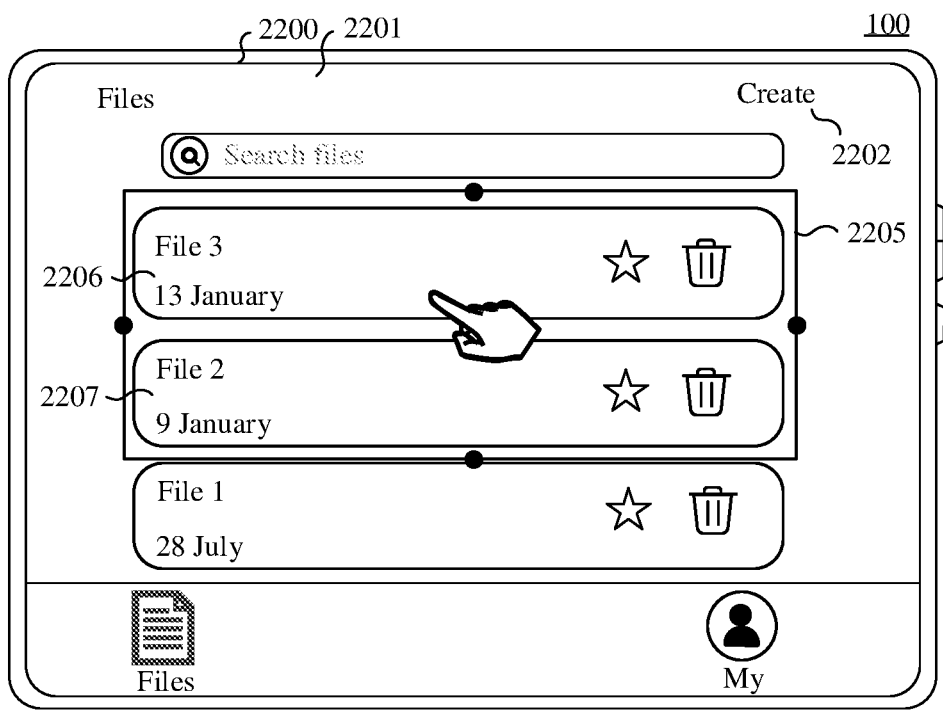

For example, as shown in FIG. 18A and FIG. 18B, the electronic device 100 may display a files application interface 2200, where a create control 2202 may be displayed on the files application interface 2200. For a text description of the files application interface 2200, refer to the embodiment shown in FIG. 16A. Details are not described herein again. In a process in which the user drags a user-defined area 2205, the electronic device 100 may display, on the files application interface 2200, the user-defined area 2205 that changes in real time. Finally, a range of the user-defined area 2205 includes a "file 3" event 2206 and a "file 2" event 2207. Four dots may be displayed on four frames of the user-defined area 2205. The four dots may be used to receive a user input to trigger the electronic device 100 to change positions of the frames on which the dots are located. The four frames of the user-defined area 2205 may be used to receive a user input to trigger the electronic device 100 to change a position of the user-defined area.

The electronic device 100 may receive an operation (for example, double tap) performed by the user on the user-defined area 2205 shown in FIG. 18B. In response to the operation, the electronic device 100 may display a files application interface 2210 shown in FIG. 18C.

Figure 18C:
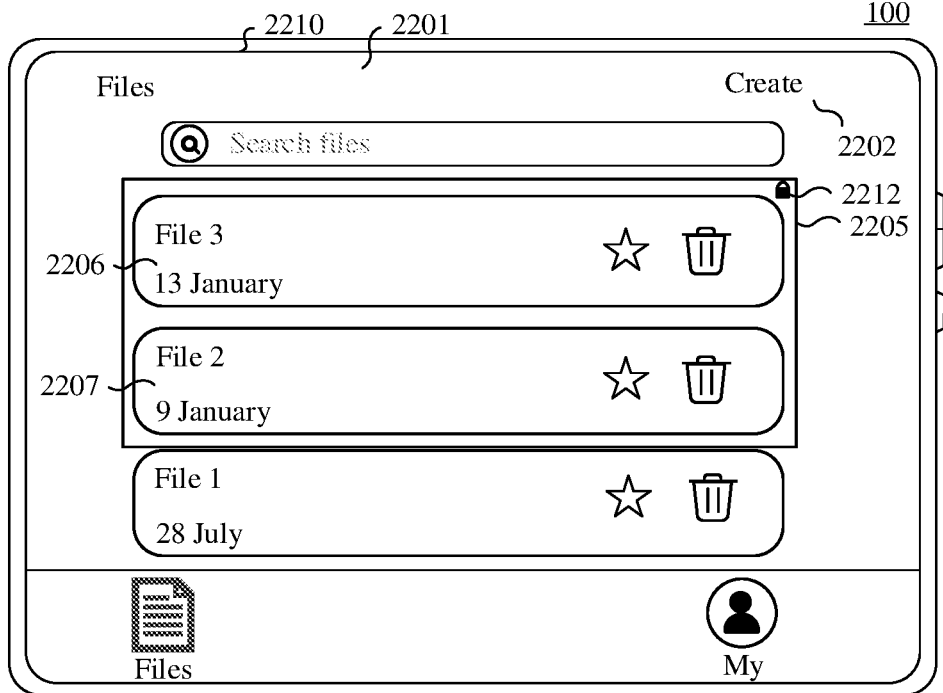

As shown in FIG. 18C, for a text description of the files application interface 2210, refer to the embodiment shown in FIG. 16A. Details are not described herein again. A file management page 2201 is displayed on the files application interface 2210, and a create control 2202 and a user-defined area 2205 are displayed on the file management page 2201. A "file 3" event 2206, a "file 2" event 2207, and a lock icon 2212 are displayed in the user-defined area 2205. The lock icon 2212 may indicate that the user-defined area 2205 is locked.

The electronic device 100 may receive an operation (for example, tap) performed by the user on the create control 2202 shown in FIG. 18C. In response to the operation, the electronic device 100 may display a files application interface 2220 shown in FIG. 18D.

Figure 18D:
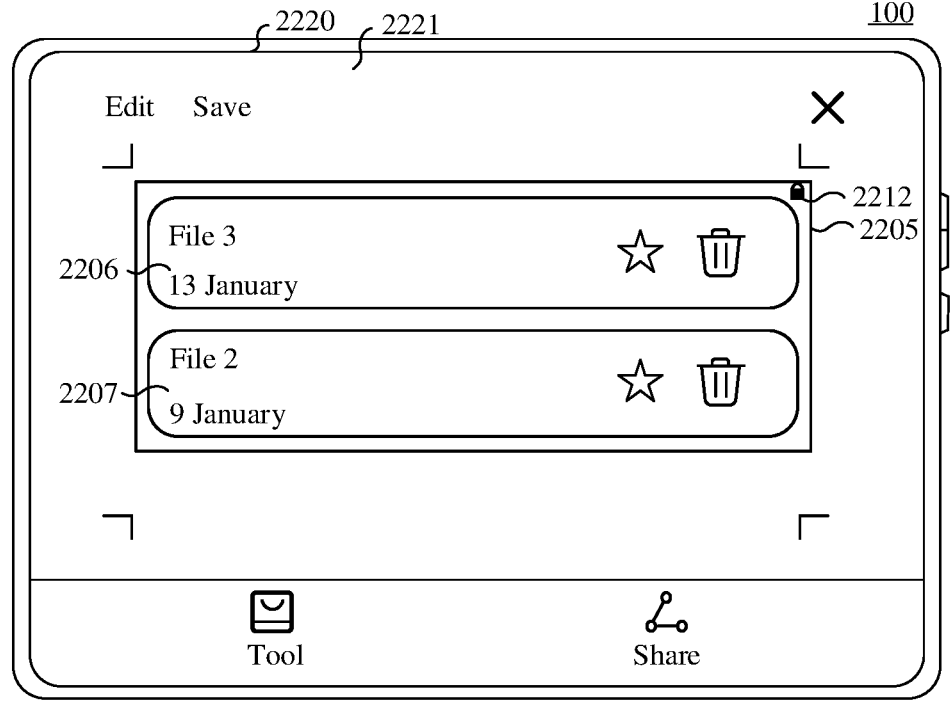

As shown in FIG. 18D, for a text description of the files application interface 2220, refer to the embodiment shown in FIG. 8D. Details are not described herein again. A user-defined area 2205 is displayed on the files application interface 2220. A "file 3" event 2206, a "file 2" event 2207, and a lock icon 2212 are displayed in the user-defined area 2205. The "file 3" event 2206 may be used to trigger the electronic device 100 to display an editing page of a "file 3", and the "file 2" event 2207 may be used to trigger the electronic device 100 to display an editing page of a "file 2". When receiving an operation (for example, tap) performed by the user on the "file 3" event 2206, the electronic device 100 may display the editing page of the "file 3". Optionally, when displaying the editing page of the "file 3", the electronic device 100 may display all interface elements in the user-defined area 2205 on the editing page in a floating manner.

Further, the electronic device 100 may receive an operation (for example, tap) performed by the user on an interface element in a locked user-defined area, and display, in response to the operation, an interface corresponding to the interface element. Optionally, when displaying the interface corresponding to the interface element, the electronic device 100 may display the interface element in the locked user-defined area on the interface in a floating manner.

Optionally, the electronic device 100 may receive an operation (for example, dragging) performed by the user on a specified page. In response to the operation, the electronic device 100 may obtain a user-defined area, and the electronic device 100 may lock the user-defined area.

Optionally, the user-defined area may be obtained by the user by performing a swiping operation on the display screen. In this way, the obtained user-defined area may be a regular planar graph, or may be an irregular planar graph.

Optionally, after the electronic device 100 receives an operation performed by the user to lock the user-defined area, the electronic device 100 may display, in split screen in response to a page switching operation, a page to switch to and a page including the locked user-defined area. The page including the locked user-defined area may be used to display all interface elements of the locked user-defined area.

The following describes a procedure of a display method provided in embodiments of this application.

Figure 19:
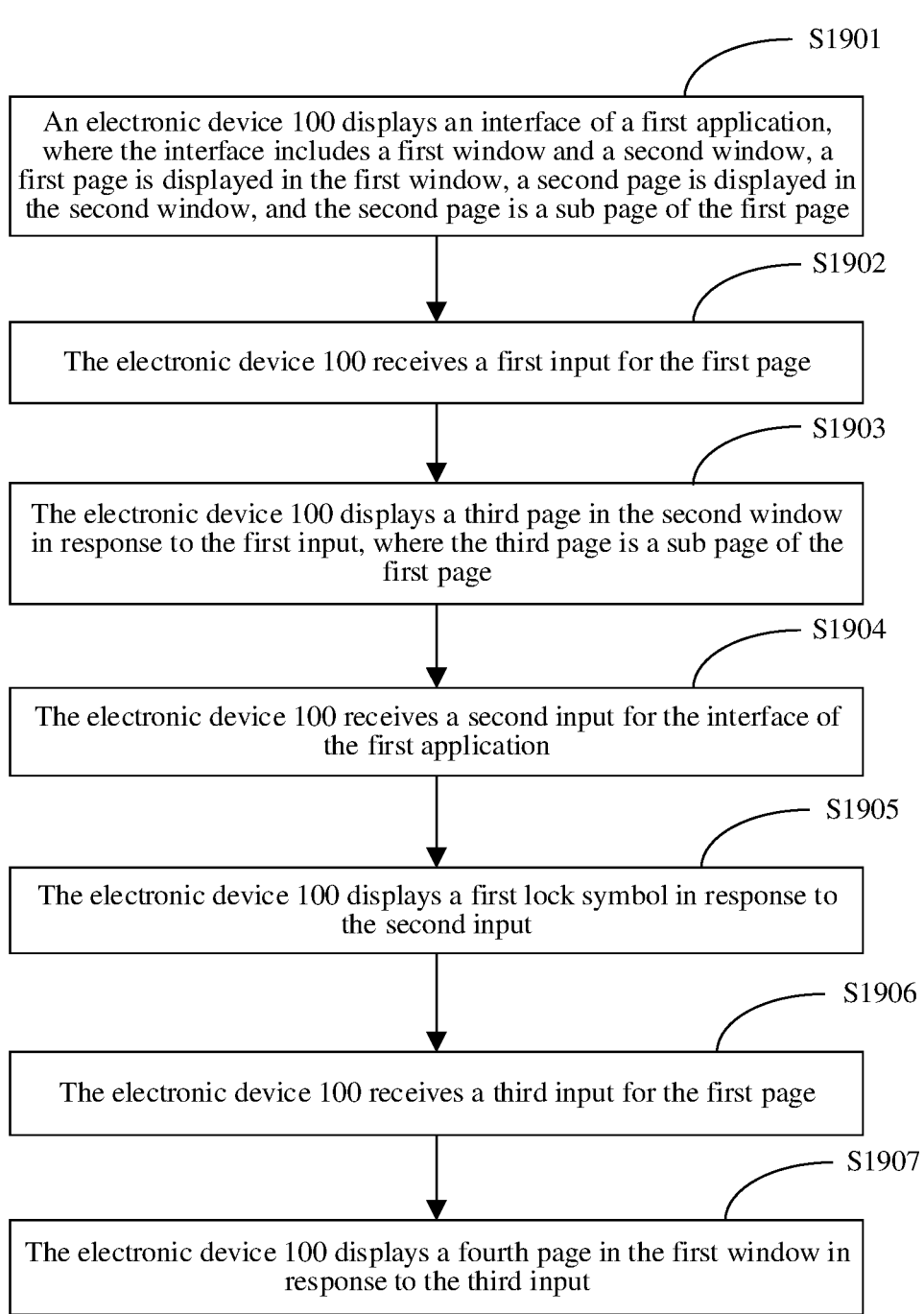
FIG. 19 is a schematic flowchart of a display method according to an embodiment of this application.

FIG. 19 is a schematic flowchart of a display method according to an embodiment of this application.

S1901: An electronic device 100 displays an interface of a first application, where the interface includes a first window and a second window, a first page is displayed in the first window, a second page is displayed in the second window, and the second page is a sub page of the first page.

The first window is displayed in a first display area on a display screen of the electronic device 100, and the second window is displayed in a second display area on the display screen of the electronic device 100. For example, the first display area may be a left half area of the display screen or an upper half area of the display screen of the electronic device 100. The second display area may be a right half area of the display screen or a lower half area of the display screen of the electronic device 100.

Specifically, the first application may be an application whose two or more pages can be concurrently displayed on the display screen, for example, a notepad application, a messages application, a shopping application, or a video application.

For example, the interface of the first application may be the communication application interface 100 shown in FIG. 1B. The first page is a note event page 321, and the second page is a note editing page 331. The interface of the first application may alternatively be the notepad application interface 310 shown in FIG. 3B, the shopping application interface 420 shown in FIG. 4E, the video application interface 1610 shown in FIG. 12A, or the like. S1902: The electronic device 100 receives a first input for the first page.

S1903: The electronic device 100 displays a third page in the second window in response to the first input, where the third page is a sub page of the first page.

The first input is not limited to tap, a voice instruction input, or the like. For example, the first input may be an operation performed on the contact icon 103 shown in FIG. 1B. For another example, the first input may be an operation performed on the "note 4" event 324 shown in FIG. 3B.

The third page is a sub page of the first page. For example, the third page may be the note editing page 335 shown in FIG. 3C.

S1904: The electronic device 100 receives a second input for the interface of the first application.

S1905: The electronic device 100 displays a first lock symbol in response to the second input.

The second input is not limited to tap, double tap, touching and holding, swiping, a voice input, or the like. For example, the second input may be an operation on the division line 311 (also referred to as a first division line) shown in FIG. 3C. Alternatively, the second input may be an operation on the division line 311 (also referred to as a first division line) shown in FIG. 4A. Alternatively, the second input may be an operation on the horizontal bar 322 (also referred to as a first horizontal bar) shown in FIG. 7A. For example, the second input may alternatively be an operation on the lock control 762 shown in FIG. 7C. For example, the second input may be an operation on the division line 421

(also referred to as a first division line) shown in FIG. 4E. For example, the second input may be an operation on the division line 451 (also referred to as a first division line) shown in FIG. 4H. In some application scenarios, the second input may be a set of user operations.

The first lock symbol may indicate that the first window and/or the second window are/is locked. For example, the first lock symbol may be the lock icon 314 shown in FIG. 3D. Alternatively, the first lock symbol may be the lock icon 314 shown in FIG. 4B. Alternatively, the first lock symbol may be the lock icon 424 shown in FIG. 4F. Alternatively, the first lock symbol may be the lock icon 454 shown in FIG. 4I. Alternatively, the first lock symbol may be the lock icon 711 shown in FIG. 7B.

S1906: The electronic device 100 receives a third input for the first page.

S1907: The electronic device 100 displays a fourth page in the first window in response to the third input.

The third input is not limited to tap, a voice input, or the like. For example, the third input may be an operation on the "note 5" event 323 shown in FIG. 3D.

The fourth page is a sub page or a home page of the first page. For example, the fourth page may be the note editing page 361 shown in FIG. 3E.

In this way, the electronic device 100 can configure an interface layout more flexibly, to improve screen utilization. Further, it is convenient for a user to concurrently process transactions on two pages at a same layer.

In a possible implementation, the electronic device 100 may receive a sixth input for the first lock symbol, and in response to the sixth input, cancel display of the first lock symbol, display the first page in the first window, and display the third page or the fourth page in the second window. For example, the sixth input may be an operation on the lock icon 314 shown in FIG. 3F.

In another possible implementation, the electronic device 100 may receive a seventh input for the first division line, and in response to the seventh input, cancel display of the first lock symbol, display the first page in the first window, and display the third page or the fourth page in the second window. For example, the seventh input may be an operation on the division line 311 shown in FIG. 4B.

In a possible implementation, the electronic device 100 may receive an eighth input (for example, an operation on the notepad application interface 360 shown in FIG. 5A), and in response to the eighth input, display a desktop and display a first control on the desktop. The electronic device 100 may further receive a ninth input for the first control, and display a first floating window and/or a second floating window on the desktop in response to the ninth input, where a fifth page is displayed in the first floating window, a sixth page is displayed in the second floating window, content of the fifth page is the same as content of the fourth page, and content of the sixth page is the same as content of the third page. Specifically, for detailed steps of the foregoing process, refer to embodiments in FIG. 5A, FIG. 5C, FIG. 5E, and FIG. 5F. Details are not described herein again.

In a possible implementation, the electronic device 100 may receive an eighth input, and in response to the eighth input, display a desktop and display a second control and a first floating window on the desktop. A fifth page is displayed in the first floating window, and content of the fifth page is the same as content of the fourth page. The second control is configured to trigger to display a second floating window, where a sixth page is displayed in the second floating window, and content of the sixth page is the same as content of the third page. Alternatively, in response to the eighth input, the electronic device 100 displays a desktop and displays a third control and a second floating window on the desktop, where the third control is configured to trigger to display a first floating window. Specifically, for detailed steps of the foregoing process, refer to embodiments in FIG. 5A and FIG. 5E. Details are not described herein again.

In a possible implementation, the electronic device 100 may receive an eighth input, and in response to the eighth input, display a desktop and display a first floating window and a second floating window on the desktop, where a fifth page is displayed in the first floating window, content of the fifth page is the same as content of the fourth page, a sixth page is displayed in the second floating window, and content of the sixth page is the same as content of the third page. Specifically, for detailed steps of the foregoing process, refer to embodiments in FIG. 5A and FIG. 5F. Details are not described herein again.

In a possible implementation, the electronic device 100 may receive an eighth input, and in response to the eighth input, display a desktop and display a first floating window and a second floating window on the desktop, where a fifth page is displayed in the first floating window, content of the fifth page is the same as content of the fourth page, a sixth page is displayed in the second floating window, and content of the sixth page is the same as content of the third page. Specifically, for detailed steps of the foregoing process, refer to embodiments in FIG. 5A and FIG. 5F. Details are not described herein again.

What is claimed is:

1. A method, applied to an electronic device, and comprising:
   displaying an interface of a first application, wherein:
      the interface of the first application comprises a first window and a second window,
      the first window is displayed in a first display area on a display screen of the electronic device,
      the second window is displayed in a second display area on the display screen of the electronic device,
      a first page of the first application is displayed in the first window,
      a second page of the first application is displayed in the second window, and
      the second page is a sub page of the first page;
   receiving a first input for the first page;
   displaying a third page in the second window in response to the first input, wherein the third page is a first sub-page of the first page;
   receiving a second input for the interface of the first application;
   displaying a first lock symbol in response to the second input, the first lock symbol indicating that the first window is locked;
   receiving a third input on an item of the first page displayed in the first window; and
   displaying a fourth page in the first window in response to the third input, wherein the fourth page is a second sub-page of the first page, and the third page and the fourth page are at a same layer.

2. The method according to claim 1, wherein before receiving the second input for the interface of the first application, a first horizontal bar is displayed in the first window, and the second input is an input for the first horizontal bar.

3. The method according to claim 2, wherein, before receiving the second input for the interface of the first application, the method further comprises:
   receiving a fourth input for the first display area; and displaying the first horizontal bar in the first window in response to the fourth input.

4. The method according to claim 1, wherein before receiving the second input for the interface of the first application, the method further comprises:
   receiving a fifth input for the interface of the first application; and
   displaying a lock control in response to the fifth input, wherein the second input is an input for the lock control.

5. The method according to claim 1, wherein:
   the interface of the first application further comprises a first division line,
   the first division line is displayed at a junction between the first window and the second window, and
   the second input is an input for the first division line.

6. The method according to claim 1, wherein, after displaying the fourth page in the first window, the method further comprises:
   receiving a sixth input for the first lock symbol; and
   in response to the sixth input:
      canceling display of the first lock symbol;
      displaying the first page in the first window; and
      displaying the third page or the fourth page in the second window.

7. The method according to claim 6, wherein after displaying the fourth page in the first window, the method further comprises:
   receiving a seventh input for a first division line; and
   in response to the seventh input:
      canceling display of the first lock symbol;
      displaying the first page in the first window; and
      displaying the third page or the fourth page in the second window.

8. The method according to claim 1, wherein after displaying the fourth page in the first window, the method further comprises:
   receiving an eighth input;
   in response to the eighth input, displaying a desktop and displaying a first control on the desktop;
   receiving a ninth input for the first control; and
   displaying a first floating window or a second floating window on the desktop in response to the ninth input, wherein:
      a fifth page is displayed in the first floating window,
      a sixth page is displayed in the second floating window,
      content of the fifth page is the same as content of the fourth page, and
      content of the sixth page is the same as content of the third page.

9. The method according to claim 1, wherein after displaying the fourth page in the first window, the method further comprises:
   receiving an eighth input; and
   in response to the eighth input;
      displaying a desktop; and
      displaying a second control and a first floating window on the desktop,
   wherein:
      a fifth page is displayed in the first floating window, content of the fifth page is the same as content of the fourth page, the second control is configured to trigger to display a second floating window,
      a sixth page is displayed in the second floating window, and
      content of the sixth page is the same as content of the third page; or in response to the eighth input;

displaying a desktop; and displaying a third control and a second floating window on the desktop, wherein the third control is configured to trigger to display a first floating window.

10. The method according to claim 1, wherein after displaying the fourth page in the first window, the method further comprises:

receiving an eighth input; and in response to the eighth input:

displaying a desktop; and displaying a first floating window and a second floating window on the desktop, wherein:

a fifth page is displayed in the first floating window, content of the fifth page is the same as content of the fourth page, a sixth page is displayed in the second floating window, and content of the sixth page is the same as content of the third page.

11. An electronic device, comprising:

at least one processor; and a memory coupled to the at least one processor and configured to store programming instructions that, when executed by the at least one processor, cause the electronic device to:

display an interface of a first application, wherein:

the interface of the first application comprises a first window and a second window, the first window is displayed in a first display area on a display screen of the electronic device, the second window is displayed in a second display area on the display screen of the electronic device, a first page of the first application is displayed in the first window, a second page of the first application is displayed in the second window, and the second page is a sub page of the first page;

receive a first input for the first page;

display a third page in the second window in response to the first input, wherein the third page is a first sub-page of the first page;

receive a second input for the interface of the first application;

display a first lock symbol in response to the second input, the first lock symbol indicating that the first window is locked;

receive a third input on an item of the first page displayed in the first window; and display a fourth page in the first window in response to the third input, wherein:

the fourth page is a second sub-page of the first page, and the third page and the fourth page are at a same layer.

12. The electronic device according to claim 11, wherein the programming instructions, when executed by the at least one processor, further cause the electronic device to:

before receiving the second input for the interface of the first application, display a first horizontal bar in the first window, wherein the second input is an input for the first horizontal bar.

13. The electronic device according to claim 12, wherein the programming instructions, when executed by the at least one processor, further cause the electronic device to:

before receiving the second input for the interface of the first application, receive a fourth input for the first display area; and display the first horizontal bar in the first window in response to the fourth input.

14. The electronic device according to claim 11, wherein the programming instructions, when executed by the at least one processor, further cause the electronic device to:

before receiving the second input for the interface of the first application, receive a fifth input for the interface of the first application; and display a lock control in response to the fifth input, wherein the second input is an input for the lock control.

15. The electronic device according to claim 11, wherein:

the interface of the first application further comprises a first division line, the first division line is displayed at a junction between the first window and the second window, and the second input is an input for the first division line.

16. The electronic device according to claim 11, wherein the programming instructions, when executed by the at least one processor, further cause the electronic device to:

after displaying the fourth page in the first window, receive a sixth input for the first lock symbol; and in response to the sixth input:

cancel display of the first lock symbol;

display the first page in the first window; and display the third page or the fourth page in the second window.

17. The electronic device according to claim 15, wherein the programming instructions, when executed by the at least one processor, further cause the electronic device to:

after displaying the fourth page in the first window, receive a seventh input for the first division line; and in response to the seventh input;

cancel display of the first lock symbol;

display the first page in the first window; and display the third page or the fourth page in the second window.

18. The electronic device according to claim 11, wherein the programming instructions, when executed by the at least one processor, further cause the electronic device to:

after displaying the fourth page in the first window, receive an eighth input;

in response to the eighth input:

display a desktop; and display a first control on the desktop;

receive a ninth input for the first control; and display a first floating window or a second floating window on the desktop in response to the ninth input, wherein:

a fifth page is displayed in the first floating window, a sixth page is displayed in the second floating window, content of the fifth page is the same as content of the fourth page, and content of the sixth page is the same as content of the third page.

19. The electronic device according to claim 11, wherein the programming instructions, when executed by the at least one processor, further cause the electronic device to:

after displaying the fourth page in the first window, receive an eighth input; and in response to the eighth input:

display a desktop; and display a second control and a first floating window on the desktop, wherein:

a fifth page is displayed in the first floating window,
content of the fifth page is the same as content of the fourth page,
the second control is configured to trigger to display a second floating window,
a sixth page is displayed in the second floating window, and
content of the sixth page is the same as content of the third page; or in response to the eighth input:

display a desktop; and
display a third control and a second floating window on the desktop, wherein the third control is configured to trigger to display a first floating window.

20. The electronic device according to claim 11, wherein the programming instructions, when executed by the at least one processor, further cause the electronic device to:

after displaying the fourth page in the first window, receive an eighth input; and in response to the eighth input:

display a desktop; and
display a first floating window and a second floating window on the desktop, wherein:

a fifth page is displayed in the first floating window,
content of the fifth page is the same as content of the fourth page,
a sixth page is displayed in the second floating window, and
content of the sixth page is the same as content of the third page.

* * * * *